(12) United States Patent
Kawasaki et al.

(10) Patent No.: US 7,649,684 B2
(45) Date of Patent: Jan. 19, 2010

(54) OPTICAL APPARATUS

(75) Inventors: Kenji Kawasaki, Musashi-murayama (JP); Daisuke Nishiwaki, Hachioji (JP); Keiji Shimizu, Fussa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/147,460

(22) Filed: Jun. 8, 2005

(65) Prior Publication Data

US 2005/0231799 A1    Oct. 20, 2005

Related U.S. Application Data

(60) Division of application No. 10/673,580, filed on Sep. 30, 2003, which is a continuation of application No. 09/726,479, filed on Dec. 1, 2000, now Pat. No. 6,809,861.

(30) Foreign Application Priority Data

Dec. 3, 1999 (JP) ................. 11-344786

(51) Int. Cl.
*G02B 21/06* (2006.01)
(52) U.S. Cl. ............... 359/385; 359/368; 359/380; 359/388; 250/458.1; 250/461.1
(58) Field of Classification Search ................. 359/368, 359/379–381, 385, 388; 250/458.1, 461.1
See application file for complete search history.

(56) References Cited

U.S. PATENT DOCUMENTS

| | | | |
|---|---|---|---|
| 4,498,742 A | | 2/1985 | Uehara |
| 4,715,704 A | * | 12/1987 | Biber et al. ................. 351/207 |
| 4,871,245 A | | 10/1989 | Ishikawa et al. |
| 5,126,877 A | * | 6/1992 | Biber ......................... 359/389 |
| 5,140,458 A | | 8/1992 | Takagi et al. |
| 5,288,987 A | * | 2/1994 | Vry et al. ................. 250/201.3 |
| 5,434,703 A | * | 7/1995 | Morizumi ................... 359/385 |
| 5,627,613 A | | 5/1997 | Kaneko |
| 5,760,952 A | | 6/1998 | Koetke |

(Continued)

FOREIGN PATENT DOCUMENTS

DE    34 27 592    2/1986

(Continued)

*Primary Examiner*—Lee Fineman
(74) *Attorney, Agent, or Firm*—Pillsbury Winthrop Shaw Pittman, LLP

(57) ABSTRACT

An optical apparatus minimizes autofluorescence and stray light as well as leakage of excitation light and efficiently utilizes illuminating light from a fluorescence illumination optical system to allow observation of a bright fluorescence image. An observation apparatus has an objective, an observation optical system unit including a variable magnification optical system, and an imaging optical system unit including an imaging lens and an eyepiece. A fluorescence illumination apparatus, which is provided separately, is removably attached to the observation apparatus. The fluorescence illumination apparatus has a light source, a collector lens unit, and a reflecting member placed between the objective and the observation optical system unit at a position displaced from the optical axis of the objective to make light from the light source incident on the objective. An excitation filter is provided between the light source and the reflecting member. An optical member for selectively transmitting fluorescent light emitted from a sample is placed between the objective and the observation optical system unit.

4 Claims, 46 Drawing Sheets

U.S. PATENT DOCUMENTS

| | | | |
|---|---|---|---|
| 6,040,940 A * | 3/2000 | Kawasaki | 359/389 |
| 6,072,622 A * | 6/2000 | Biber | 359/368 |
| 6,081,371 A | 6/2000 | Shioda et al. | |
| 6,160,662 A * | 12/2000 | Uchida et al. | 359/390 |
| 6,226,118 B1 | 5/2001 | Koyama et al. | |
| 6,236,502 B1 | 5/2001 | Kitajima | |
| 6,392,797 B2 | 5/2002 | Strahle | |
| 6,563,113 B1 * | 5/2003 | Amann et al. | 250/309 |
| 6,603,537 B1 | 8/2003 | Dietz et al. | |
| 6,809,861 B2 | 10/2004 | Kawasaki et al. | |
| 2002/0109912 A1 * | 8/2002 | Knoblich | 359/385 |

FOREIGN PATENT DOCUMENTS

| | | |
|---|---|---|
| WO | WO 99/13370 | 3/1999 |

* cited by examiner

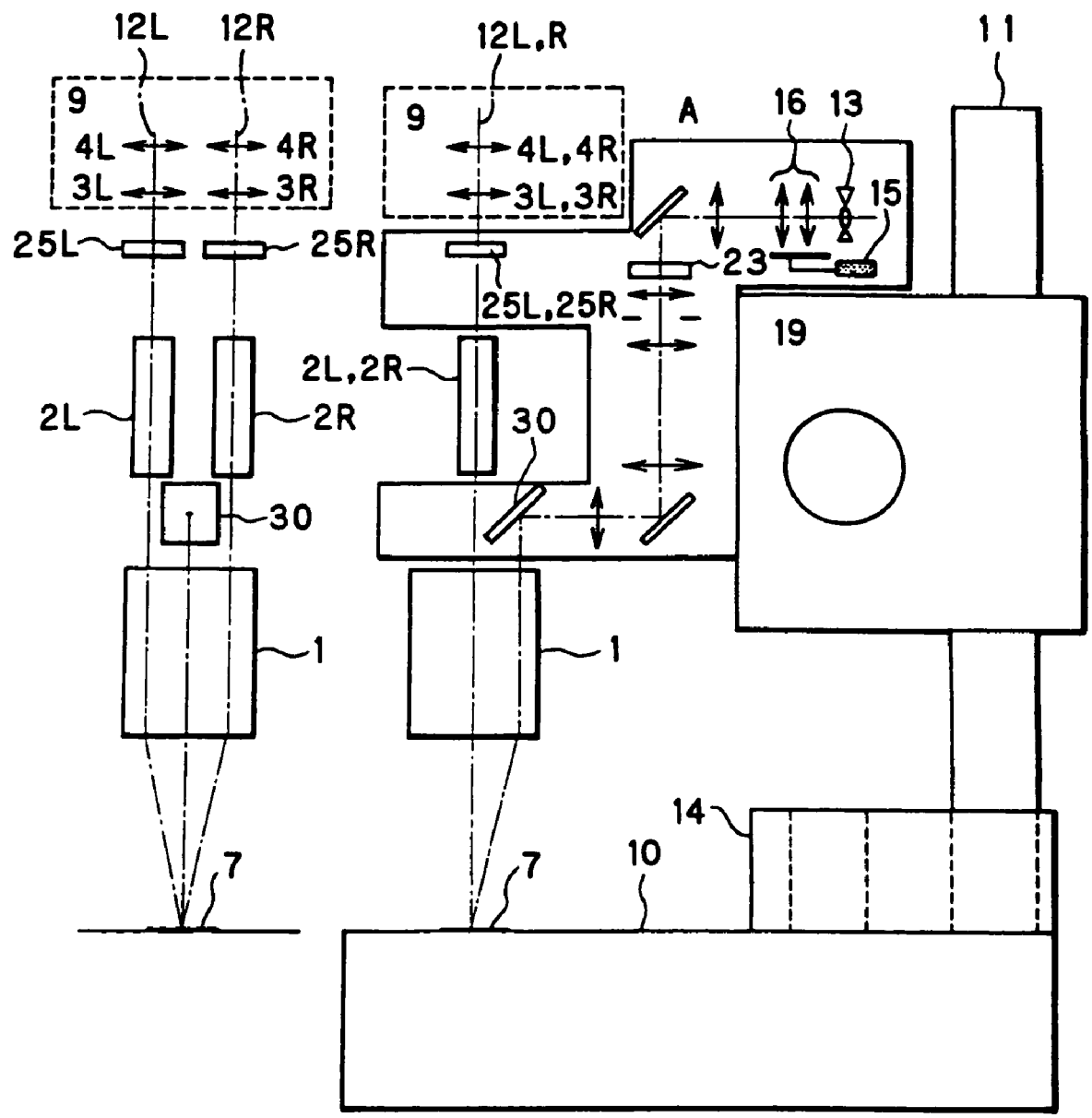

FIG. 3(a)
FIG. 3(b)
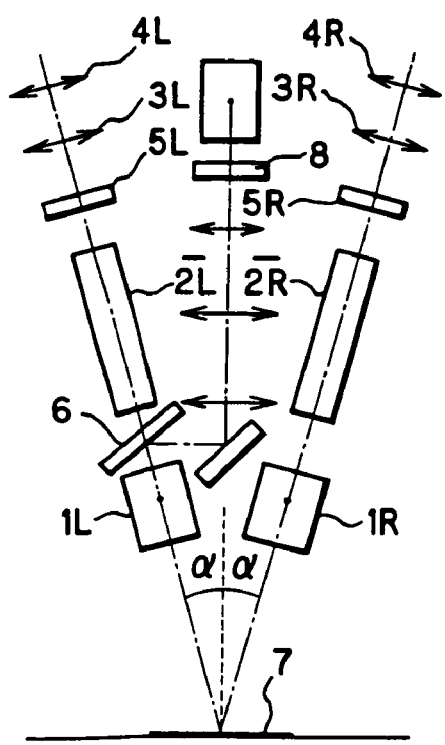
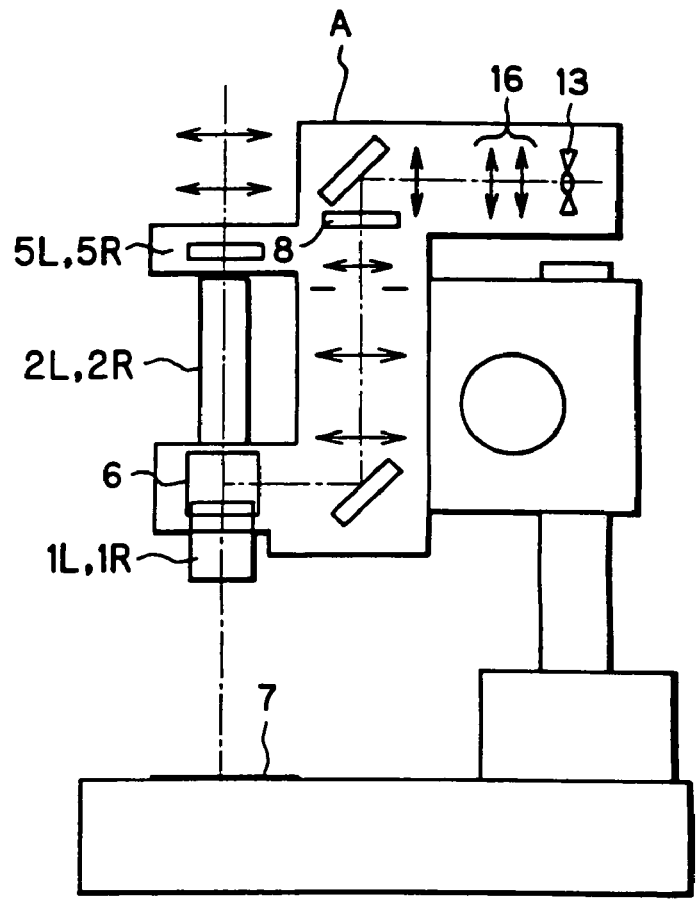

FIG. 23
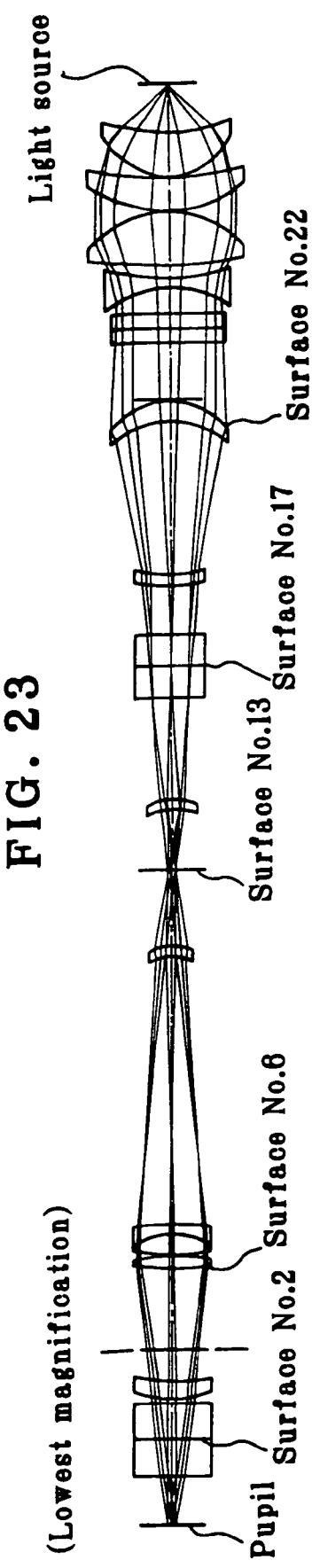
(Lowest magnification)
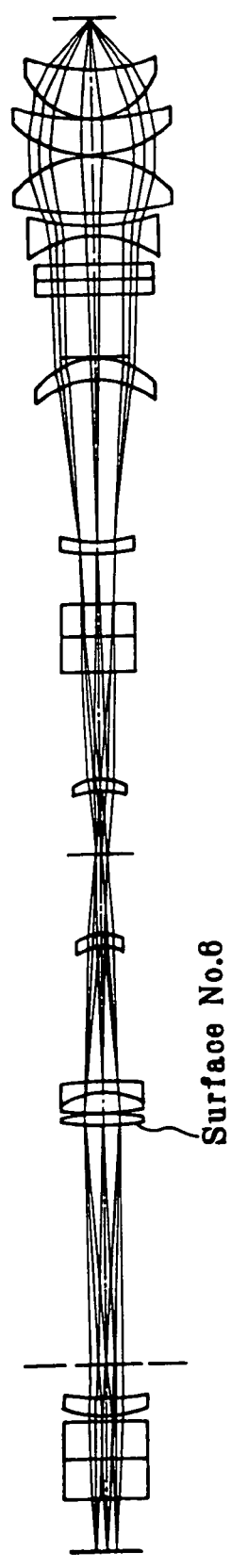
(Intermediate magnification)
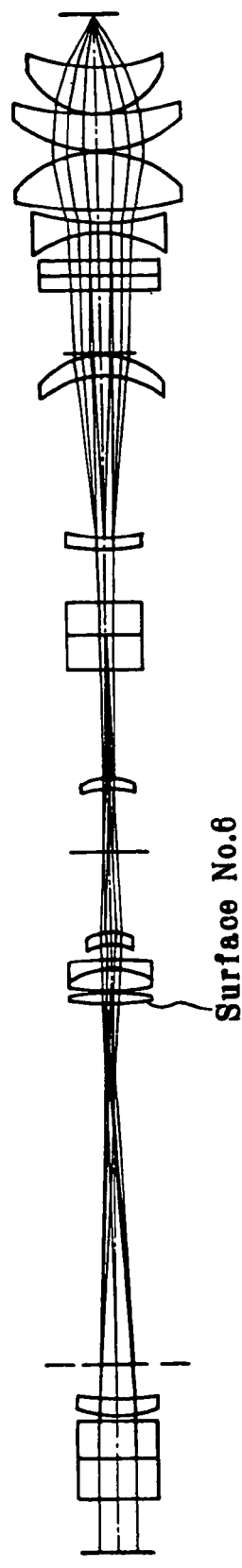
(Highest magnification)

FIG. 24
(Layout)
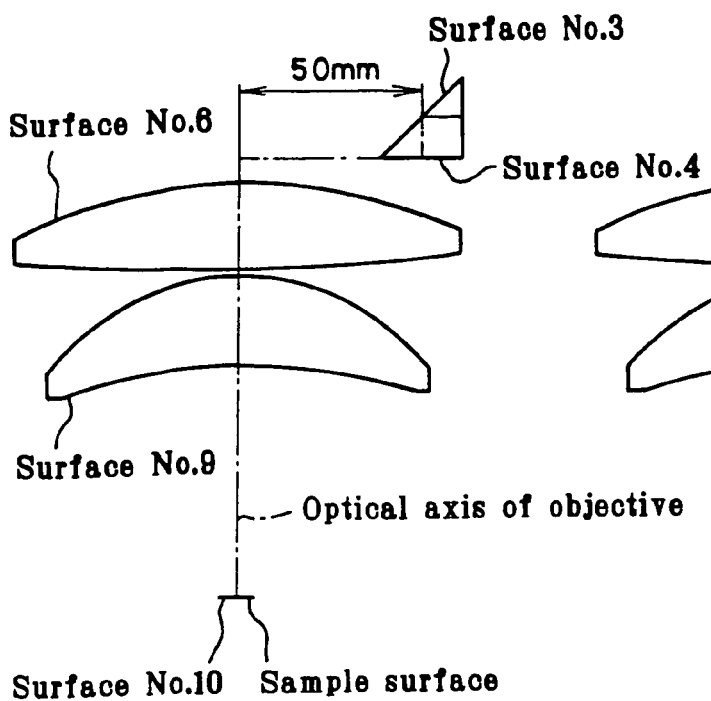
(Lowest magnification)
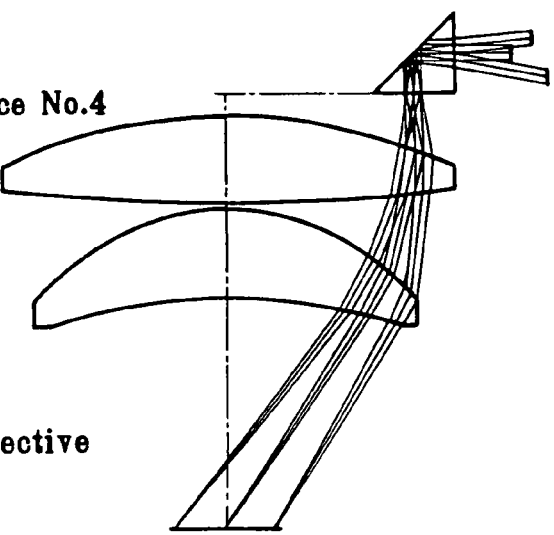
(Intermediate magnification)
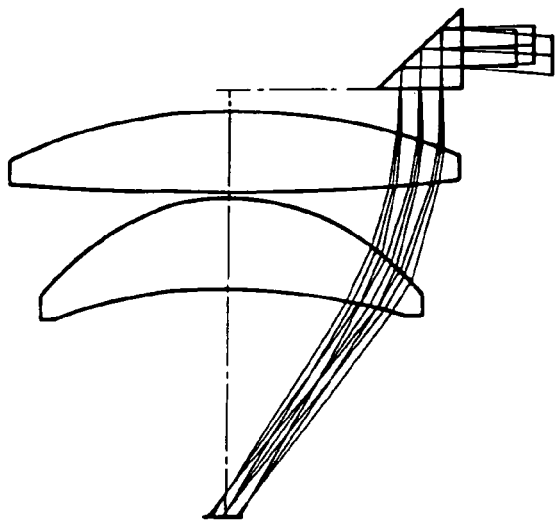
(Highest magnification)
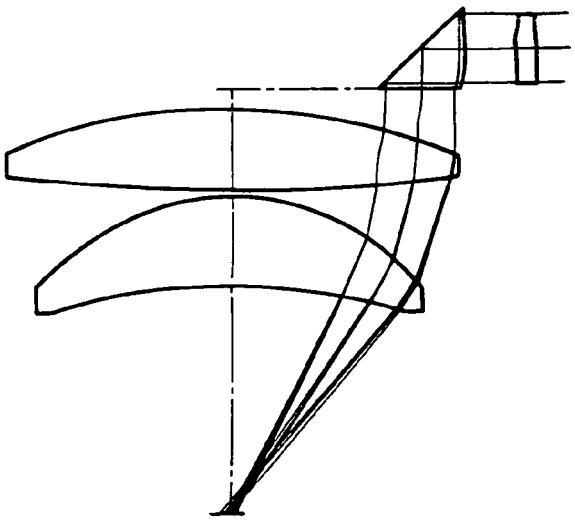

FIG. 27
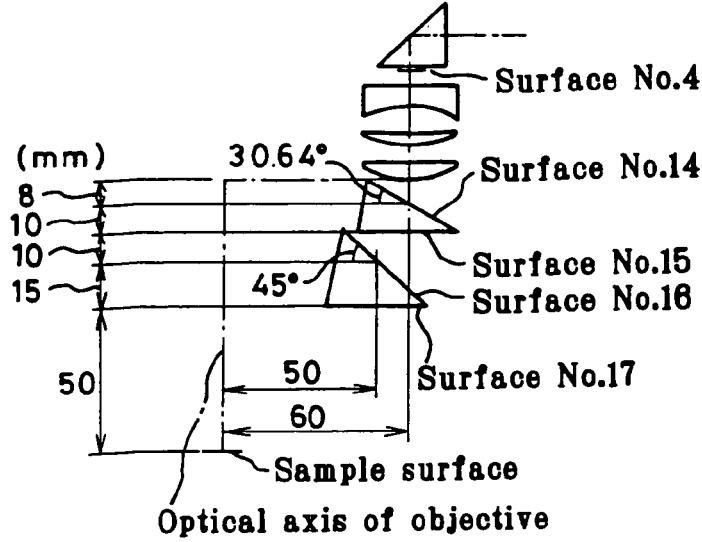
(Layout)
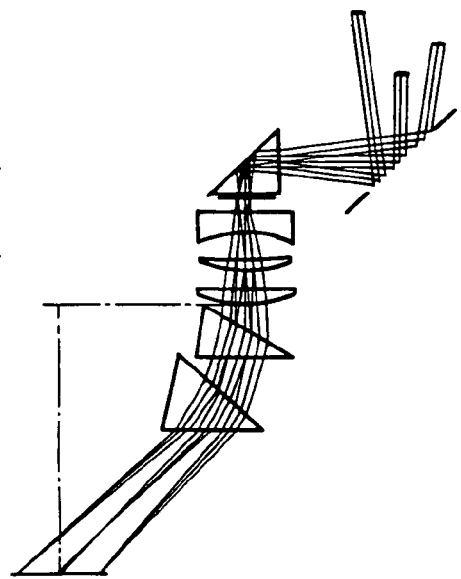
(Lowest magnification)
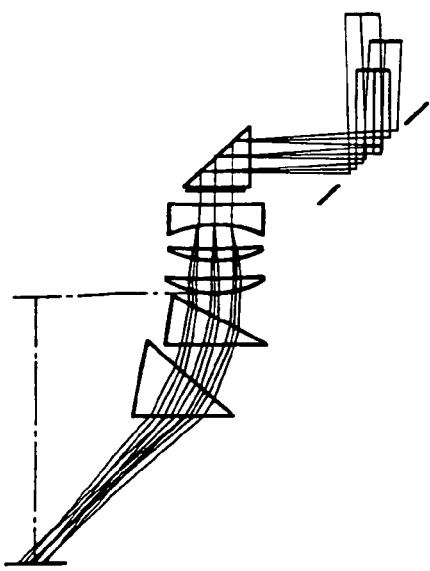
(Intermediate magnification)
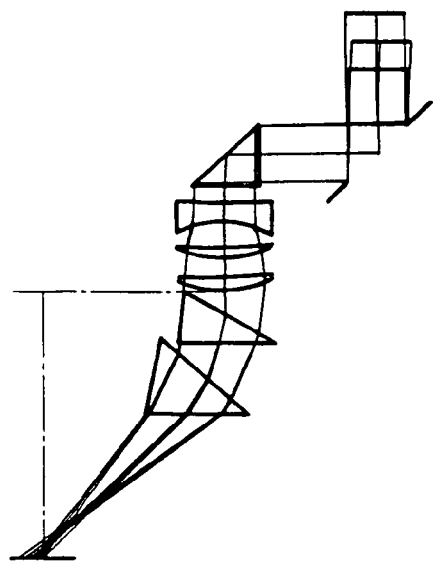
(Highest magnification)

FIG. 29
(Layout)
(Lowest magnification)
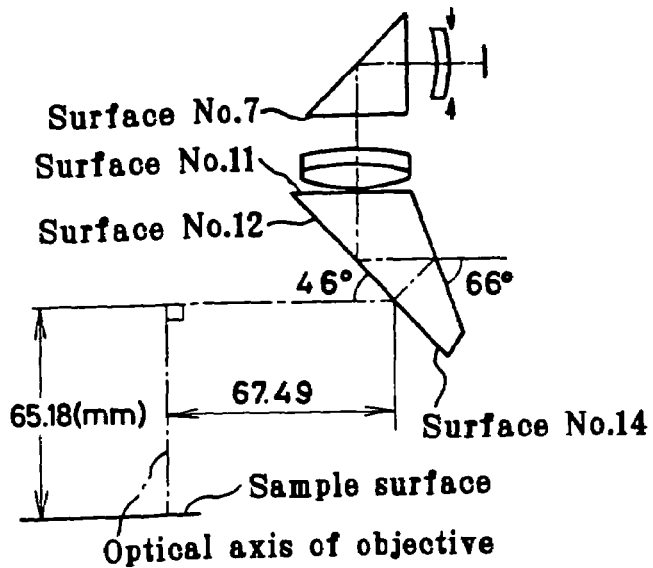
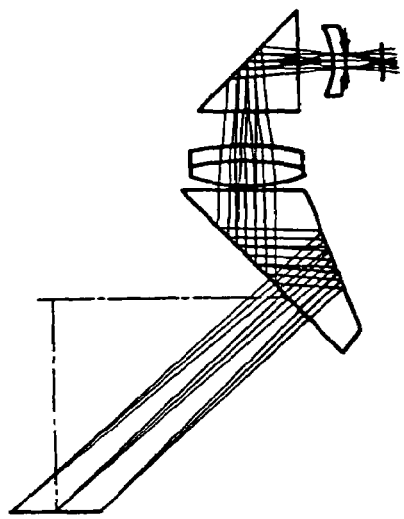
(Intermediate magnification)
(Highest magnification)
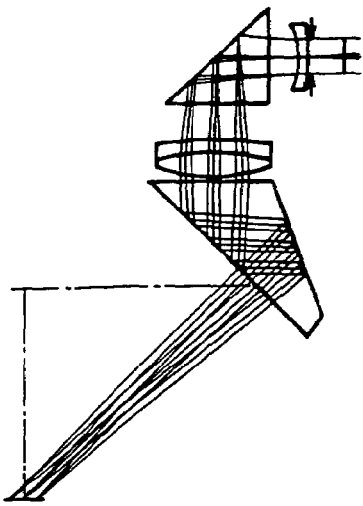
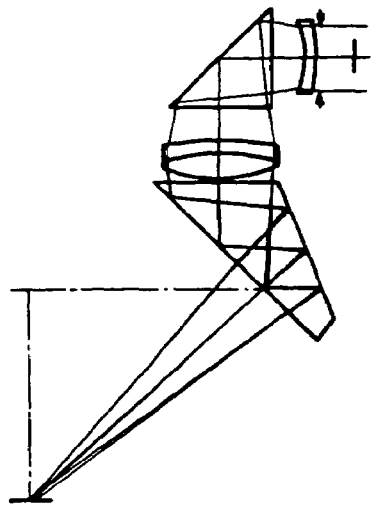

FIG. 31
(Lowest magnification)
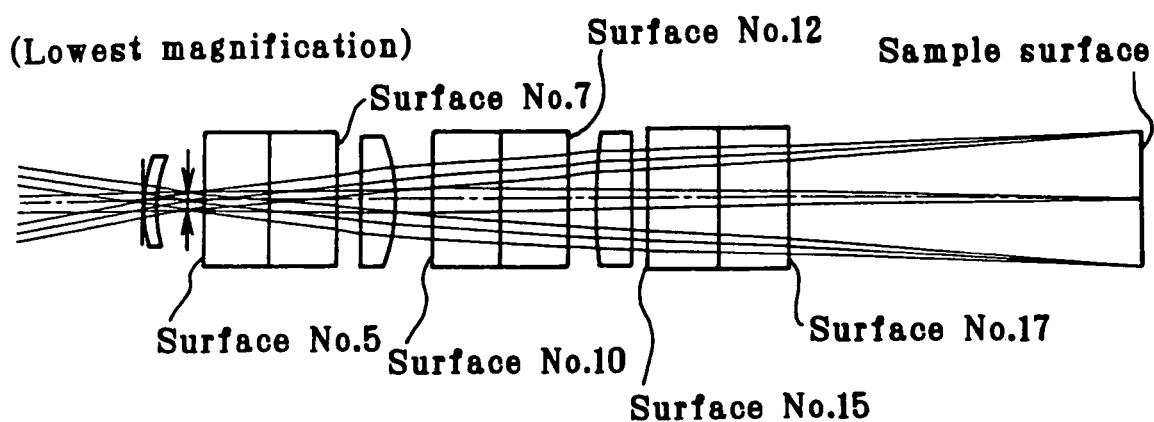
(Intermediate magnification)
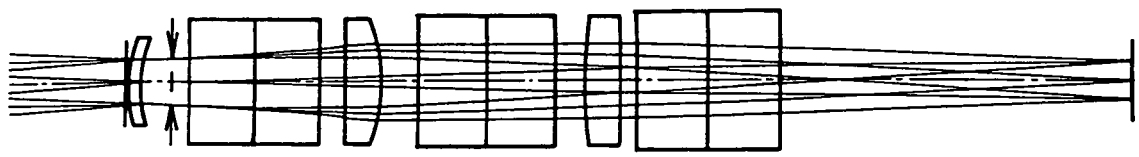
(Highest magnification)
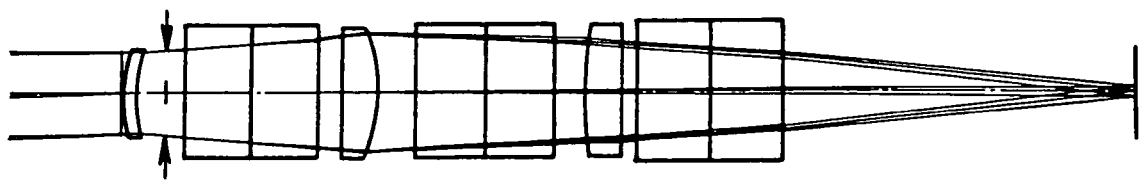

FIG. 35(a)
FIG. 35(b)
FIG. 35(c)
FIG. 35(d)
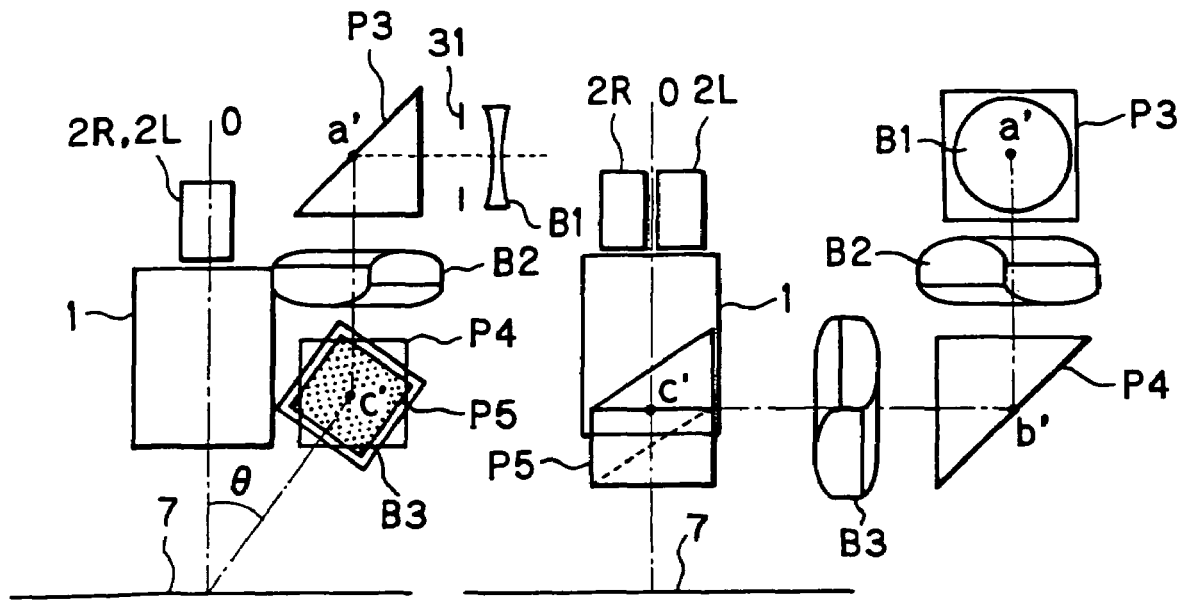
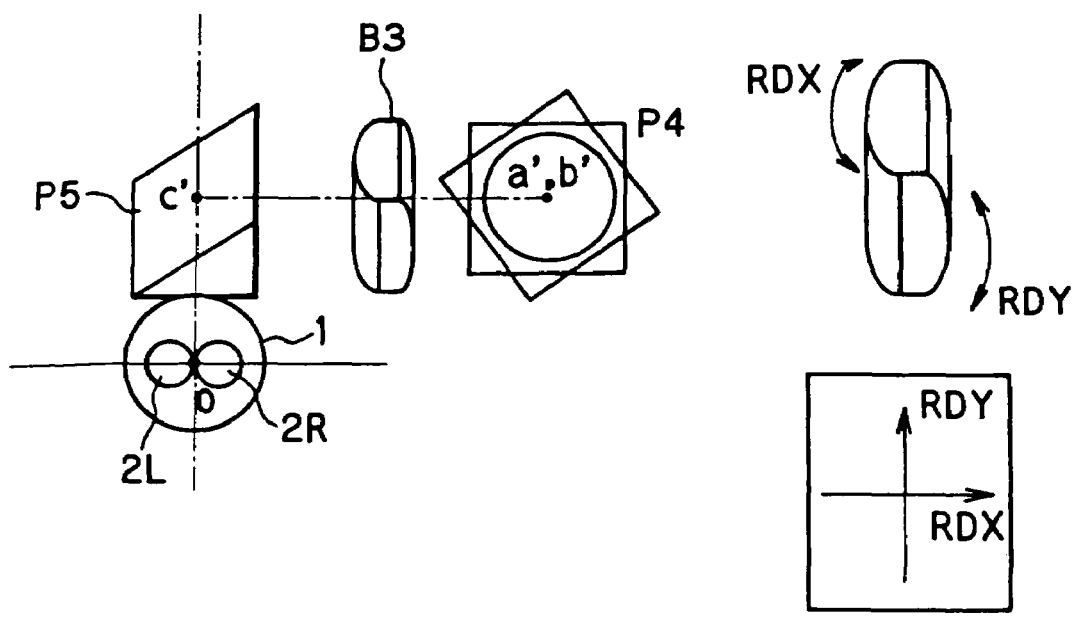

OPTICAL APPARATUS

This is a divisional application of U.S. patent application Ser. No. 10/673,580, filed Sep. 30, 2003, which, in turn, is a continuation of U.S. patent application Ser. No. 09/726,479, filed Dec. 1, 2000, now U.S. Pat. No. 6,809,861, which, in turn, claims the benefit of Japanese Patent Application No. Hei 11-344786, filed in Japan on Dec. 3, 1999, the contents of all of which are incorporated herein by reference in their entireties.

BACKGROUND OF THE INVENTION

The present invention relates to optical apparatus and, more particularly, to fluorescence observation optical apparatus including a fluorescence microscope and a stereoscopic microscope allowing fluorescence observation.

In recent years, fluorescence observation under a fluorescence microscope and a stereoscopic microscope has been widely used not only in micro observation but also in macro observation at low magnification. In particular, fluorescence proteins such as GFP (Green Fluorescence Protein), CFP (Cyan Fluorescence Protein) and YFP (Yellow Fluorescence Protein) have advantages in comparison to conventional fluorescent dyes. That is, such fluorescence proteins show a comparatively low toxicity to cells, suffer less fading and provide brighter fluorescence. Accordingly, the use of fluorescence proteins in the field of genetic research has also increased.

Thus, objects to be observed range from cells in micro observation to individuals such as fruit flies and mice in macro observation. Therefore, there has been proposed a fluorescence observation apparatus including not only an ordinary fluorescence microscope but also a stereoscopic microscope as an apparatus allowing fluorescence observation.

The stereoscopic microscope is a microscope characterized by having a very long working distance in comparison to ordinary microscopes and allowing three-dimensional observation.

FIG. 43 shows a conventional fluorescence observation apparatus including a stereoscopic microscope. First, the observation optical system of the stereoscopic microscope has an interchangeable objective 41 and two variable magnification optical systems 42R and 42L associated with right and left eyes, respectively. The observation optical system further has imaging lenses 43R and 43L and eyepieces 44R and 44L. An image of a sample 47 is magnified by the objective 41 and the variable magnification optical systems 42R and 42L, and the magnified image of the sample 47 is viewed through the imaging lenses 43R and 43L and the eyepieces 44R and 44L.

The objective 41 and each of the variable magnification optical systems 42R and 42L are arranged in the form of an afocal optical system. Similarly, the variable magnification optical systems 42R and 42L and the imaging lenses 43R and 43L are arranged in the form of afocal optical systems, respectively. Thus, the observation optical system is excellent in system flexibility.

The fluorescence illumination optical system of the stereoscopic microscope has a light source 51, an illumination lens system 52, an excitation filter 53, and a dichroic mirror 54L.

Light from the light source 51, which is a mercury lamp, is led to the excitation filter 53 through the illumination lens system 52. Of the light from the light source 51, only excitation light of wavelength needed to excite the sample 47 is selectively transmitted by the excitation filter 53. Excitation light emanating from the excitation filter 53 is reflected toward the variable magnification optical system 42L by the dichroic mirror 54L and applied to the sample 47 through the variable magnification optical system 42L and the objective 41.

At the sample 47, fluorescent light is produced from portions of the sample 47 stained with a fluorescent dye by illumination with the excitation light. The fluorescent light from the sample 47 is collected by the objective 41 and led to a right observation optical path R for an observer's right eye and also to a left observation optical path L for an observer's left eye. Fluorescent light led to the left observation optical path L passes through the variable magnification optical system 42L and the dichroic mirror 54L and reaches an absorption filter 55L. The absorption filter 55L transmits only fluorescent light of specific wavelength selected according to the spectral characteristics thereof. The fluorescent light of specific wavelength is imaged through the imaging lens 43L and viewed as a fluorescence image through the eyepiece 44L. Fluorescent light led to the right observation optical path R passes through the variable magnification optical system 42R and a dichroic mirror 54R and reaches an absorption filter 55R. Fluorescent light passing through the absorption filter 55R, as in the case of fluorescent light passing through the absorption filter 55L, is imaged through the imaging lens 43R and viewed as a fluorescence image through the eyepiece 44R.

The arrangement of an ordinary fluorescence microscope is shown in FIG. 44. The fluorescence illumination optical system of the ordinary fluorescence microscope has a light source 51, an illumination lens system 52, an excitation filter 53, a dichroic mirror 54, and an absorption filter 55. Light from the light source 51, which is a mercury lamp, is led to the excitation filter 53 through the illumination lens system 52. Of the light from the light source 51, only excitation light of wavelength needed to excite a sample 47 is selectively transmitted by the excitation filter 53. Excitation light emanating from the excitation filter 53 is reflected by the dichroic mirror 54 and applied to the sample 47 through an objective 41. Fluorescent light from the sample 47 is collected by the objective 41 and passes through the dichroic mirror 54 to reach the absorption filter 55. The absorption filter 55 transmits only fluorescent light of specific wavelength selected according to the spectral characteristics thereof. The fluorescent light of specific wavelength is imaged through an imaging lens 43 and viewed as a fluorescence image through an eyepiece 44. The fluorescence illumination optical system shown in FIG. 43 projects an image of the light source 51 in the vicinity of the pupil position of the variable magnification optical system 42L and allows the illumination area and the observation area to coincide with each other independently of a change in magnification made during observation and also independently of interchanging the objective 41 with another objective. Therefore, the fluorescence illumination optical system is excellent in operability.

Similarly, the fluorescence illumination optical system shown in FIG. 44 projects an image of the light source 51 in the vicinity of the pupil position of the objective 41 and is therefore capable of making the illumination area and the observation area coincident with each other independently of interchanging the objective 41 with another objective.

FIG. 45 shows an arrangement in which an observation optical path is not used also as an illumination optical path, unlike the illumination method shown in FIG. 43. The fluorescence illumination optical system shown in FIG. 45 has a light source 51, a collector lens system 58, a light guide fiber 59, an excitation filter 53, and an illumination lens system 57 capable of varying the illumination area. Excitation light from the light source 51 is collected by the collector lens system 58 and led to an entrance end surface 59a of the light guide fiber 59. Light emerging from an exit end surface 59b of the light guide fiber 59 passes through the illumination lens system 57, which is capable of varying the illumination area, and further passes through the excitation filter 53 whereby only light in a specific wavelength region is selected and applied to a sample 47. Fluorescent light from the sample 47 is viewed through an objective 41, variable magnification optical systems 42R and 42L, absorption filters 55R and 55L, imaging lenses 43R and 43L and eyepieces 44R and 44L as in the case of FIG. 43.

FIG. 46 shows the arrangement of an apparatus proposed in WO99/13370, in which a variable magnification optical system in an observation optical system and an illumination optical system are separated from each other.

As shown in part (a) of FIG. 46, the apparatus has an objective 41 and observation optical systems 42L and 42R associated with observer's left and right eyes, respectively, which are provided in an observation optical system unit 42. The apparatus further has imaging lenses 43L and 43R and eyepieces 44L and 44R.

An absorption filter 50 is placed between the observation optical system 42L and the imaging lens 43L. Another absorption filter 50 is placed between the observation optical system 42R and the imaging lens 43R. In a fluorescence illumination optical system 45, as shown in part (b) of FIG. 46, light from a light source 46 is collected and passed through an excitation filter 48. Then, excitation light travels via a deflection member 49 and passes through a fluorescence illumination lens unit 42F provided in the observation optical system unit 42 separately from the observation optical systems 42L and 42R. Then, the excitation light illuminates a sample 47 through the objective 41. Fluorescent light from the sample 47 passes through objective 41 and further through the observation optical systems 42L and 42R and the absorption filters 50 and is viewed through the eyepieces 44L and 44R.

When the magnification for observation is changed by a magnification changing operation of the observation optical systems 42L and 42R in the observation optical system unit 42, lens elements in the fluorescence illumination lens unit 42F move in association with the magnification changing operation of the observation optical systems 42L and 42R to make the observation area and the illumination area coincident with each other. It should be noted that part (c) of FIG. 46 is a top view showing the observation optical systems 42L and 42R and the fluorescence illumination lens unit 42F.

In fluorescence observation, bright and high-contrast fluorescence images are demanded.

Because fluorescent light is very weak in intensity in comparison to light in ordinary reflected-light observation or transmitted-light observation, it is very important to allow a fluorescence image of a sample to be viewed with high brightness and high contrast through not only stereoscopic microscopes allowing fluorescence observation but also various microscopes used for fluorescence observation.

As factors in providing bright fluorescence images, for example, it is demanded that the objective and other associated optical systems should have a high numerical aperture and exhibit a high transmittance over from the ultraviolet region to the visible region, and that illumination efficiency should be increased.

One of the causes of the reduction in contrast of the fluorescence image is autofluorescence, that is, fluorescent light produced from an optical member, e.g. glass, by excitation light. Although a vitreous material producing minimum autofluorescence is selected to form an objective for fluorescence observation, a glass material of high dispersion and high refractive index used as a material of a negative lens, in particular, produces a high degree of autofluorescence and has a low transmittance in the ultraviolet region. Therefore, there is a limitation on the selection of vitreous materials, and it is difficult in terms of optical design to favorably correct aberration of the objective and other optical systems for fluorescence observation.

Accordingly, the stereoscopic microscope shown in FIG. 43 provides an unfavorably dark fluorescence image during fluorescence observation because the numerical aperture is low in comparison to the ordinary fluorescence microscope, although the stereoscopic microscope has the advantageous features that it allows three-dimensional observation and has a long working distance whereby to provide excellent operability. Moreover, because the variable magnification optical system 42L and the objective 41 are placed in the optical path through which excitation light passes, as shown in FIG. 43, autofluorescence occurs from the glass, causing the contrast of the fluorescence image to be reduced unfavorably. Furthermore, because excitation light passes through a long optical path of glass, the degree of autofluorescence occurring in the optical path is very high in comparison to the objective of the ordinary fluorescence microscope. In addition, because the numerical aperture is low, the fluorescence image obtained with the stereoscopic microscope is darker than in the case of the ordinary fluorescence microscope, as stated above. Moreover, the transmittance in the ultraviolet region is low. Therefore, the contrast of the fluorescence image becomes lower than in the case of the ordinary fluorescence microscope.

Thus, it is essential to minimize autofluorescence in order to observe the fluorescence image with high contrast. FIGS. 45 and 46 show arrangements heretofore proposed to solve the above-described problems.

In the fluorescence illumination optical system shown in FIG. 45, because excitation light does not pass through the observation optical path, no autofluorescence occurs in the observation optical system. Accordingly, a high-contrast fluorescence image can be obtained.

However, because the illumination area of the fluorescence illumination optical system does not change in association with the change of the observation area caused by the magnification changing operation of the observation optical system, operability is very bad. Moreover, because a light guide fiber is used in the illumination optical system, the excitation light illumination efficiency is low. Accordingly, the fluorescence image for observation is unfavorably dark.

Furthermore, to perform fluorescence observation with different wavelengths of excitation light, it is necessary to change each of the excitation and absorption filters individually. Accordingly, operability is not good.

The fluorescence illumination optical system shown in FIG. 46 has the observation optical systems 42L and 42R in the observation optical system unit 42, together with the fluorescence illumination lens unit 42F for the exclusive use of the fluorescence illumination optical system. Accordingly, excitation light does not pass directly through the observation optical systems 42L and 42R, and autofluorescence does not occur. However, because excitation light passing through the fluorescence illumination lens unit 42F enters the objective 41, autofluorescence occurs in the objective 41. When the objective 41 is formed by using a vitreous material producing minimal autofluorescence in order to minimize autofluorescence produced from the objective 41, it becomes impossible to maintain the required optical performance, including chromatic aberration correcting performance, in comparison to the optical performance of conventional objectives, as stated above.

In a case where the occurrence of autofluorescence in the objective 41 cannot be suppressed, a region in the objective 41 through which the excitation light passes and a region in the objective 41 through which fluorescent light from the sample 47 passes when it is led to the observation optical systems 42L and 42R overlap each other at a certain region in the observation area. Therefore, autofluorescence light from the objective 41 is superimposed on the fluorescence image in that region. As a result, the contrast of the observation image is partially degraded. Regarding this phenomenon, the region where autofluorescence light is superimposed on the fluorescence image changes according to the magnification of the variable magnification optical systems in the observation optical systems 42L and 42R. Normally, when the zoom ratio of the variable magnification optical systems is low, autofluorescence light is partially superimposed on the observation area. As the zoom ratio increases, autofluorescence light from the objective 41 is superimposed on the whole observation area.

Furthermore, it is conceivable that when excitation light passes through the fluorescence illumination lens unit 42F in the observation optical system unit 42, excitation light reflected from the lens surfaces in the fluorescence illumination lens unit 42F may enter the observation optical systems 42L and 42R in the form of stray light or leakage light. In such a case, if the excitation light causes autofluorescence to occur from the lenses in the observation optical systems 42L and 42R and the absorption filters 50, it is impossible to perform fluorescence observation with high contrast.

Moreover, the observation optical system unit 42 is so structured as to move in association with the movement of the lens units of the observation optical systems 42L and 42R in the observation optical system unit 42 to change the magnification in order to make the illumination area and the observation area coincident with each other. Therefore, it is difficult to spatially shield the fluorescence illumination lens unit 42F to prevent excitation light from entering the observation optical systems 42L and 42R as stray light or leakage light.

Furthermore, the fluorescence observation apparatus having the observation optical system unit 42 cannot be incorporated into a stereoscopic microscope that has heretofore been used; it is used as a special-purpose fluorescence stereoscopic microscope. Therefore, the fluorescence illumination apparatus cannot be used in combination with a stereoscopic microscope that has heretofore been used. Accordingly, the apparatus is inferior in compatibility and system flexibility.

Incidentally, there have been proposed various surgical microscopes in which an observation optical system and an illumination optical system are separated from each other, although they are not stereoscopic microscopes allowing fluorescence observation. FIG. 47 shows an example of the arrangement of a surgical microscope disclosed in Japanese Patent Application Post-Examination Publication No. Hei7-57226.

An affected part 60 to be submitted to a surgical operation is observed through an observation optical system having an objective 61, a variable magnification optical system 62 for observation, a beam splitter 63, an observation prism 64, and an eyepiece 65. The beam splitter 63 is used to branch off a photography optical path from the observation optical path. Thus, the optical path is branched off to a photography optical system (not shown) having an optical axis in a direction perpendicular to the plane of the figure. An illumination optical system for observation that illuminates the affected part 60 has a light source lamp 66, a first relay lens system 67, a variable magnification optical system 69 for illumination, an illumination prism 70, and the objective 61. Light from the light source lamp 66 illuminates the affected part 60 through the illumination optical system for observation. An illumination optical system for photography has a xenon (Xe) flash lamp 71, a second relay lens system 72, a semitransparent reflecting mirror 68, the variable magnification optical system 69, the illumination prism 70, and the objective 61. The semitransparent reflecting mirror 68 is capable of being inserted into and withdrawn from the illumination optical system for observation. To take photographs, the semitransparent reflecting mirror 68 is raised to a position 68' shown by the dashed lines by, for example, a rotary solenoid (not shown). Consequently, light from the Xe flash lamp 71 illuminates the affected part 60 through the illumination optical system for photography.

The above-described surgical microscope has the features that because the distance to the affected part to be submitted to a surgical operation is long, the working distance is long and the depth of focus is deep in comparison to the stereoscopic microscopes, and further, the zoom ratio of the observation optical system is smaller than that of the stereoscopic microscopes by a factor of about 10. The surgical microscope is unsuitable for fluorescence observation and different from the stereoscopic microscope allowing fluorescence observation in use application and also in performance required of the observation optical system and the illumination optical system.

SUMMARY OF THE INVENTION

The present invention was made in view of the above-described circumstances of the prior art. An object of the present invention is to provide a fluorescence observation optical apparatus including a fluorescence microscope and a stereoscopic microscope allowing fluorescence observation. The fluorescence observation optical apparatus is designed to minimize autofluorescence produced from glass in an observation optical system by excitation light from a fluorescence illumination optical system and to prevent excitation light from entering the observation optical system as stray light or leakage light, thereby allowing observation with high contrast. Further, illuminating light from the fluorescence illumination optical system is utilized efficiently to allow observation of a bright fluorescence image. Moreover, the fluorescence observation optical apparatus is excellent in operability and system flexibility.

To attain the above-described object, the present invention provides a first optical apparatus including an observation apparatus and a fluorescence illumination apparatus removably attached to the observation apparatus. The observation apparatus has an objective, an observation optical system unit including a variable magnification optical system, and an imaging optical system unit including an imaging lens and an eyepiece.

The fluorescence illumination apparatus has a light source and a reflecting member placed between the objective and the observation optical system unit at a position displaced from the optical axis of the objective to make light from the light source incident on the objective. The fluorescence illumination apparatus further has an illumination optical system placed between the light source and the reflecting member to lead illuminating light from the light source to the reflecting member.

A first wavelength selecting member for selectively transmitting light in a specific wavelength region in the illuminating light is placed between the light source and the reflecting member. A second wavelength selecting member for selectively transmitting light in the wavelength region of fluorescent light emitted from a sample is placed between the objective and the imaging optical system unit.

In addition, the present invention provides a second optical apparatus having a structure similar to that of the first optical apparatus. In the second optical apparatus, the second wavelength selecting member is integrated with the fluorescence illumination apparatus.

In addition, the present invention provides a third optical apparatus having a structure similar to that of the first optical apparatus. In the third optical apparatus, the second wavelength selecting member is integrated with the first wavelength selecting member.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 is a diagram showing the arrangement of a fifth optical apparatus according to the present invention, in which parts (a) and (b) are side and front views, respectively, of the optical apparatus in a state where a fluorescence illumination apparatus is attached to a Galilean stereoscopic microscope.

FIG. 3 is a diagram showing the arrangement of a sixth optical apparatus according to the present invention, in which parts (a) and (b) are side and front views, respectively, of the optical apparatus in a state where a fluorescence illumination apparatus is attached to a Greenough stereoscopic microscope.

FIG. 23 is a diagram showing the optical system of a fluorescence illumination apparatus used in Example 4, which shows the lens arrangements at the lowest, intermediate and highest magnifications.

FIG. 24 is a diagram showing the layout of a distal end illumination unit and the condition of illuminating light at the lowest, intermediate and highest magnifications.

FIG. 27 is a diagram showing the layout of the distal end illumination unit in Example 5 and the condition of illuminating light at the lowest, intermediate and highest magnifications.

FIG. 29 is a diagram showing the layout of the distal end illumination unit in Example 6 and the condition of illuminating light at the lowest, intermediate and highest magnifications.

FIG. 31 is a diagram showing a distal end illumination unit in Example 7, which shows the condition of illuminating light at the lowest, intermediate and highest magnifications.

FIG. 35 is a diagram showing a distal end illumination unit in Example 8 formed by using toric lenses, in which: part (a) is a side view of the distal end illumination unit, an objective and an observation optical system; part (b) is a front view of the arrangement; part (c) is a top view of the arrangement; and part (d) is a diagram showing the external shape of a toric lens.

DESCRIPTION OF THE PREFERRED EMBODIMENTS

Figures 1A, 1B:
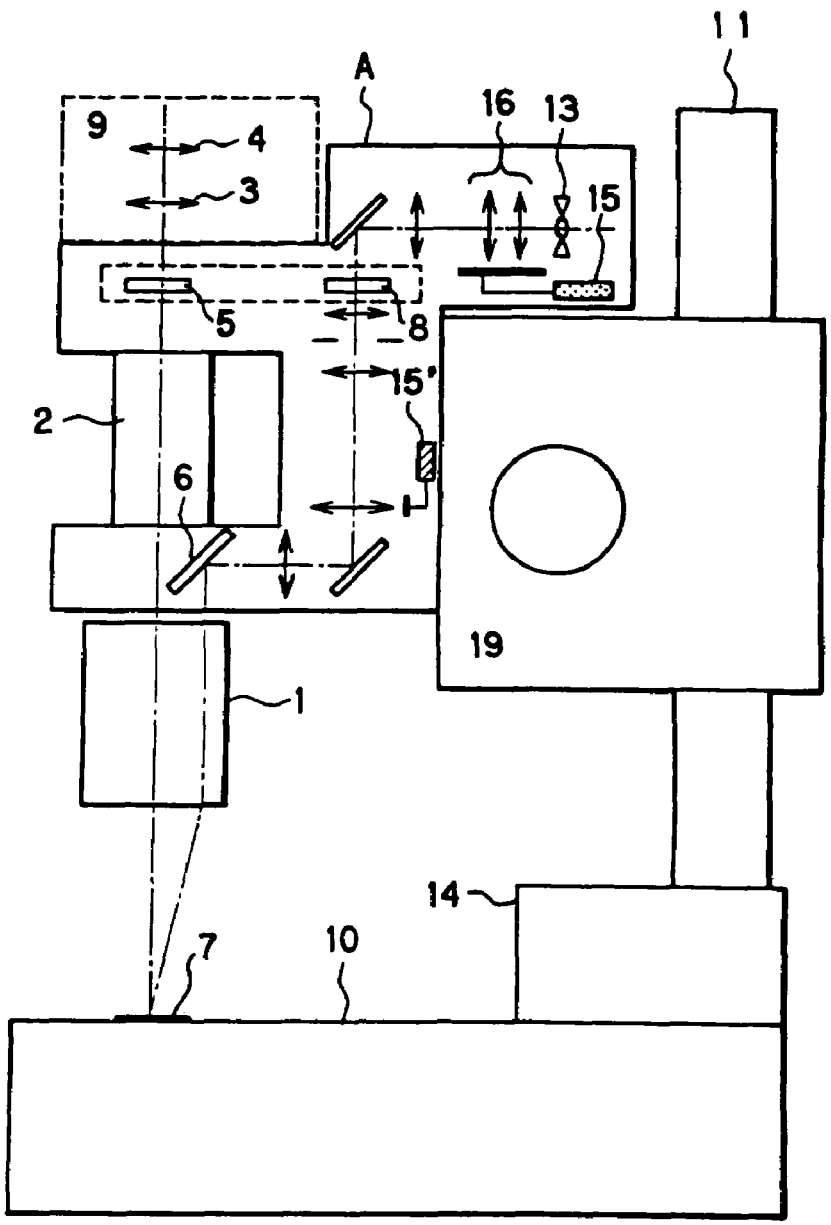
FIG. 1 is a diagram showing the arrangement of a first optical apparatus according to the present invention, in which parts (a) and (b) are side and front views, respectively, of the optical apparatus as equipped with a fluorescence illumination apparatus that performs illumination through an objective.

First, the operation of the above-described first to third optical apparatus will be described. To improve the contrast of the above-described fluorescence image, it is important that excitation light from the fluorescence illumination apparatus should be prevented from passing through the optical system in the observation optical system unit as much as possible. Accordingly, as shown in parts (a) and (b) of FIG. 1, which are a side view and a front view, the first optical apparatus includes an observation apparatus and a fluorescence illumination apparatus A removably attached to the observation apparatus. The observation apparatus has an objective 1, an observation optical system unit 2 including a variable magnification optical system, and an imaging optical system unit 9 including an imaging lens 3 and an eyepiece 4. The fluorescence illumination apparatus A has an illumination optical system having a light source 13 and a plurality of lens units including a collector lens unit 16. The illumination optical system further has reflecting members. A reflecting member 6 for reflecting excitation light is placed between the observation optical system unit 2 and the objective 1 at a position displaced from the optical axis of the objective 1 to reflect illuminating light to illuminate a sample 7. Between the light source 13 and the reflecting member 6, an excitation filter 8 is placed as a first wavelength selecting member for selectively transmitting light of specific wavelength to illuminate the sample 7. Between the objective 1 and the imaging optical system unit 9, an absorption filter 5 is placed as a second wavelength selecting member for selectively transmitting fluorescent light emitted from the sample 7.

The objective 1 and the observation optical system unit 2, which includes a variable magnification optical system, are arranged in the form of a universal infinite optical system. The variable magnification optical system is formed from an afocal optical system.

In the first optical apparatus, excitation light from the fluorescence illumination apparatus A does not pass through the observation optical system unit 2, which includes the variable magnification optical system, but enters the objective 1 through an area between the observation optical system unit 2 and the objective 1 by the action of the reflecting member 6 placed at a position displaced from the optical axis of the objective 1 and illuminates the sample 7. Therefore, no autofluorescence occurs in the observation optical system unit 2.

In the second optical apparatus, the absorption filter 5 as the second wavelength selecting member for selectively transmitting fluorescent light and the fluorescence illumination apparatus A are integrated into one unit, thereby allowing the fluorescence illumination apparatus A to be readily combined with a conventional observation apparatus. Thus, the optical apparatus is improved in general-purpose properties. In addition, because the conventional observation apparatus combined with the fluorescence illumination apparatus A allows fluorescence observation, the optical apparatus is excellent in system flexibility.

In the third optical apparatus, the absorption filter 5 as the second wavelength selecting member and the excitation filter 8 as the first wavelength selecting member are integrated into one unit, thereby allowing the system to be readily handled. In addition, because the system configuration is simplified, the cost can be reduced.

A fourth optical apparatus according to the present invention has a structure similar to that of the first or second optical apparatus. The fourth optical apparatus has a frame for holding a sample and a post installed on the frame. The optical apparatus further has a focusing unit held on the post to change the distance between the sample and the objective. The focusing unit holds the fluorescence illumination apparatus. The fluorescence illumination apparatus holds the observation apparatus.

The operation of the fourth optical apparatus will be described below. As shown in FIG. 1, the optical apparatus allowing fluorescence observation has a focusing unit 19 for changing the distance between the sample 7 and the objective 1. The optical apparatus further has a frame 10 for holding the sample 7 and a post 11 installed on the frame 10. The focusing unit 19 is held on the post 11. The focusing unit 19 holds the fluorescence illumination apparatus A. The fluorescence illumination apparatus A holds the objective 1, the observation optical system unit 2 and the imaging optical system unit 9.

In the fourth optical apparatus also, the absorption filter 5 as the second wavelength selecting member for selectively transmitting fluorescent light and the fluorescence illumination apparatus A may be integrated into one unit, thereby allowing the fluorescence illumination apparatus A to be readily combined with a conventional observation apparatus. Consequently, the conventional observation apparatus combined with the fluorescence illumination apparatus A allows fluorescence observation. Thus, the optical apparatus is excellent in system flexibility. Furthermore, the area between the observation optical system unit 2 and the focusing unit 19, which is the space for accommodating the fluorescence illumination apparatus A, is not particularly used in the conventional apparatus. Therefore, placing the fluorescence illumination apparatus A in this space avoids an increase in the size of the optical apparatus and prevents the surrounding space from being sacrificed.

A fifth optical apparatus according to the present invention has a structure similar to that of the first optical apparatus. In the fifth optical apparatus, the observation optical system unit and the imaging optical system unit are each formed from a pair of lens units. The pair of lens units are placed in parallel and symmetry with respect to the optical axis of the objective.

The operation of the fifth optical apparatus will be described with reference to part (a) of FIG. 2. As shown in part (a) of FIG. 2, the fifth optical apparatus has a single objective 1 and left and right observation optical systems 2L and 2R. Further, the fifth optical apparatus has left and right absorption filters 25L and 25R as second wavelength selecting members for selectively transmitting fluorescent light, left and right imaging lenses 3L and 3R, and left and right eyepieces 4L and 4R. Accordingly, the observation optical system unit and the imaging optical system unit each have a pair of lens units.

It should be noted that the observation optical systems are optical systems in the observation optical system unit, and each observation optical system may have a relay optical system or an optical path splitting device in addition to the variable magnification optical system.

In part (a) of FIG. 2, the left-hand lens unit (2L, 25L, 3L and 4L) and the right-hand lens unit (2R, 25R, 3R and 4R) are disposed on the left and right sides, respectively, of an optical axis of the objective 1, which is also the center axis of the objective 1. The distance between the left-hand lens unit and the optical axis and the distance between the right-hand lens unit and the optical axis are equal to each other. The pair of lens units are placed in parallel to the optical axis of the objective 1. Accordingly, the pair of lens units are in symmetry with respect to the optical axis of the objective 1. With this arrangement, the fifth optical apparatus forms a Galilean stereoscopic microscope and hence makes it possible to view the sample stereoscopically.

A sixth optical apparatus according to the present invention has a structure similar to that of the first optical apparatus. In the sixth optical apparatus, the objective, the observation optical system unit and the imaging optical system unit are each formed from a pair of lens units. Each pair of lens units are placed at a tilt to an axis normal to the sample surface and in symmetry with respect to the axis.

The operation of the sixth optical apparatus will be described with reference to FIG. 3. Part (a) of FIG. 3 is a front view, and part (b) of FIG. 3 is a side view. As shown in FIG. 3, the sixth optical apparatus has left and right objectives 1L and 1R, left and right observation optical systems 2L and 2R, left and right optical members 5L and 5R for selectively transmitting fluorescent light, left and right imaging lenses 3L and 3R, and left and right eyepieces 4L and 4R.

Accordingly, the objective, the observation optical system unit and the imaging optical system unit each have a pair of lens units.

The left-hand lens unit (1L, 2L, 5L, 3L and 4L) and the right-hand lens unit (1R, 2R, 5R, 3R and 4R) are disposed on the left and right sides, respectively, of an axis normal to the surface of the sample 7. Each lens unit is tilted at the same angle α with respect to the axis normal to the surface of the sample 7. Accordingly, the pair of lens units are disposed in symmetry with respect to the axis normal to the surface of the sample 7.

With this arrangement, the sixth optical apparatus forms a Greenough stereoscopic microscope and hence makes it possible to view the sample stereoscopically.

A seventh optical apparatus according to the present invention has a structure similar to that of the fifth optical apparatus. In the seventh optical apparatus, the observation optical system unit and the imaging optical system unit are placed so that a plane containing the optical axes of the pair of lens units is displaced from the optical axis of the objective.

The operation of the seventh optical apparatus will be described. In the seventh optical apparatus, as shown in part (a) of FIG. 4, a plane containing the optical axes of two independent observation optical systems is displaced from the optical axis of the objective 1 away from the reflecting member 6.

Figure 4A:
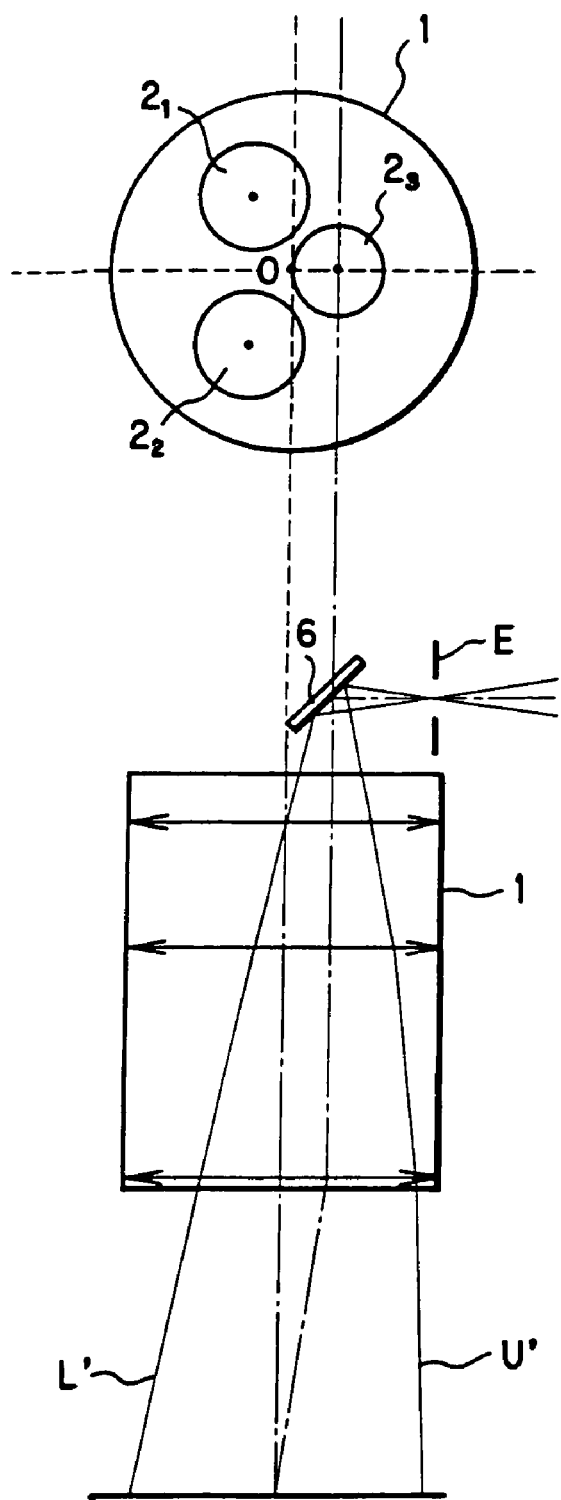
FIG. 4 is a diagram showing the relationship between the positions of two observation optical systems and a reflecting member with respect to an objective on the one hand and illuminating light passing through the objective on the other, in which part (a) shows a case where an imaginary line connecting the centers of the two observation optical systems is displaced from the optical axis of the objective, and part (b) shows a case where the optical axis of the objective lies on the imaginary line connecting the centers of the two observation optical system.
Figure 4B:
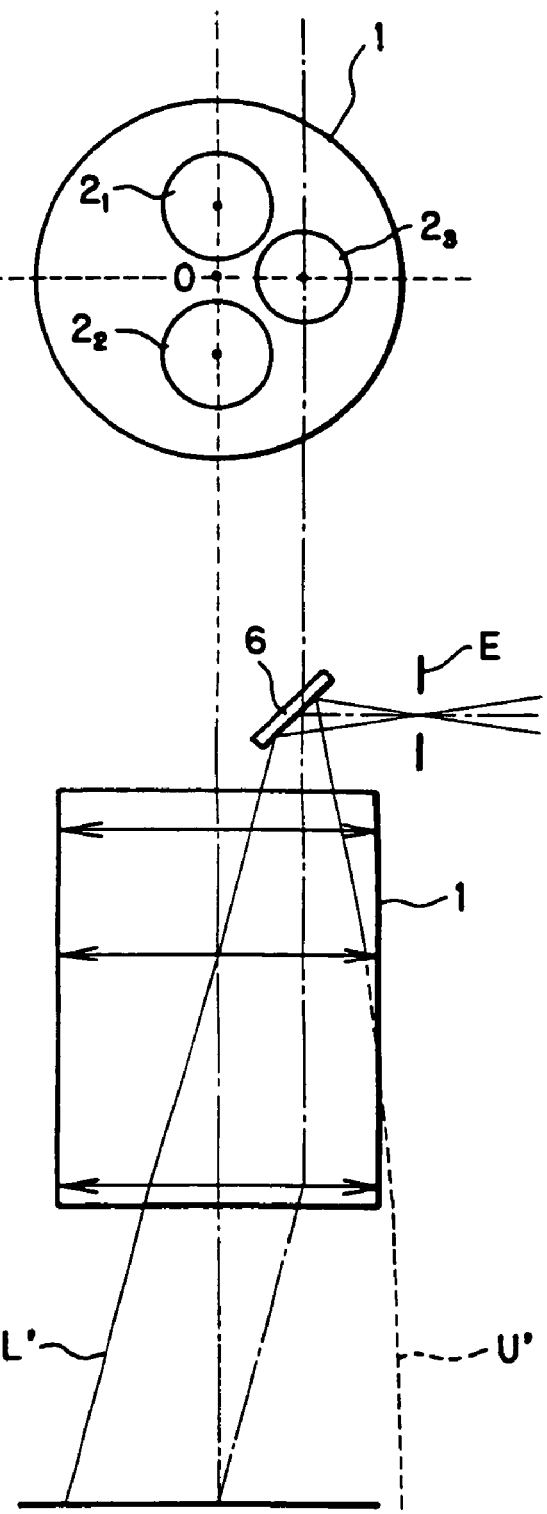

More specifically, in part (a) of FIG. 4, the upper figure is a sectional view taken along a plane of the objective 1 near the reflecting member 6, and the lower figure is a side view of the objective 1. In FIG. 4, reference numeral 1 denotes an objective, and reference numerals 21 and 22 denote the areas of light beams led into two independent observation optical systems, which are formed from a pair of units. Reference numeral 23 denotes an area through which excitation light deflected by the reflecting member 6 passes. Reference symbol O denotes the position of the optical axis of the objective 1, and reference symbol E denotes the pupil position of the illumination optical system in the fluorescence illumination apparatus A, which is conjugate to the pupil position of the observation optical system. The side view shows the optical path of excitation light in the objective 1. As shown in part (a) of FIG. 4, a plane containing the optical axes of the two independent observation optical systems is displaced from the optical axis O of the objective 1 away from the reflecting member 6, whereby when excitation light from the fluorescence illumination apparatus A is deflected by the reflecting member 6 so as to enter the objective 1 to illuminate the sample 7, peripheral rays L' and U' of excitation light can illuminate the sample 7 without being eclipsed in the objective 1.

On the other hand, part (b) of FIG. 4 shows a condition in which the optical axis of the objective 1 is not displaced from the plane containing the optical axes of the two independent observation optical systems. In this case, a marginal ray U' of excitation light that is incident on the pupil position E at a large angle is eclipsed in the objective 1 and cannot illuminate the observation area.

An eighth optical apparatus according to the present invention has a structure similar to that of the first optical apparatus. In the eighth optical apparatus, at least one lens unit of the illumination optical system in the fluorescence illumination apparatus is movable so that the illumination area of the illumination optical system is approximately coincident with the observation area, which changes in accordance with a magnification changing operation of the observation optical system in the observation optical system unit.

The operation of the eighth optical apparatus will be described. In the eighth optical apparatus, the fluorescence illumination apparatus has a moving mechanism, and the illumination optical system has at least one movable lens unit. It is preferable that the position of an image of the light source projected by the illumination optical system should be approximately conjugate to the pupil position of the observation optical system. The reason for this is that if the position of the projected image of the light source is not approximately conjugate to the pupil position of the observation optical system, the marginal rays of the illuminating light beam cannot reach the sample. In the eighth optical apparatus, even when the pupil position of the observation optical system varies owing to a magnification changing operation of the observation optical system, because at least one lens unit in the illumination optical system can be moved by a moving mechanism 15' shown in FIG. 1, the pupil position of the illumination optical system and the pupil position of the observation optical system can be made approximately coincident with each other. Consequently, the observation area and the illumination area can be made coincident with each other. Thus, it is possible to obtain an observation image similar to that obtained with the conventional fluorescence microscope.

A ninth optical apparatus according to the present invention has a structure similar to that of the eighth optical apparatus. In the ninth optical apparatus, the illumination optical system has a collector lens unit for collecting light from the light source, a first relay lens unit for forming a first image of the light source, and a second relay lens unit for relaying the first image of the light source. A first reflecting member is placed in the first relay lens unit. An aperture stop is placed in the vicinity of the first image of the light source. At least one movable lens unit and a second reflecting member are placed in the second relay lens unit. First wavelength selecting members are interchangeably provided in the illumination optical system.

Figures 5A, 5B:
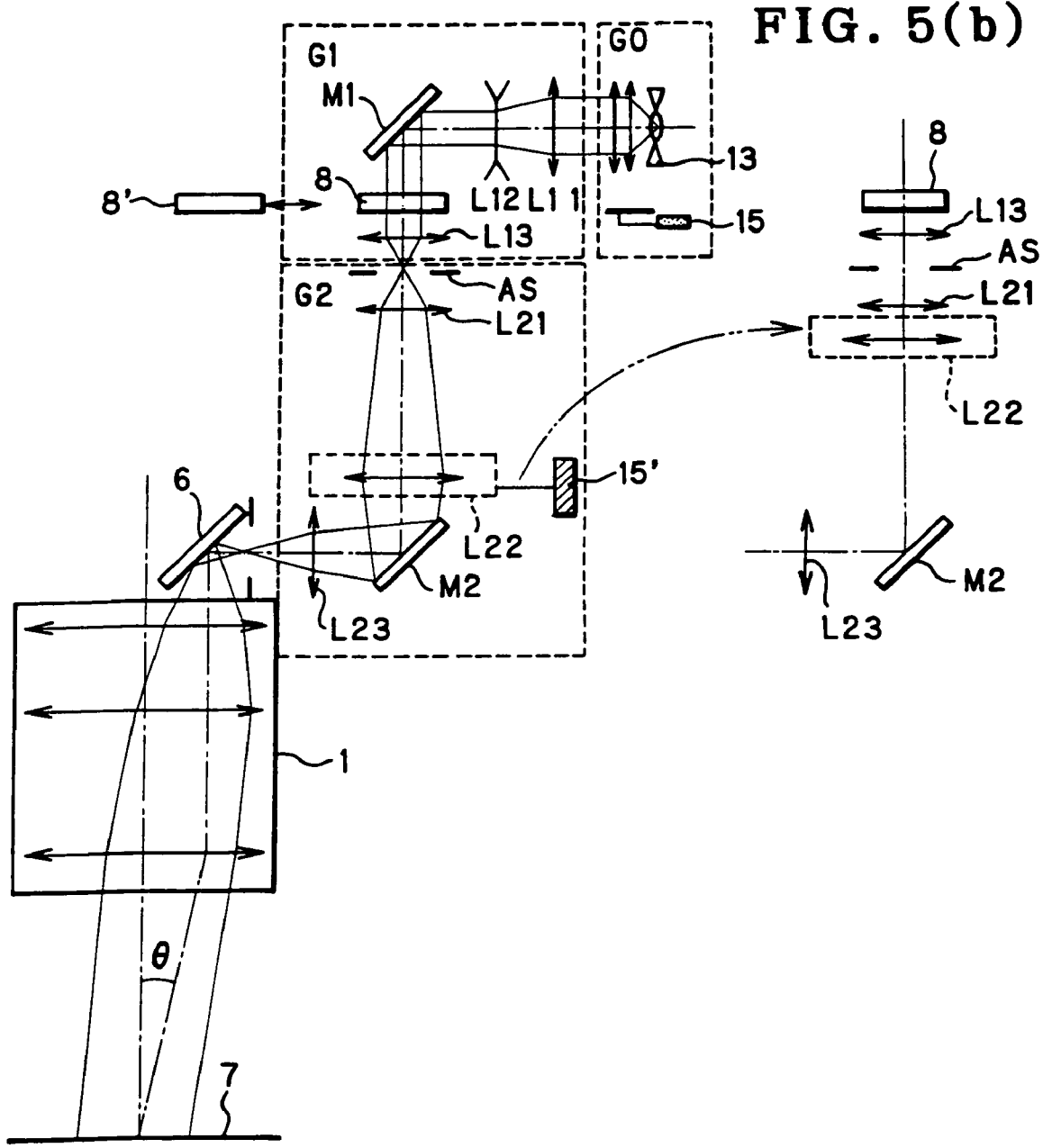
FIG. 5 is a detailed view showing the arrangement of a fluorescence illumination apparatus in a ninth optical apparatus according to the present invention.
Figures 6A, 6B:
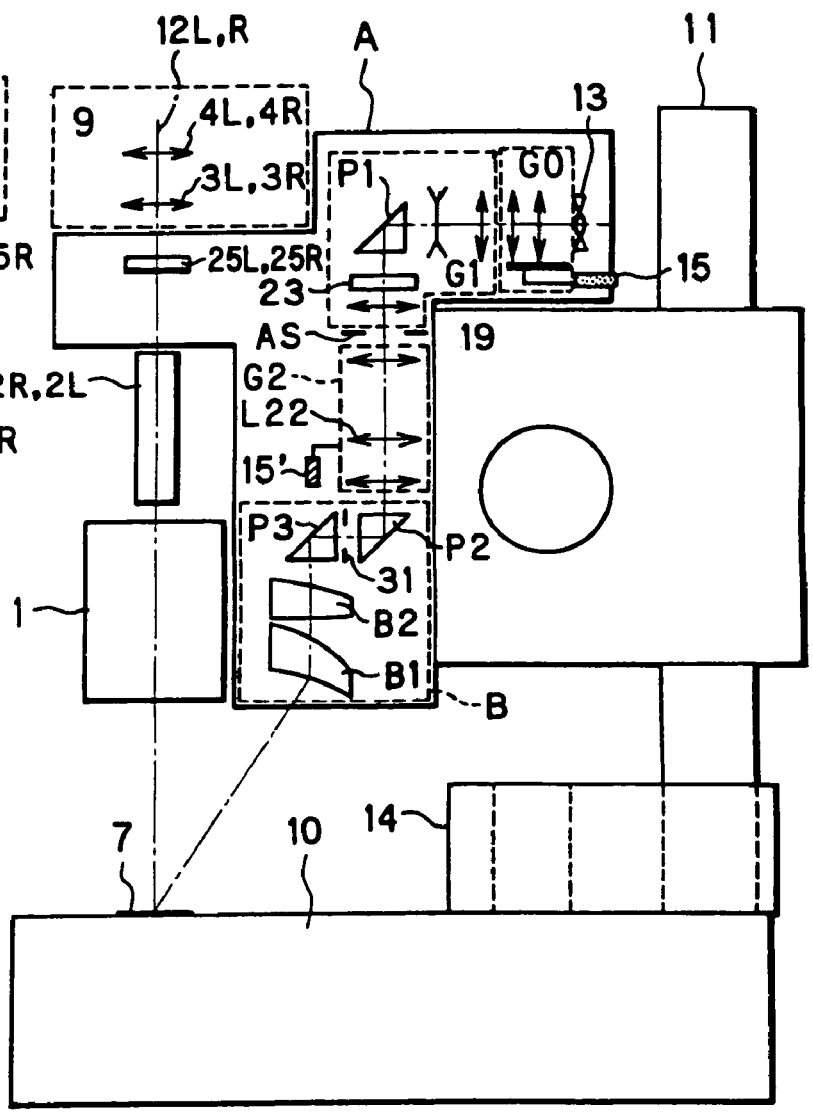
FIG. 6 is a diagram showing the arrangement of a thirteenth optical apparatus according to the present invention, in which parts (a) and (b) are side and front views, respectively, of the optical apparatus as equipped with a distal end illumination unit that performs illumination directly without using an objective.

The operation of the ninth optical apparatus will be described. FIGS. 5 and 6 show the arrangement of the optical apparatus. In FIG. 5, the illumination optical system has, in order from the light source 13, a collector lens unit G0 for collecting light from the light source 13, a first relay lens unit G1 for forming a first image of the light source 13, a second relay lens unit G2 for relaying the first image of the light source 13, and the reflecting member 6, which is placed between the observation optical systems 2L and 2R and the objective 11. A first reflecting member M1 is provided in the first relay lens unit G1. An aperture stop AS is placed in the vicinity of the first image of the light source 13. A movable lens unit L22 and a second reflecting member M2 are provided in the second relay lens unit G2. In addition, excitation filters 8 and 8' as first wavelength selecting members are interchangeably provided in the illumination optical system as shown by the double-headed arrow.

Thus, illuminating light from the light source 13 is collected by the collector lens unit G0, and light of wavelength for illuminating the sample 7 is selectively transmitted as excitation light by the excitation filter 8 placed in the first relay lens unit G1. The first relay lens unit G1 forms a first image of the light source 13. An aperture stop is placed in the vicinity of the first image of the light source 13. The second relay lens unit G2 projects the first image in the vicinity of a position approximately conjugate to the pupil position of each of the observation optical systems 2L and 2R.

The observation optical system has a variable magnification optical system and is capable of changing the size of the observation image. However, when the magnification is changed, the pupil position and pupil diameter of each of the observation optical systems 2L and 2R change. Consequently, the position where the image of the light source 13 is projected fails to be conjugate to the pupil position of each of the observation optical systems 2L and 2R. Therefore, to make the second image of the light source 13 coincident with a position conjugate to the pupil position and to adjust the light source image to an optimum size with respect to the pupil diameter, the lens unit L22 in the second relay lens unit G2 is adapted to be movable in the optical axis direction as shown in part (b) of FIG. 5 by the moving mechanism 15'. Thus, by moving the lens unit L22 in the second relay lens unit G2 in the optical axis direction in association with the change in magnification of the observation optical systems 2L and 2R, the illumination area is allowed to change in accordance with the change of the observation area caused by the magnification changing operation of the observation optical systems 2L and 2R. Moreover, the size of the projected image of the light source 13 becomes approximately coincident with the pupil diameter of the observation optical systems 2L and 2R, and the projected image of the light source 13 fills the pupil of each of the observation optical systems 2L and 2R. Accordingly, the optical apparatus is excellent in operability and allows bright fluorescence observation.

It should be noted that the aperture stop AS placed in the vicinity of the first image of the light source 13 functions as a device for adjusting the illumination intensity of excitation light.

With the above-described arrangement, the illumination optical system functions as a Koehler illumination system. Accordingly, it is possible to perform bright and uniform illumination.

A tenth optical apparatus according to the present invention has a structure similar to that of the first or ninth optical apparatus. In the tenth optical apparatus, the distance between the collector lens unit and the light source is changed to allow critical illumination in which the position where the image of the light source is projected and the sample are approximately coincident with each other.

An eleventh optical apparatus according to the present invention has a structure similar to that of the tenth optical apparatus. In the eleventh optical apparatus, the collector lens unit is movable relative to the light source independently of the magnification changing operation of the observation optical systems in the observation optical system unit, and the distance D between the light source and a conjugate position to the sample closest to the light source in the fluorescence illumination optical system satisfies the following condition:

$|D| \leq 3$ millimeters

The operation of the tenth and eleventh optical apparatus will be described. The tenth optical apparatus has a moving mechanism 15 capable of changing the distance between the collector lens unit G0 and the light source 13. With this arrangement, the position where the image of the light source is projected and the sample surface can be made approximately coincident with each other. Therefore, it is possible to realize critical illumination. Accordingly, it is possible to choose between Koehler illumination, which allows the entire observation area to be illuminated, and critical illumination, which allows only the central portion of the observation area to be illuminated even more brightly, according to need. Therefore, the tenth optical apparatus is excellent in operability. In particular, a dark fluorescence image can be viewed even more brightly when critical illumination is used.

In the eleventh optical apparatus, the distance between the collector lens unit G0 and the light source 13 is variable independently of the movement of the lens unit that moves in association with the magnification changing operation of the observation optical system. In addition, the distance D between the light source 13 and a conjugate position to the sample closest to the light source 13 in the illumination optical system satisfies the following condition:

$|D| \leq 3$ millimeters

With this arrangement, critical illumination can be realized by varying the distance between the light source 13 and the collector lens unit G0 while collecting high numerical aperture light from the light source 13 by the collector lens unit G0 without waste. As a result, it is possible to choose between Koehler illumination, which allows the entire observation area to be illuminated, and critical illumination, which allows only the central portion of the observation area to be illuminated even more brightly. Therefore, the optical apparatus is improved in operability and allows a dark fluorescence image to be viewed even more brightly.

A twelfth optical apparatus according to the present invention has a structure similar to that of the third optical apparatus. The twelfth optical apparatus has a mechanism by which the first wavelength selecting member and the second wavelength selecting member are changed to another first wavelength selecting member and another second wavelength selecting member, respectively, in linked relation to each other.

The operation of the twelfth optical apparatus will be described below. The optical apparatus has a mechanism by which the excitation filter 8, which is a first wavelength selecting member, and the absorption filter 5, which is a second wavelength selecting member, are changed to another excitation filter 8 and another absorption filter 5, respectively, in linked relation to each other. Thus, because the excitation filter 8 and the absorption filter 5 are inserted into and withdrawn from the optical path in linked relation to each other, it is possible to readily select an optimum combination of an excitation filter 8 and an absorption filter 5 for each particular fluorescent dye used. Consequently, operability is improved to a considerable extent.

A thirteenth optical apparatus according to the present invention includes an observation apparatus and a fluorescence illumination apparatus removably attached to the observation apparatus. The observation apparatus has an objective, an observation optical system unit including a variable magnification optical system, and an imaging optical system unit including an imaging lens and an eyepiece.

The fluorescence illumination apparatus has a light source and a distal end illumination unit placed in close proximity to the objective. The fluorescence illumination apparatus further has an illumination optical system placed between the light source and the distal end illumination unit to lead illuminating light from the light source to the distal end illumination unit.

A first wavelength selecting member for selectively transmitting light in a specific wavelength region in the illuminating light is placed between the light source and the distal end illumination unit. A second wavelength selecting member for selectively transmitting light in the wavelength region of fluorescent light emitted from a sample is placed between the objective and the imaging optical system unit.

The distal end illumination unit is placed at the periphery of the objective so that the center position of an observation optical system in the observation optical system unit and the center position of illuminating light applied by the fluorescence illumination apparatus coincide with each other on the sample surface.

The illumination optical system has at least one movable lens unit and a moving mechanism. The movable lens unit is moved in accordance with a change in magnification of the observation optical system to make the observation area and the illumination area approximately coincident with each other.

A fourteenth optical apparatus according to the present invention has a structure similar to that of the thirteenth optical apparatus. In the fourteenth optical apparatus, the second wavelength selecting member is integrated with the fluorescence illumination apparatus.

A fifteenth optical apparatus according to the present invention has a structure similar to that of the fourteenth optical apparatus. In the fifteenth optical apparatus, the second wavelength selecting member is integrated with the first wavelength selecting member.

A sixteenth optical apparatus according to the present invention has a structure similar to that of the thirteenth optical apparatus. In the sixteenth optical apparatus, the fluorescence illumination apparatus illuminates the sample with light from the light source through the distal end illumination unit without passing through the objective.

The operation of the thirteenth, fourteenth, fifteenth and sixteenth optical apparatus will be described with reference to FIG. 6. Part (a) of FIG. 6 is a side view, and part (b) of FIG. 6 is a front view.

The thirteenth optical apparatus includes an observation apparatus and a fluorescence illumination apparatus A removably attached to the observation apparatus. The observation apparatus has an objective 1, observation optical system units 2L and 2R each including a variable magnification optical system and an imaging optical system unit 9 including imaging lenses 3L and 3R and eyepieces 4L and 4R. The fluorescence illumination apparatus A has an illumination optical system having a light source 13, a plurality of lens units including a collector lens unit G0, and reflecting members. The fluorescence illumination apparatus A further has a distal end illumination unit B disposed in close proximity to the objective 1. In addition, a first wavelength selecting member for selectively transmitting light of specific wavelength to illuminate a sample 7, that is, an excitation filter 23, is provided between the light source 13 and the distal end illumination unit B. The fluorescence illumination apparatus A illuminates the sample 7 in such a manner that the center position of the observation optical system and the center position of illuminating light applied by the illumination optical system coincide with each other on the sample surface. Fluorescent light emitted from the sample 7 passes through absorption filters 25L and 25R serving as second wavelength selecting members for selectively transmitting light of fluorescence wavelength. It should be noted that the absorption filters 25L and 25R are placed between the objective 1 and the imaging optical system unit 9. In addition, the optical apparatus has a moving mechanism 15' that moves at least one lens unit in the fluorescence illumination apparatus A in association with a magnification changing operation of the observation optical system so that the observation area and the illumination area are approximately coincident with each other. Thus, because the optical apparatus has a mechanism that makes the observation area and the illumination area approximately coincident with each other, efficient illumination can be performed.

The fourteenth optical apparatus has a structure similar to that of the thirteenth optical apparatus. In the fourteenth optical apparatus, the absorption filters 25R and 25L serving as second wavelength selecting members for selectively transmitting fluorescent light are integrated with the fluorescence illumination apparatus A into one unit, thereby allowing the fluorescence illumination apparatus A to be readily combined with a conventional observation apparatus. Accordingly, it is possible to perform fluorescence observation with a conventional optical apparatus that does not allow fluorescence observation by itself.

The fifteenth optical apparatus has a structure similar to that of the thirteenth optical apparatus. In the fifteenth optical apparatus, the absorption filters 25R and 25L serving as second wavelength selecting members and an excitation filter as a first wavelength selecting member are integrated into one unit as in the case of the arrangement shown in FIG. 1, thereby facilitating changing filters and thus allowing the system to be handled easily.

In the sixteenth optical apparatus according to the present invention, because excitation light does not pass through the objective 1 but passes through the distal end illumination unit B in the fluorescence illumination optical system to illuminate the sample 7, autofluorescence does not occur from the objective 1 or the observation optical systems 2L and 2R. Accordingly, it becomes possible to view a sample image with high contrast.

A seventeenth optical apparatus according to the present invention has a structure similar to that of the thirteenth optical apparatus. In the seventeenth optical apparatus, the distal end illumination unit has lenses. At least one lens in the distal end illumination unit is placed so that the optical axis of the lens is displaced from the optical axis of the distal end illumination unit.

An eighteenth optical apparatus according to the present invention has a structure similar to that of the thirteenth optical apparatus. In the eighteenth optical apparatus, the distal end illumination unit includes an optical member that is formed only from plane surfaces and that makes incident light emerge therefrom only by a refracting action.

Figure 7A:
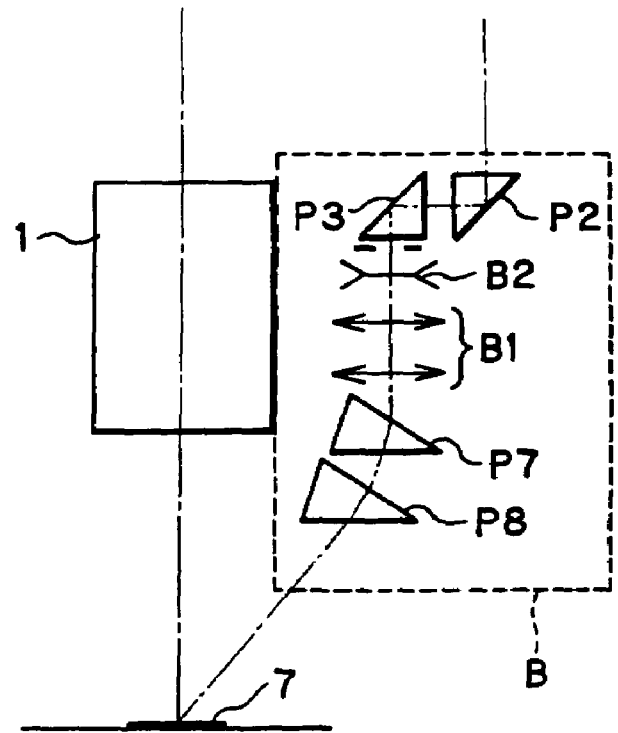
FIG. 7 is a diagram showing the arrangement of eighteenth and nineteenth optical apparatus according to the present invention wherein a prism is used as a distal end illumination unit, in which part (a) shows a case where wedge prisms are used, and part (b) shows a case where a deflection prism is used.
Figure 7B:
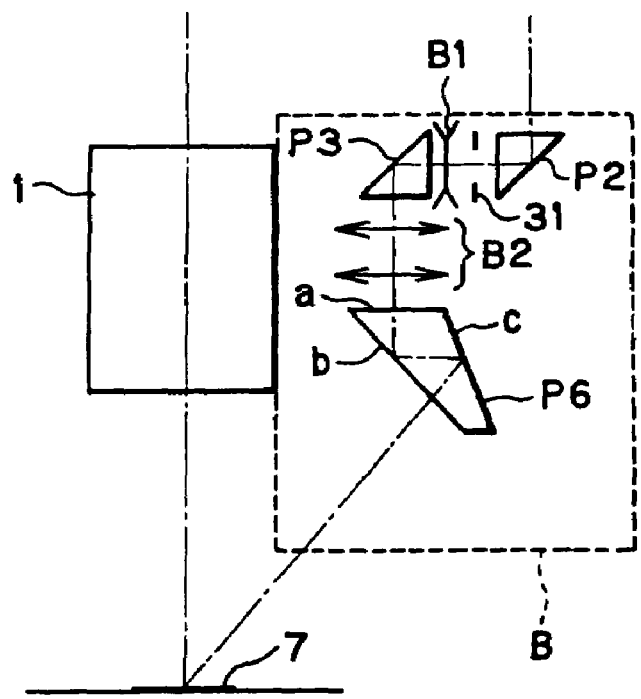
Figure 8A:
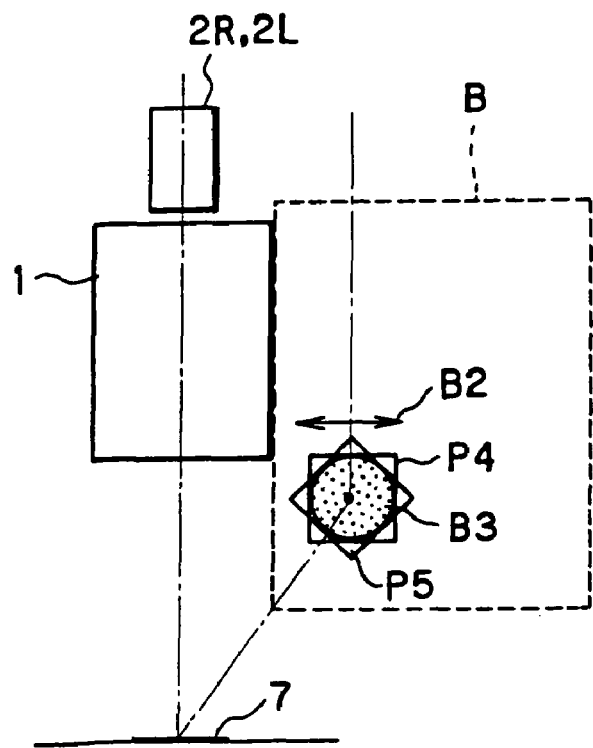
FIG. 8 is a diagram showing the arrangement of twentieth and twenty-first optical apparatus according to the present invention wherein a prism is used as a distal end illumination unit, in which: part (a) is a side view of an optical system using two prisms; part (b) is a rear view of the optical system using two prisms; part (c) is a side view of an optical system using four prisms; and part (d) is a rear view of the optical system using four prisms.
Figure 8B:
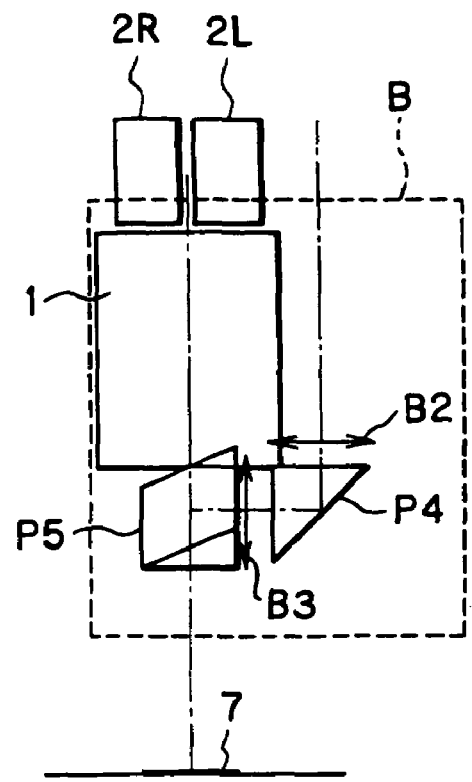
Figure 8C:
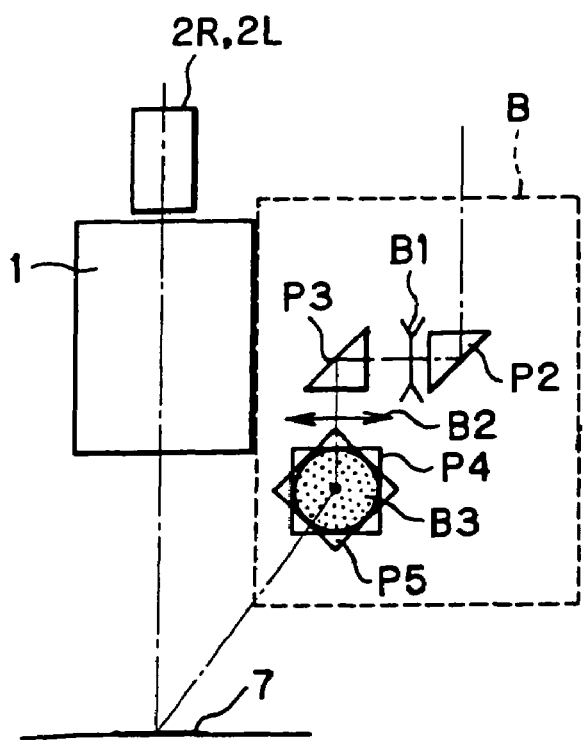
Figure 8D:
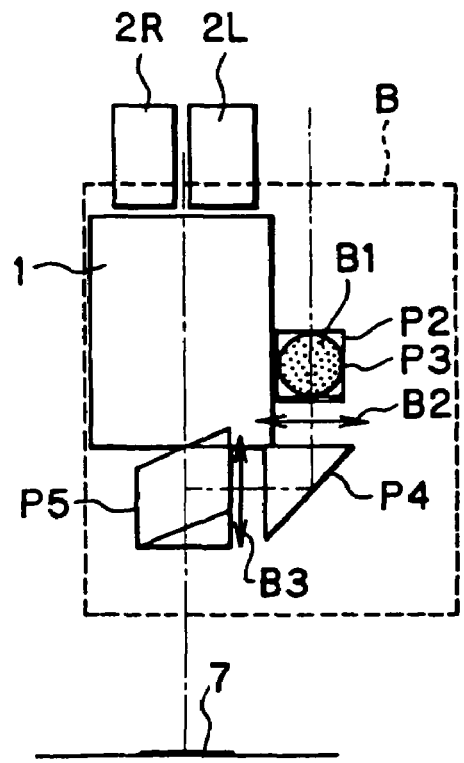

The operation of the seventeenth and eighteenth optical apparatus will be described. In the seventeenth optical apparatus, as shown in part (a) of FIG. 6, lenses B1 and B2 in the distal end illumination unit B are decentered with respect to the optical axis of the distal end illumination unit B. In the eighteenth optical apparatus, as shown in part (a) of FIG. 7, wedge prisms P7 and P8 are provided in the distal end illumination unit B. Providing optical elements in the distal end illumination unit B as illustrated in the figure enables the optical axis of the fluorescence illumination optical system and the optical axis of the objective 1 to coincide with each other on the sample surface and hence allows efficient illumination.

A nineteenth optical apparatus according to the present invention has a structure similar to that of the thirteenth optical apparatus. In the nineteenth optical apparatus, the distal end illumination unit includes an optical member that is formed only from plane surfaces and that makes incident light emerge therefrom by a refracting action and a reflecting action.

The operation of the nineteenth optical apparatus will be described. In the nineteenth optical apparatus, as shown in part (b) of FIG. 7, at least one deflection prism P6 is provided in the distal end illumination unit B. Excitation light entering the deflection prism P6 is refracted by a first surface a of the deflection prism P6, totally reflected by a second surface b of the deflection prism P6 and reflected by a third surface c of the deflection prism P6 to exit the deflection prism P6 by passing through the second surface b, which also serves as a refracting surface. Then, the excitation light illuminates the sample 7.

Thus, in the nineteenth optical apparatus, the distal end illumination unit B can be simplified in structure and constructed in a compact form by using the deflection prism P6. In addition, because the surface b acts as a totally reflecting surface, the loss of excitation light intensity is reduced in comparison to a case where a reflecting mirror is used.

A twentieth optical apparatus according to the present invention has a structure similar to that of the thirteenth optical apparatus. In the twentieth optical apparatus, the distal end illumination unit includes, in order from the fluorescence illumination optical system side, a first deflection member and a second deflection member provided in a plane perpendicular to a plane containing both the optical axis of the objective and the optical axis of the illumination optical system entering the distal end illumination unit. The first deflection member deflects the optical axis of the illumination optical system. The second deflection member deflects the optical axis deflected by the first deflection member so that the optical axis extends obliquely to the sample surface in a plane containing the optical axis of the objective.

A twenty-first optical apparatus according to the present invention has a structure similar to that of the twentieth optical apparatus. In the twenty-first optical apparatus, the distal end illumination unit further includes at least two third deflection members for deflecting the optical axis of the illumination optical system. The at least two third deflection members are provided closer to the light source than the first deflection member in a plane perpendicular to a plane containing both the optical axis of the illumination optical system entering the distal end illumination unit and the optical axis of the objective.

The operation of the twentieth and twenty-first optical apparatus will be described. The twentieth optical apparatus has two deflection members in the distal end illumination unit B in the thirteenth optical apparatus. As shown in parts (a) and (b) of FIG. 8, which are side and front views, illuminating light entering the distal end illumination unit B is led onto the sample 7 by prisms P4 and P5, which are deflection members. Because the optical axis of illuminating light can be set at a position apart from the optical axis of the objective 1 by the prisms P4 and P5, the light source can be placed apart from the observation apparatus. In addition, the distal end illumination unit B can be constructed in a compact form.

As shown in parts (c) and (d) of FIG. 8, which are side and front views, the twenty-first optical apparatus has two prisms P2 and P3 placed on the light source side of the prism P4 as additional deflection members to repeat deflection through the prisms P2, P3, P4 and P5 in the order mentioned. With this arrangement, the light source can be placed more away from the observation apparatus, and the degree of freedom for the layout of the illumination optical path increases. Therefore, it is possible to construct the distal end illumination unit in a compact form while maintaining the required illumination performance.

A twenty-second optical apparatus according to the present invention has a structure similar to that of the thirteenth optical apparatus. In the twenty-second optical apparatus, the distal end illumination unit includes an optical member having at least two toric surfaces.

A twenty-third optical apparatus according to the present invention has a structure similar to that of the thirteenth optical apparatus. In the twenty-third optical apparatus, the distal end illumination unit includes an optical member having at least one surface that is asymmetric with respect to the optical axis.

Figure 9:
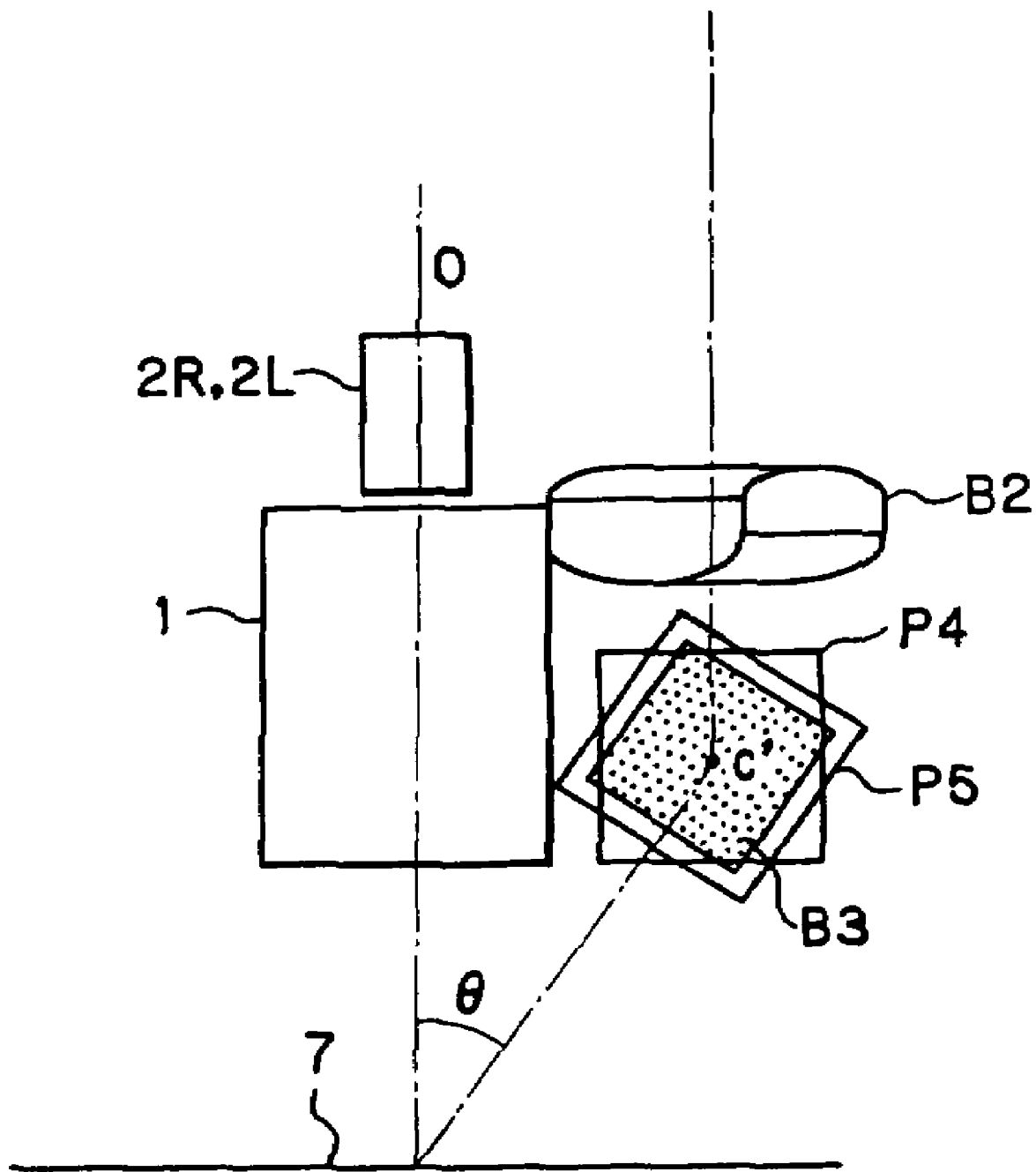
FIG. 9 is a diagram showing the arrangement of a twenty-second optical apparatus according to the present invention wherein a toric lens is used as a distal end illumination unit.

The operation of the twenty-second and twenty-third optical apparatus will be described. The twenty-second optical apparatus has an optical member with two toric surfaces in the distal end illumination unit B in the thirteenth optical apparatus. As shown in FIG. 9, illuminating light entering the distal end illumination unit is incident on a toric lens B2 having two toric surfaces. The radius of curvature of one surface of the toric lens B2 and that of the other surface may be the same or different from each other. In a case where the radius of curvature of one surface and that of the other surface are different from each other, a light beam passing through the toric lens B2 becomes elliptical. Accordingly, even in a case where illuminating light (excitation light) is applied obliquely to the sample 7 (oblique illumination), the illumination area on the sample 7 can be made circular.

The twenty-third optical apparatus has an optical element with an asymmetric surface in the distal end illumination unit B in the thirteenth optical apparatus. The optical element provides the same action and effect as a toric lens. With respect to oblique illumination, the arrangement of the twenty-third optical apparatus exhibits high aberration correcting capability. Therefore, the illumination area can be illuminated even more uniformly.

A twenty-fourth optical apparatus according to the present invention has a structure similar to that of the twenty-second optical apparatus. The twenty-fourth optical apparatus satisfies the following conditions:

$$Fy < Fx$$

$$0.8 < (Fy/Fx)/\cos\theta < 1.2$$

In the above conditions, $\theta$ is the angle formed between the optical axis of the illumination optical system exiting the distal end illumination unit B and the optical axis of the objective 1. Fx is the focal length of the distal end illumination unit B in the direction of the minor axis of an elliptical illumination area formed on the sample when it is illuminated by an illumination optical system formed from a rotationally symmetric optical system. Fy is the focal length of the distal end illumination unit B in the direction of the major axis of the elliptical illumination area, which is perpendicular to the direction of the minor axis.

A twenty-fifth optical apparatus according to the present invention has a structure similar to that of the twenty-second optical apparatus. The twenty-fifth optical apparatus satisfies the following conditions:

$$|My| < |Mx|$$

$$0.8 < (|My|/|Mx|)/\cos\theta < 1.2$$

In the above conditions, $\theta$ is the angle formed between the optical axis of the illumination optical system exiting the distal end illumination unit B and the optical axis of the objective. Mx is the projection magnification of the optical system of the distal end illumination unit B in the direction of the minor axis of an elliptical illumination area formed on the sample when it is illuminated at the angle $\theta$ with a rotationally symmetric optical system, which is obtained by Mx=I/Ix', where I is the sample and Ix' is a sample image formed by the distal end illumination unit B. My is the projection magnification of the optical system of the distal end illumination unit B in the direction of the major axis of the elliptical illumination area, which is perpendicular to the direction of the minor axis. The projection magnification My is obtained by My=I/Iy', where I is the sample and Iy' is a sample image formed by the distal end illumination unit B.

The operation of the twenty-fourth and twenty-fifth optical apparatus will be described. In a case where the illumination optical system is formed from a rotationally symmetric circular optical member and illuminating light is applied obliquely to the sample, the illuminating light beam becomes elliptical on the sample. On the other hand, the observation area is circular. Therefore, the illumination area (elliptical) and the observation area (circular) do not coincide with each other. Accordingly, the distal end illumination unit of the optical apparatus is arranged to satisfy the above-described conditions, whereby the illumination area can be formed into an approximately circular shape. As a result, even when the exit-side optical axis of the distal end illumination unit is tilted with respect to the optical axis of the objective, illumination can be effected with satisfactorily high efficiency.

A twenty-sixth optical apparatus according to the present invention has a structure similar to that of the thirteenth optical apparatus. The twenty-sixth optical apparatus satisfies the following condition:

$$0.7 \leq Fob/F \leq 1.2$$

where F is the focal length of the optical system of the distal end illumination unit, and Fob is the focal length of the objective.

A twenty-seventh optical apparatus has a structure similar to that of the thirteenth optical apparatus. The twenty-seventh optical apparatus satisfies the following condition:

$$0.5 \leq Sob/S \leq 1.4$$

where S is the square measure of an area illuminated by the distal end illumination unit, and Sob is the square measure of an area viewed with the objective.

The operation of the twenty-sixth and twenty-seventh optical apparatus will be described. The objective of the optical apparatus is interchangeable. Accordingly, when another objective is used, the observation area and the working distance change. Therefore, it is desirable that the distal end illumination unit should be interchangeable for each particular objective used. In this case, if the distal end illumination unit satisfies the above-described condition, Koehler illumination can be performed in a state where the illumination area and illumination intensity of illuminating light are adjusted optimally even when the observation area and the working distance change as a result of changing objectives.

A twenty-eighth optical apparatus according to the present invention has a structure similar to that of the thirteenth optical apparatus. In the twenty-eighth optical apparatus, a region of a lens unit of the objective that is closest to the sample is used as a lens unit of the distal end illumination unit.

The operation of the twenty-eighth optical apparatus will be described. The distal end illumination unit is placed in close proximity to the outer periphery of the objective. Therefore, the horizontal position of the lens of the objective that is closest to the sample and that of the lens unit of the distal end illumination unit are approximately the same. Accordingly, by enlarging the diameter of the lens of the objective that is closest to the sample, a peripheral portion of the objective can be used as a lens unit of the distal end illumination unit. With this arrangement, the optical axis of the distal end illumination unit and the optical axis of the objective can be made coincident with each other on the sample.

A twenty-ninth optical apparatus according to the present invention has a structure similar to that of the thirteenth optical apparatus. The twenty-ninth optical apparatus has a frame for holding a sample and a post installed on the frame. The optical apparatus further has a focusing unit held on the post to change the distance between the sample and the objective. The focusing unit holds the fluorescence illumination apparatus. The fluorescence illumination apparatus holds the observation apparatus.

The operation of the twenty-ninth optical apparatus is the same as stated above with respect to the fourth optical apparatus.

A thirtieth optical apparatus according to the present invention has a structure similar to that of the thirteenth optical apparatus. In the thirtieth optical apparatus, the observation optical system unit and the imaging optical system unit are each formed from a pair of lens units. The pair of lens units are placed in parallel and symmetry with respect to the optical axis of the objective.

The operation of the thirtieth optical apparatus is the same as stated above with respect to the fifth optical apparatus.

A thirty-first optical apparatus according to the present invention has a structure similar to that of the thirteenth optical apparatus. In the thirty-first optical apparatus, the objective, the observation optical system unit and the imaging optical system unit are each formed from a pair of lens units. Each pair of lens units are placed at a tilt to an axis normal to the sample surface and in symmetry with respect to the axis.

The operation of the thirty-first optical apparatus is the same as stated above with respect to the sixth optical apparatus.

A thirty-second optical apparatus according to the present invention has a structure similar to that of the thirteenth optical apparatus. In the thirty-second optical apparatus, the illumination optical system has a collector lens unit for collecting light from the light source, a first relay lens unit for forming a first image of the light source, and a second relay lens unit for relaying the first image of the light source. An aperture stop is placed in the vicinity of the first image of the light source. At least one movable lens unit is provided in the second relay lens unit.

The operation of the thirty-second optical apparatus will be described. As shown in FIG. 6, the illumination optical system has a light source 13, a collector lens unit G0 for collecting light from the light source 13, a first relay lens unit G1 for forming a first image of the light source 13, a second relay lens unit G2 for relaying the first image of the light source 13, and a distal end illumination unit B. An excitation filter 23 for selectively transmitting light from the light source 13 is provided in the first relay lens unit G1. An aperture stop AS is placed in the vicinity of the first image of the light source 13. At least one movable lens unit L22 is provided in the second relay lens unit G2, and a moving mechanism 15' for moving the lens unit L22 is provided.

With this arrangement, even when the observation area changes owing to a magnification changing operation of the observation optical system, the position where the second image of the light source is projected can be made approximately coincident with a position conjugate to the pupil position of the observation optical system by moving the at least one movable lens unit L22 in the illumination optical system. At the same time, the projection magnification of the illumination optical system changes so that the observation area and the illumination area become approximately the same. Accordingly, Koehler illumination can be performed as in the case of the conventional system. Therefore, it is possible to obtain the same illumination performance and operability as in the case of the conventional fluorescence microscope.

A thirty-third optical apparatus according to the present invention has a structure similar to that of the thirteenth or thirty-second optical apparatus. In the thirty-third optical apparatus, the distance between the collector lens unit and the light source is changed to allow critical illumination in which the position where the image of the light source is projected and the sample are approximately coincident with each other.

The operation of the thirty-third optical apparatus is the same as stated above with respect to the tenth optical apparatus.

A thirty-fourth optical apparatus according to the present invention has a structure similar to that of the thirty-third optical apparatus. In the thirty-fourth optical apparatus, the collector lens unit is movable relative to the light source independently of a magnification changing operation of the observation optical systems in the observation optical system unit, and the distance D between the light source and a conjugate position to the sample closest to the light source in the fluorescence illumination optical system satisfies the following condition:

|D| ≦ 3 millimeters

The operation of the thirty-fourth optical apparatus is the same as stated above with respect to the eleventh optical apparatus.

Next, examples of the optical apparatus according to the present invention will be described.

Example 1

Figures 10A, 10B:
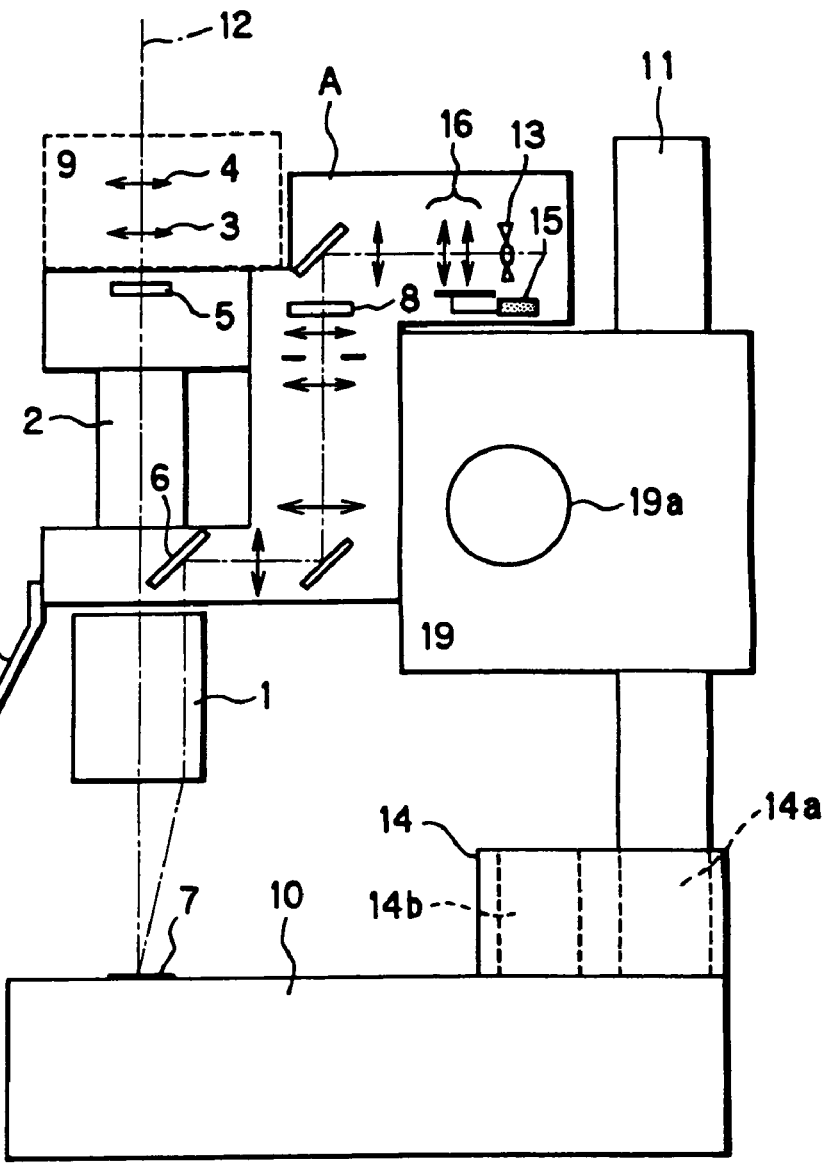
FIG. 10 is a diagram showing the arrangement of an optical apparatus according to Example 1 of the present invention, in which part (a) is a front view showing only a fluorescence observation optical system of the optical apparatus as equipped with a fluorescence illumination apparatus that performs illumination through an objective, and part (b) is a side view showing the entire optical apparatus.
Figure 11A:
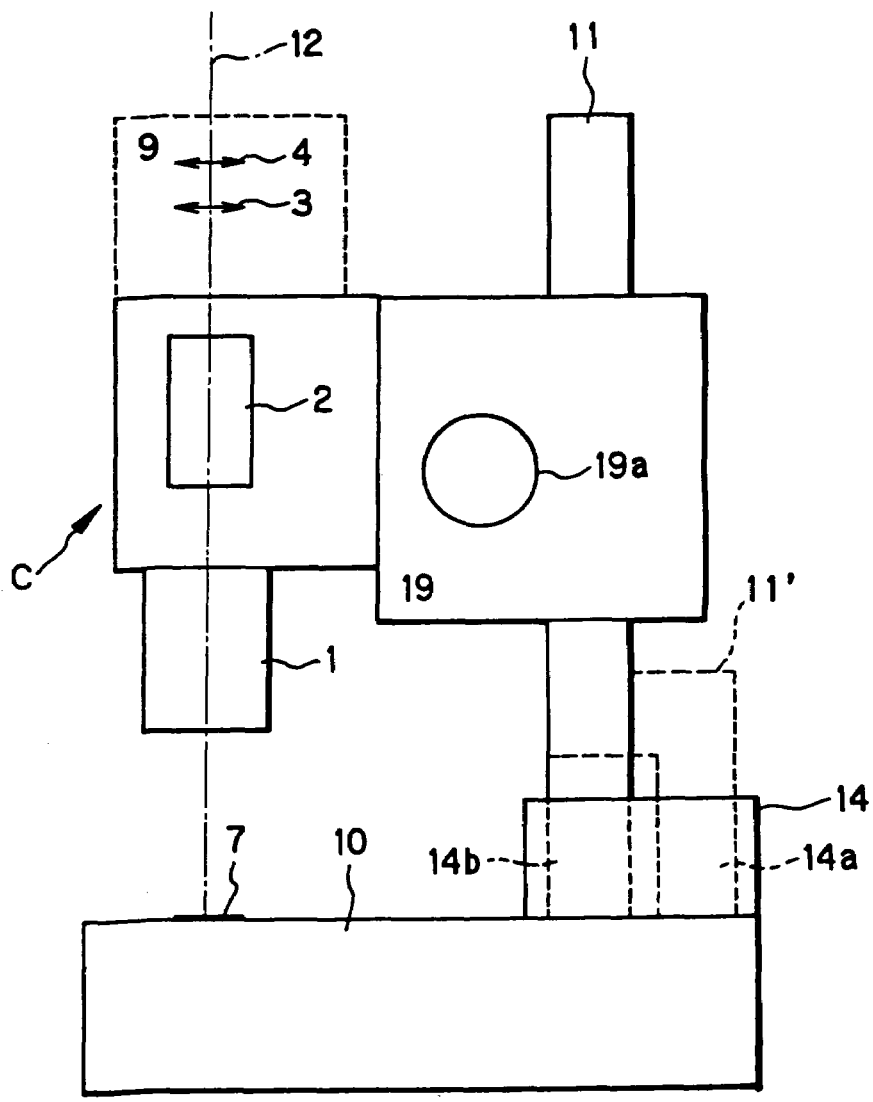
FIG. 11 is a diagram showing an arrangement of the optical apparatus according to Example 1 wherein the fluorescence illumination apparatus is not used, in which part (a) is a side view of the optical apparatus, and part (b) is a diagram showing a frame socket used in the optical apparatus according to Example 1.
Figure 11B:
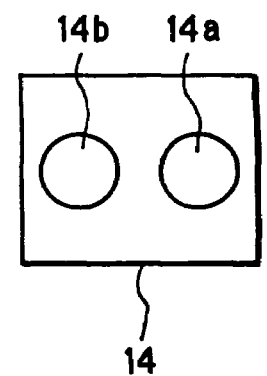

The arrangement of Example 1 of the optical apparatus according to the present invention is shown in FIG. 10. Part (a) of FIG. 10 is a front view of the optical apparatus, which shows only an optical system for viewing fluorescent light. Part (b) of FIG. 10 is a side view of the entire optical apparatus. Part (a) of FIG. 11 is a side view showing the arrangement of the optical apparatus according to Example 1 when a fluorescence illumination apparatus is not used. Part (b) of FIG. 11 shows the arrangement of a frame socket used in the optical apparatus according to Example 1.

The optical apparatus according to Example 1 has a frame 10, a frame socket 14, a post 11, a focusing unit 19, an observation apparatus C, and a fluorescence illumination apparatus A.

The frame 10 serves as a stage for holding a sample 7 and also serves to hold the post 11 through the frame socket 14. As shown in part (b) of FIG. 11, the frame socket 14 is provided with two insertion holes for inserting the post 11. The shape of each insertion hole is coincident with the shape of the post 11, which may be circular or polygonal.

In a state where the frame socket 14 is mounted on the frame 10, an insertion hole 14a provided at a position remote from a sample 7 is employed when the fluorescence illumination apparatus A is used. On the other hand, an insertion hole 14b provided at a position closer to the sample 7 is employed when the fluorescence illumination apparatus A is not used. The distance between the insertion hole 14a and the insertion hole 14b is so set that irrespective of whether or not the fluorescence illumination apparatus A is used, the observation apparatus C is located directly above the sample 7 placed at the same position on the frame 10. Accordingly, as will be understood by comparison of part (a) of FIG. 10, which shows a state where the fluorescence illumination apparatus A is used, and part (a) of FIG. 11, which shows a state where the fluorescence illumination apparatus A is not used, the sample 7 can be viewed through the observation apparatus C without moving the position of the sample 7 in either of the two states.

Optical apparatus of the type shown in FIG. 10 include one in which a transmitted light illumination optical system is provided in the frame 10 to illuminate the sample 7 from the frame 10 side, thereby allowing observation under transmitted light illumination. In such an optical apparatus, because where the sample 7 is placed is determined by the optical axis of the transmitted light illumination optical system, the position of the sample 7 cannot be moved. Therefore, if the optical apparatus is arranged so that the position of the sample 7 is held at a fixed location irrespective of whether or not the fluorescence illumination apparatus is used, it is possible to readily switch between fluorescence observation and observation under transmitted light illumination even in the case of an observation apparatus having a transmitted light illumination optical system.

The arrangement may be such that the frame socket 14 is provided with only one insertion hole, and when the fluorescence illumination apparatus A is used, a straight post is used, whereas when the fluorescence illumination apparatus A is not used, a crank-shaped post 11' is used as shown by the dashed lines. The focusing unit 19 is mounted on the post 11. The fluorescence illumination apparatus A is mounted on the focusing unit 19, and the observation apparatus C is mounted on the fluorescence illumination apparatus A. It should be noted that the observation apparatus C can be mounted directly on the focusing unit 19 without using the fluorescence illumination apparatus A, as stated above. In this case, the arrangement is the same as that of the conventional optical apparatus with which fluorescence observation is not performed. The focusing unit 19 is provided with a focusing knob 19a. Rotation of the focusing knob 19a causes the focusing unit 19 to move toward or away from the frame 10 along the post 11. In accordance with the movement of the focusing unit 19, the distance between the sample 7 and the observation apparatus C changes, and thus the focus condition can be adjusted.

The observation apparatus C has an objective 1, an observation optical system unit 2, and an imaging optical system unit 9. The observation optical system unit 2 has a variable magnification optical system and may further have a relay optical system and an optical path splitting prism according to circumstances. Such optical system components form an observation optical system as a whole. The imaging optical system unit 9 has an imaging lens 3 and an eyepiece 4. These lenses may be integrated into one unit. Alternatively, the imaging lens 3 and the eyepiece 4 may be formed as separate units, which are joined together to form an imaging optical system unit.

The fluorescence illumination apparatus A has a light source 13 and an illumination optical system. The illumination optical system includes a collector lens unit 16, together with a plurality of lens units, a stop, and reflecting members. A reflecting member 6 is provided between the objective 1 and the observation optical system unit 2 to apply illuminating light from the light source 13 to the sample 7. The reflecting member 6 is positioned at a peripheral portion of the objective 1 so as to be decentered with respect to an optical axis 12 of the observation apparatus C (optical axis of the objective 1). Because the reflecting member 6 is placed at a position corresponding to the outside of an observation field determined by the observation optical system unit 2 and the imaging optical system unit 9, it will not interfere with the observation of the sample 7. It is preferable that the reflecting member 6 should be integrated with the fluorescence illumination apparatus A in FIG. 10 from the viewpoint of handling. However, the reflecting member 6 may be separate from the fluorescence illumination apparatus A.

In the optical apparatus according to Example 1, an excitation filter 8 is provided between the light source 13 and the reflecting member 6. The excitation filter 8 has optical characteristics that allow passage of only light in a specific wavelength region in illuminating light from the light source 13. The specific wavelength region selectively transmitted by the excitation filter 8 has previously been selected in conformity to a fluorescent dye or a fluorescence protein used in the sample 7 so that intense fluorescent light emits from the sample 7. Fluorescent light from the sample 7 passes through the objective 1 and the observation optical system unit 2 and is viewed as a fluorescence image through the eyepiece 4 of the imaging optical system unit 9. At this time, illuminating light (excitation light) is reflected from the sample 7, together with fluorescent light. Therefore, an absorption filter 5 is provided between the objective 1 and the imaging optical system unit 9 to transmit only light in the wavelength region of fluorescent light.

Thus, in the first optical apparatus, illuminating light for illuminating the sample 7 does not pass through the observation optical system unit 2. Accordingly, no autofluorescence occurs from the observation optical system in the observation optical system unit 2. Therefore, it is possible to obtain a fluorescence image with high contrast. Although illuminating light passes through the objective 1, where the illuminating light passes is a peripheral portion of the objective 1, and the reflecting member 6 is disposed at a position corresponding to the outside of an observation field determined by the observation optical system unit 2 and the imaging optical system unit 9. Therefore, even if autofluorescence occurs, there is no possibility of autofluorescence light being superimposed on the fluorescence image.

Furthermore, because any desired vitreous material can be freely selected to form the lenses of the objective 1 and those of the observation optical system without a need to care about the occurrence of autofluorescence, the observation apparatus can be formed from a favorably corrected optical system. Similarly, even if autofluorescence occurs in the fluorescence illumination apparatus A, the intensity of autofluorescence light is very weak in comparison to illuminating light. Therefore, no problem arises in terms of illumination. Accordingly, any desired vitreous material can be freely selected to form the illumination optical system without a need to care about the occurrence of autofluorescence. Therefore, it is possible to form the illumination optical system from a favorably corrected optical system.

In the optical apparatus according to Example 1, as shown in FIG. 10, the absorption filter 5 is placed between the observation optical system unit 2 and the imaging optical system unit 9. The absorption filter 5 is formed from a discrete unit separate from the fluorescence illumination apparatus A. However, the absorption filter 5 may be integrated with the fluorescence illumination apparatus. A, as shown in FIG. 1. This arrangement is favorable because installation and removal of the fluorescence illumination apparatus A can be performed easily.

Figures 12A, 12B:
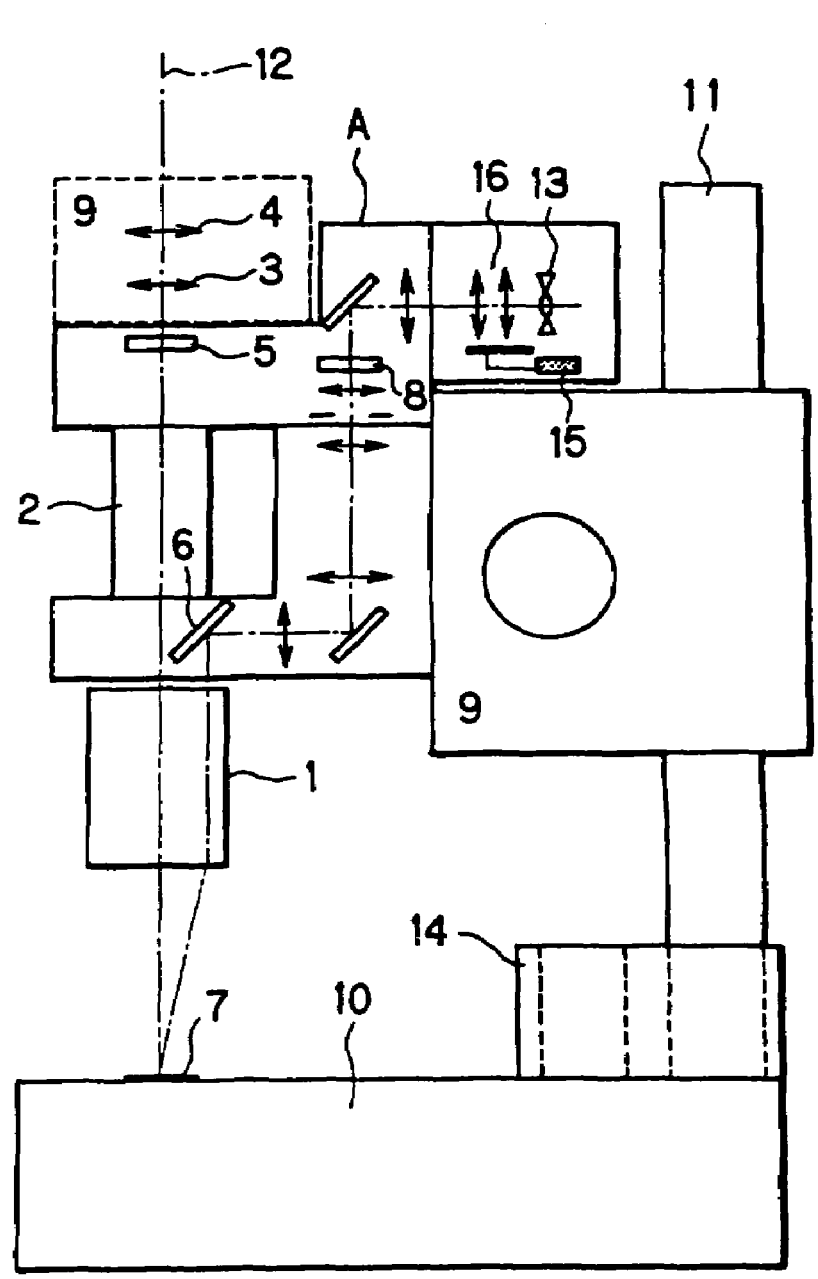
FIG. 12 is a diagram showing an arrangement of the optical apparatus according to Example 1 wherein an excitation filter and an absorption filter are integrated into one unit.

There is a specific relationship between the wavelength of light used to illuminate the sample 7 and the wavelength of fluorescent light emitted from the sample 7. Accordingly, if the excitation filter 8 and the absorption filter 5 are integrated into one unit, the filters can be changed easily. Therefore, operability is improved. In FIG. 12, the excitation filter 8 and the absorption filter 5 are integrated into a filter unit. In addition, the components of the fluorescence illumination apparatus A are formed into units according to functions, such as a light source unit including the light source 13 and the collector lens unit 16, and a distal end illumination unit formed from lens units and reflecting members.

In the arrangement shown in FIG. 12, the excitation filter 8 and the absorption filter 5 are integrated into one unit. However, because the unit includes optical members such as lens units, reflecting members and a stop, these optical members also need to be changed when the excitation filter 8 and the absorption filter 5 are changed. Accordingly, the arrangement is not practical. If a filter unit is formed only from the excitation filter 8 and the absorption filter 5 as shown by the dashed lines in FIG. 1, the filters can be changed easily with the other optical members left as they are. Therefore, the arrangement shown in FIG. 1 is favorable.

Figure 13A:
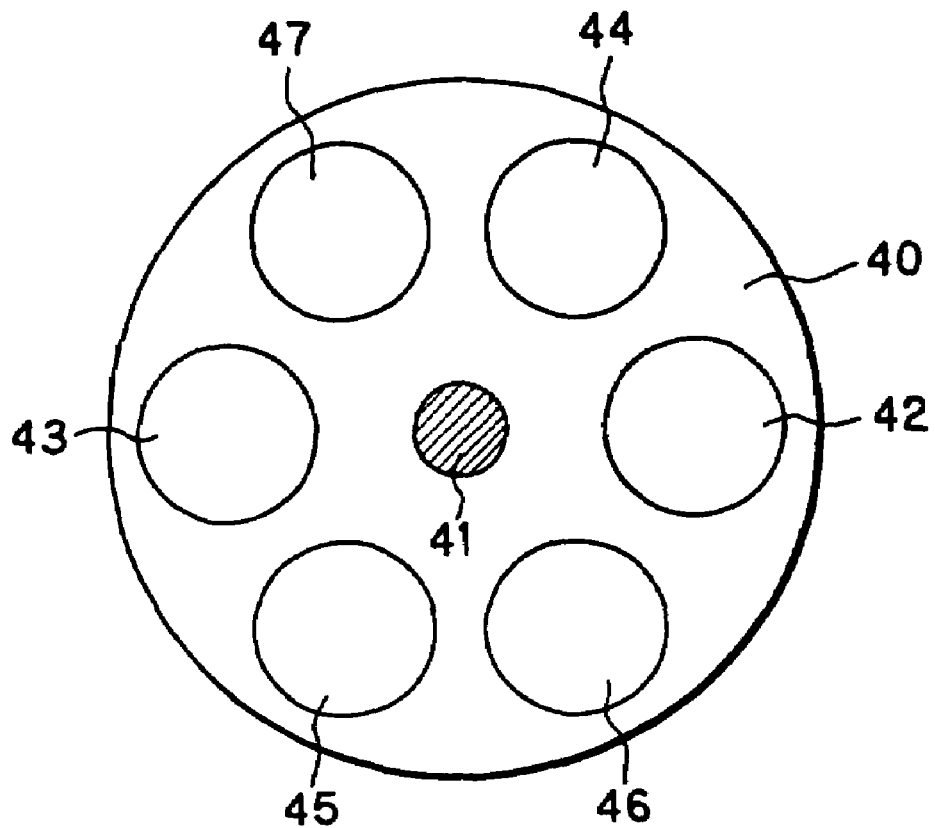
FIG. 13 is a diagram showing an arrangement of a filter unit used to make excitation and absorption filters interchangeable, in which part (a) is a top view, and part (b) is a sectional view.
Figure 13B:
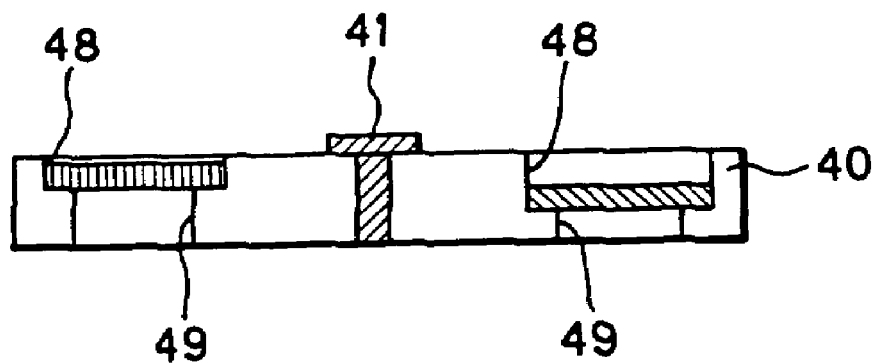

FIG. 13 shows an example of a specific arrangement for interchanging the excitation filter 8 and the absorption filter 5 with other excitation and absorption filters. In this example, a member holding a plurality of excitation filters and a plurality of absorption filters forms a filter unit, which is adapted to rotate in the fluorescence illumination apparatus A. In part (a) of FIG. 13, reference numeral 40 denotes a turret body, and reference numeral 41 denotes a shaft member. Reference numerals 42, 44 and 46 denote excitation filters, and reference numerals 43, 45 and 47 denote absorption filters. The filters are equally spaced on the circumference of the turret body 40. The excitation filter 42 and the absorption filter 43 are disposed to face each other across the axis of rotation. The excitation filter 44 and the absorption filter 45 are also disposed to face each other across the axis of rotation, and so are the excitation filter 46 and the absorption filter 47. The shaft member 41 is inserted into a hole extending through the turret body 40. Accordingly, the turret body 40 rotates about the shaft member 41 as a center of rotation.

The turret body 40 for holding the filters is a disk-shaped member and has an area and a thickness that are sufficient to hold a plurality of excitation filters and a plurality of absorption filters. The turret body 40 has the excitation filters 42, 44 and 46 and the absorption filters 43, 45 and 47, which are provided along the circumference of the turret body 40. As shown in part (b) of FIG. 13, which is a sectional view, the turret body 40 is provided with recesses 48 for accommodating the filters 42 to 47, respectively. That is, the number of recesses 48 corresponds to the number of filters 42 to 47. The recesses 48 each have a diameter slightly larger than the outer diameter of each filter. The depth of each recess 48 is set so that when the associated filter is accommodated therein, the filter surface will not project from the surface of the turret body 40 to a considerable extent. Below each recess 48, a hole 49 having a smaller diameter than that of the recess 48 is provided to extend through the turret body 40. Thus, the excitation filters 42, 44 and 46 and the absorption filters 43, 45 and 47 are each held by a boundary portion between the recess 48 and the hole 49. Each filter, recess 48 and hole 49 have sufficiently large diameters to pass illuminating light and fluorescent light. It should be noted that each filter is secured by using a conventional method, for example, by pouring an adhesive into the gap between the filter and the recess 48, or holding the filter from above with a retaining ring or the like.

In this example, a turret incorporating a plurality of excitation filters and a plurality of absorption filters is incorporated into the fluorescence illumination apparatus A in advance, and the turret is rotated to select a necessary combination of an excitation filter and an absorption filter according to the wavelength of a fluorescence image to be observed. In this way, the filters are changed. Accordingly, it becomes unnecessary to perform an operation of inserting or removing an excitation filter and an absorption filter into or from the fluorescence illumination apparatus A. Therefore, operability is improved.

Figure 14A:
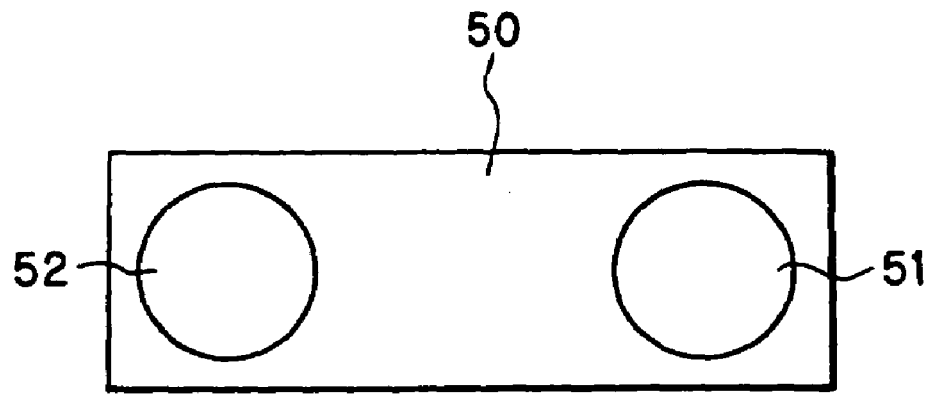
FIG. 14 is a diagram showing another arrangement of a filter unit used to make excitation and absorption filters interchangeable, in which parts (a) and (b) are top views, and part (c) is a sectional view.
Figure 14B:
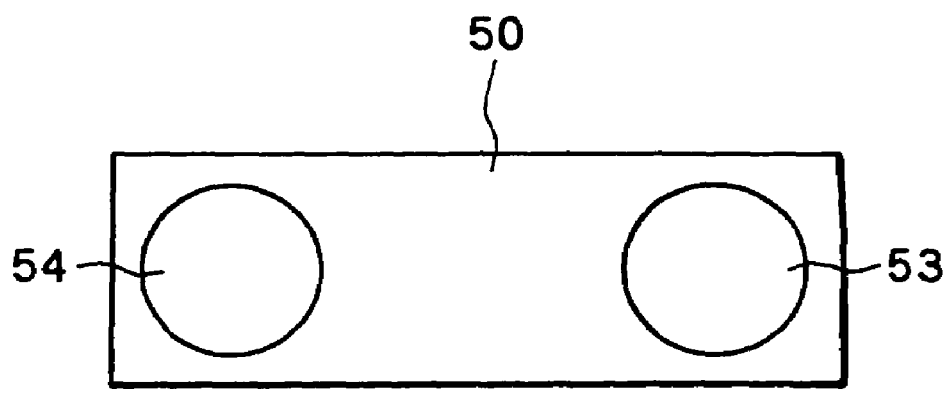
Figure 14C:
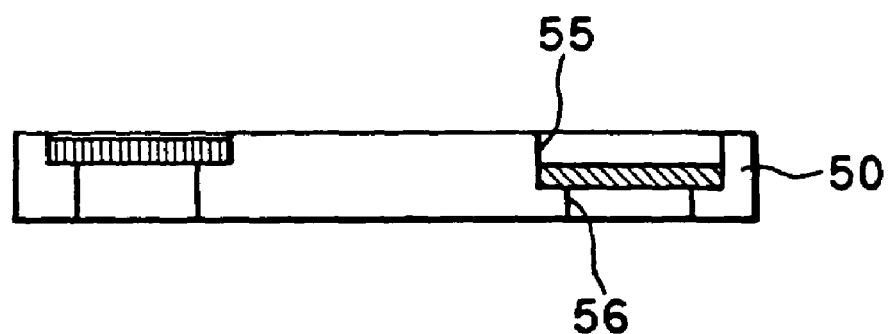

FIG. 14 shows another example of a specific arrangement for interchanging the excitation filter 8 and the absorption filter 5 with other excitation and absorption filters. In this example, a member holding one set of excitation and absorption filters forms a filter unit, which is removably inserted into the fluorescence illumination apparatus A. In parts (a) and (b) of FIG. 14, reference numeral 50 denotes a slider body. Reference numerals 51 and 53 denote excitation filters, and reference numerals 52 and 54 denote absorption filters.

The excitation filters 51 and 53 have spectral transmittance characteristics different from each other. For example, the excitation filter 51 has characteristics that allow passage of light of wavelength in the vicinity of 450 nanometers. The excitation filter 53 has characteristics that allow passage of light of wavelength in the vicinity of 510 nanometers. The absorption filters 52 and 54 also have spectral transmittance characteristics different from each other. The absorption filter 52 has characteristics that allow passage of light in the wavelength region of fluorescent light emitted from the sample 7 as excited by light passing through the excitation filter 51. The absorption filter 54 has characteristics that allow passage of light in the wavelength region of fluorescent light emitted from the sample 7 as excited by light passing through the excitation filter 53.

Although the above-described excitation filters and absorption filters have characteristics that allow passage of light in one specific wavelength region, it should be noted that each filter may have spectral transmittance characteristics that allow passage of light in a plurality of specific wavelength regions. For example, if an excitation filter is given characteristics that allow a wavelength in the vicinity of 450 nanometers and a wavelength in the vicinity of 510 nanometers to pass simultaneously, the sample 7 can be illuminated with two different wavelengths simultaneously. Accordingly, in a case where the sample 7 is stained with a plurality of fluorescent dyes, it is possible to produce fluorescent light of two wavelengths. If an absorption filter is also given characteristics that allow the fluorescent light of two wavelengths to pass simultaneously, fluorescence images of two colors can be observed simultaneously.

The slider body 50 for holding filters is a plate-shaped member and has an area and a thickness that are sufficient to hold one excitation filter and one absorption filter. As shown in part (c) of FIG. 14, the slider body 50 is provided with two recesses 55 spaced in the longitudinal direction. The recesses 55 have a slightly larger diameter than the outer diameter of each of the excitation filters 51 and 53 and the absorption filters 52 and 54. The depth of the recesses 55 is set so that when the excitation filters 51 and 53 and the absorption filters 52 and 54 are accommodated in the respective recesses 55, the surfaces of the excitation filters 51 and 53 and the absorption filters 52 and 54 will not project from the surface of the slider body 50 to a considerable extent. Below each recess 55, a hole 56 having a smaller diameter than that of the recess 55 is provided to extend through the slider body 50. Thus, the excitation filters 51 and 53 and the absorption filters 52 and 54 are each held by a boundary portion between the recess 55 and the hole 56. Each filter, recess 55 and hole 56 have sufficiently large diameters to pass illuminating light and fluorescent light. It should be noted that each filter is secured by using a conventional method, for example, by pouring an adhesive into the gap between the filter and the hole 56, or holding the filter from above with a retaining ring or the like.

In this example, a plurality of filter units are prepared according to the wavelengths of fluorescence images to be observed, and one necessary filter unit is selected from among them. The selected filter unit is removably inserted into the fluorescence illumination apparatus A through a slider mechanism or the like. In his way, filters are changed. Accordingly, when there is need for a new combination of an excitation filter and n absorption filter, the arrangement shown in FIG. 13 requires a filter changing operation to remove one set of filters and to insert another set of filters, whereas the arrangement shown in FIG. 14 only needs to prepare another filter unit and does not require changing filters. The arrangement may be such that the filter units shown in parts (a) and (b) of FIG. 14 are integrated into one filter unit, and this filter unit is caused to slide in the fluorescence illumination apparatus A.

With the above-described arrangement, it is possible to readily illuminate the sample 7 with excitation light of necessary wavelength. It should be noted that in this example a protection filter F is provided in the observation apparatus C so that even if excitation light is reflected from the sample 7 toward the observer when the sample 7 is illuminated with the excitation light, the reflected excitation light will not reach the observer.

Figure 15:
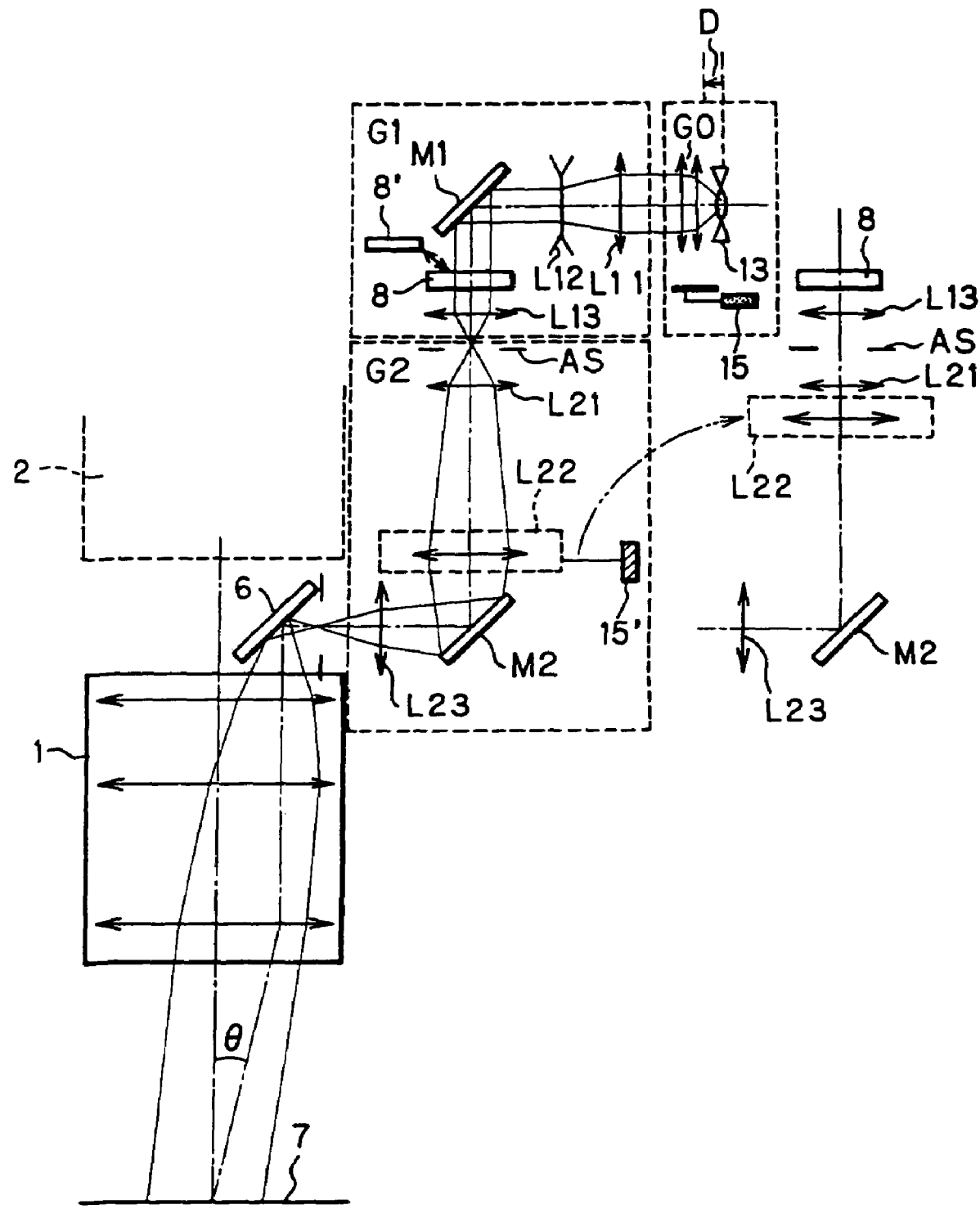
FIG. 15 is a detailed view showing the arrangement of the optical system of the fluorescence illumination apparatus used in Example 1.

FIG. 15 is a detailed illustration of the arrangement of the optical system used in the fluorescence illumination apparatus A. A light source 13 and a collector lens unit G0 constitute a light source unit. Illuminating light from a point on the optical axis of the light source 13 is converted into an approximately parallel light beam through the collector lens unit G0. It should be noted that the light source unit is provided with a moving mechanism 15. By moving the collector lens unit G0 in the optical axis direction with the moving mechanism 15, the distance between the light source 13 and the collector lens unit G0 can be varied. A first relay lens unit G1 focuses the light beam emerging from the collector lens unit G0 to form a first image of the light source 13. In this example, the first relay lens unit G1 includes a lens L11 of positive refracting power, a lens L12 of negative refracting power, a first reflecting member (reflecting mirror) M1, and a lens L13 of positive refracting power. An excitation filter 8 is placed in the first relay lens unit G1 between the first reflecting member M1 and the lens L13 of positive refracting power. Accordingly, when illuminating light from the light source 13 passes through the excitation filter 8, only light in a specific wavelength region determined by the spectral transmittance characteristics of the excitation filter 8 emanating from the excitation filter 8 to form excitation light. It should be noted that the excitation filter 8 is interchangeable with another excitation filter 8' having different spectral transmittance characteristics.

In the first relay lens unit G1, the lens L11 of positive refracting power and the lens L12 of negative refracting power form an afocal optical system. Accordingly, the approximately parallel light beam emerging from the collector lens unit G0 remains in the form of approximately parallel light beam even after passing through the lenses L11 and L12. However, because this optical system is a reducing optical system, the approximately parallel light beam emerges therefrom with a reduced beam diameter. With this arrangement, because the diameter of the light beam entering the excitation filter 8 is reduced, the excitation filter 8 can be reduced in size.

In a case where a multilayer filter is used as the excitation filter 8, properties that are characteristic of the multilayer filter give rise to problems. That is, as the incident angle becomes larger, the wavelength transmitted by the filter changes to a larger extent, and the transmittance also changes to a larger extent. However, if a reducing afocal optical system is used as in this example, an axial light beam in the illuminating light from the light source 13 is incident on the excitation filter 8 perpendicularly (i.e. parallel to the optical axis), and an extra-axial light beam is also incident on the excitation filter 8 at a small incident angle (i.e. the incident angle with respect to the optical axis is small). Therefore, even if a multilayer filter is used as the excitation filter 8, it is possible to minimize the effect of the above-described various problems relating to the incident angle that are characteristic of the multilayer filter.

A second relay lens unit G2 further relays the first image of the light source 13 formed by the first relay lens unit G1 and forms a second image. The second relay lens unit G2 includes an aperture stop AS, a lens L21 of positive refracting power, a lens L22 of positive refracting power, a second reflecting member M2, and a lens L23 of positive refracting power. The second relay lens unit G2 further has a moving mechanism 15' so that the lens L22 of positive refracting power can be moved along the optical axis by the moving mechanism 15'. The aperture stop AS provided in the second relay lens unit G2 is disposed at or near the position of the first image of the light source 13 to perform the function of adjusting the intensity of excitation light. Although in this example the aperture stop AS is included in the second relay lens unit G2, it may be included in the first relay lens unit G1.

Illuminating light emitted from the light source 13 and deflected toward the sample 7 by the first reflecting member M1 in the first relay lens unit G1 forms a first image of the light source 13 at the aperture stop AS. Illuminating light from the first image of the light source 13 passes through the lenses L21 and L22 of positive refracting power and is deflected toward the objective 1 by the second reflecting member M2 placed between the lenses L22 and L23 of positive refracting power. The illuminating light deflected by the second reflecting member M2 is focused after passing through the lens L23 of positive refracting power to form a second image of the light source 13. The position of the second image of the light source 13 is approximately conjugate to the pupil position of the observation optical system of the observation optical system unit 2.

To direct illuminating light from the second image of the light source 13 toward the sample 7, the reflecting member 6 is placed between the objective 1 and the observation optical system unit 2. The reflecting member 6 is positioned at a peripheral portion of the objective 1 and decentered with respect to the optical axis of the objective 1, as stated above. The position of the reflecting member 6 corresponds to the outside of the observation field so that the reflecting member 6 is not seen when the sample 7 is viewed.

In a case where illumination for fluorescence observation is performed from a position displaced from the optical axis of the objective as in this example, a peripheral portion of the illuminating light beam may be eclipsed in the objective 1 to fail to reach the sample 7 although the central portion of the illuminating light beam reaches the sample 7. Therefore, in this example, the pupil diameter of the objective 1 is enlarged (i.e. an objective having a large pupil diameter is used), thereby preventing illuminating light from being eclipsed in the objective 1 even when the illuminating light enters the objective 1 in a state where the optical axis of the illuminating light is displaced from the optical axis of the objective 1.

The observation optical system unit 2 includes a variable magnification optical system. Because the variable magnification optical system is unitized, it is possible to interchangeably use variable magnification optical systems which have been prepared in accordance with magnifications required for observations. Alternatively, it is possible to interchangeably use a variable magnification optical system that allows selection of a desired magnification from among a plurality of preset magnifications within a variable magnification range, or a variable magnification optical system that allows the magnification to be continuously changed within a variable magnification range.

Thus, the optical apparatus according to this example allows the size of an observation image to be changed by the variable magnification optical system provided in the observation optical system unit 2. When a magnification change is made by the variable magnification optical system, the pupil position and pupil diameter of the observation optical system change. If there is no change in the illumination optical system of the fluorescence illumination apparatus A despite the change of the magnification of the observation optical system, the conjugate relationship between the pupil position of the observation optical system after the magnification change and the position of the second image of the light source 13 is destroyed undesirably. If the second image of the light source 13 fails to coincide with the position conjugate to the pupil position of the observation optical system after the magnification change, the necessary illumination area cannot satisfactorily be illuminated. Alternatively, an unnecessarily wide area is illuminated, and the illumination efficiency is degraded. Therefore, in this example, the lens L22 of positive refracting power in the second relay lens unit G2 is moved in the optical axis direction by the moving mechanism 15'.

In FIG. 15, the second relay lens unit G2 surrounded by the dashed lines is in a state corresponding to the lowest magnification state of the variable magnification optical system. In this state, the lens L22 of positive refracting power is positioned near the second reflecting member M2. The condition of the second relay lens unit G2 corresponding to the highest magnification state of the variable magnification optical system is shown on the right-hand side of the second relay lens unit G2 surrounded by the dashed lines. In this case, the lens L22 of positive refracting power has moved along the optical axis to a position near the lens L21 of positive refracting power in accordance with a magnification change made by the variable magnification optical system. Thus, in this example, because the lens L22 of positive refracting power is movable, the position of the second image of the light source 13 can be moved in the optical axis direction. Accordingly, even when a magnification change is made by the variable magnification optical system, the position of the second image of the light source 13 can be made approximately coincident with the position conjugate to the pupil position of the observation optical system after the magnification change. Thus, Koehler illumination can be performed at all times. The movement of the lens L22 of positive refracting power causes the relay magnification of the second relay lens unit G2 to change. Accordingly, the size of the second image of the light source 13 can be made approximately equal to the pupil diameter of the observation optical system after the magnification change. With this arrangement, even when the observation area changes owing to a magnification change made by the variable magnification optical system, the illumination area can be changed in accordance with the change of the observation area. Therefore, bright fluorescence observation can be realized. It should be noted that because a change in the magnification of the variable magnification optical system can be detected electrically or mechanically, the movement of the lens L22 of positive refracting power can be linked to the magnification change of the variable magnification optical system by transmitting information concerning the detected magnification change to the moving mechanism 15'. In this case, operability is also improved. A lens to be moved is not necessarily limited to the lens L22 of positive refracting power, but another lens (regardless of whether the refracting power is positive or negative) may be moved in place of the lens L22 of positive refracting power.

As optical system lens data, lens data concerning an objective and a fluorescence illumination optical system are shown in Table 1-1 (shown later), and the values of paraxial quantities of the fluorescence illumination optical system are shown in Table 1-2. The focal length Fob of the objective shown in Table 1-1 is 75 millimeters. It should be noted that the configuration of aspherical surfaces in Table 1-1 is given by the following equation (the same shall apply hereinafter):

$$z = (y^2/r) \Big/ \left[ 1 + \{1 - (K+1)(y/r)^2\}^{1/2} \right] + A_2 y^2 + A_4 y^4 + A_6 y^6 + A_8 y^8 + A_{10} y^{10}$$

where z is an optical axis for which the direction of travel of light is defined as a positive direction; y is a distance from the optical axis in a direction perpendicular to the optical axis; r is a paraxial curvature radius; K is a conic constant; and $A_2, A_4, A_6, A_8$, and $A_{10}$ are 2nd-, 4th-, 6th-, 8th- and 10th-order aspherical coefficients, respectively.

In Table 1-1, the surface Nos. 1 to 10 correspond to the objective 1 in FIG. 15, and the surface Nos. 11 to 13 correspond to the reflecting member 6, which is herein a reflection prism. Accordingly, the surface No. 11 is an entrance surface, and the surface No. 12 is a reflecting surface. The surface No. 13 is an exit surface. The surface No. 11 and the surfaces subsequent thereto are decentered by 15 millimeters with respect to the optical axis of the objective 1. The surface No. 14 corresponds to the entrance pupil of the objective 1. The surface Nos. 16 to 26 correspond to the second relay lens unit G2. Among them, the surface Nos. 16 to 17 correspond to the lens L23, and the surface No. 18 corresponds to the second reflecting member M2. The surface Nos. 19 to 22 correspond to the lens L22. The surface Nos. 23 to 24 correspond to the excitation filter 8 (in this numerical example, the excitation filter 8 is placed in the second relay lens unit G2). The surface Nos. 25 to 26 correspond to the lens L21. The surface Nos. 27 to 30 correspond to the first relay lens unit G1. Among them, the surface Nos. 27 to 28 correspond to the lens L13, and the surface Nos. 29 to 30 correspond to the lens L11. Further, the surface Nos. 31 to 43 correspond to the collector lens unit G0. Among them, the surface Nos. 31 to 34 correspond to an infrared cutoff filter.

Figure 16:
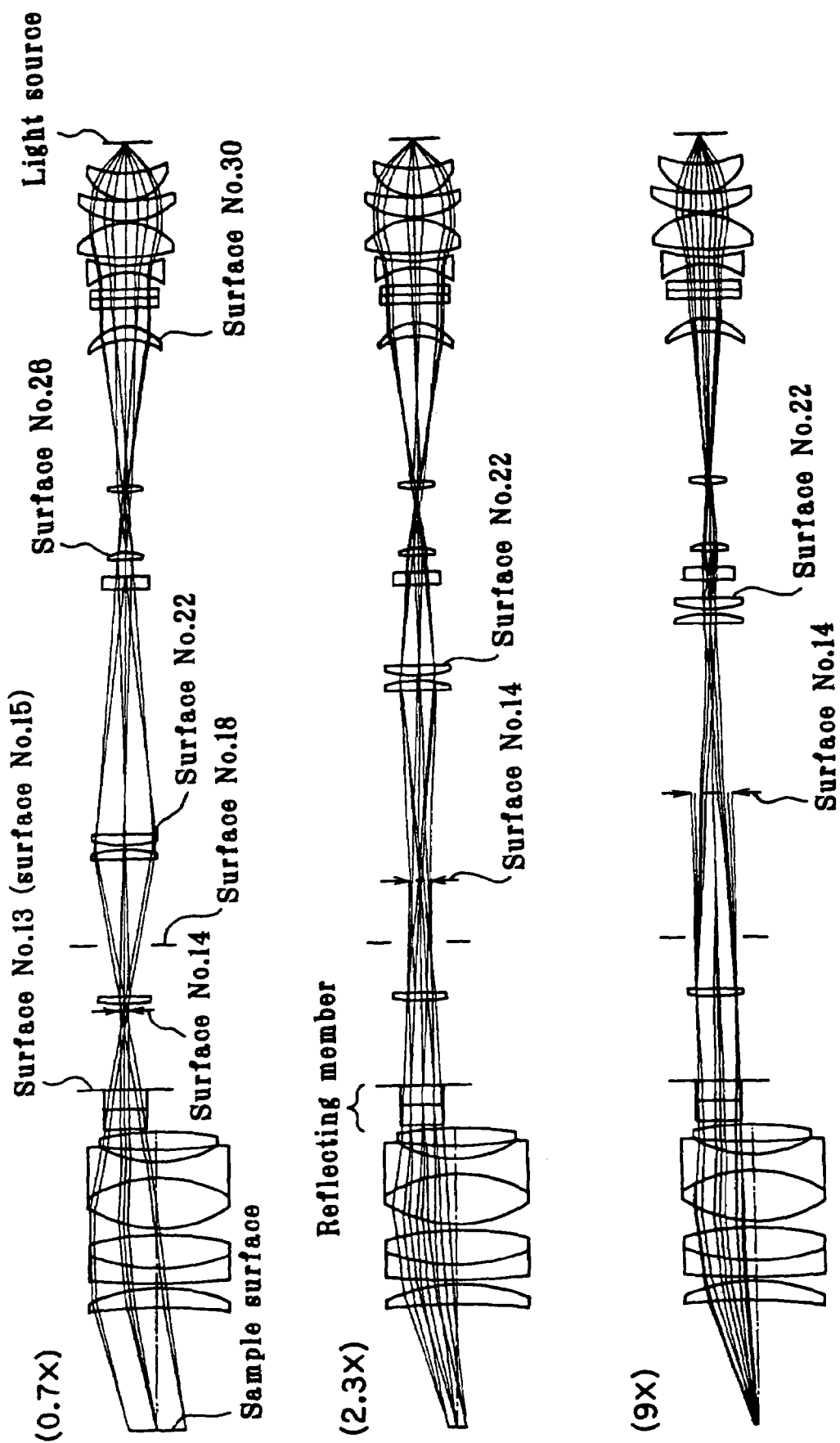
FIG. 16 is a diagram showing the optical system of the fluorescence illumination apparatus used in Example 1, which shows the lens arrangements at the lowest, intermediate and highest magnifications.
Figure 17:
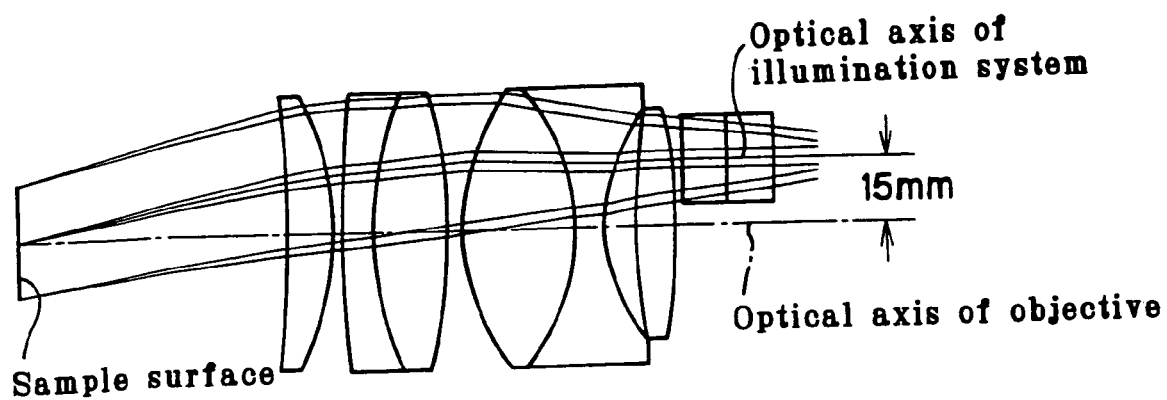
FIG. 17 is a diagram showing the way in which the optical axis of an objective and the optical axis of an illumination optical system are displaced from each other.

FIG. 16 illustrates optical ray traces of the optical system based on the lens data shown in Table 1-1 at the lowest, intermediate and highest magnifications. FIG. 17 shows the way in which the optical axis of the objective in the optical system and the optical axis of the illumination optical system are displaced from each other.

The illumination optical system shown in Table 1-1 and FIG. 16 differs from the illumination optical system shown in FIG. 15 in the following points. The first point is that an infrared cutoff filter is provided in the collector lens unit G0 of the illumination optical system shown in FIG. 16. When infrared rays are applied to the sample 7, heat is generated at the surface of the sample 7, which exerts an influence on the sample 7. Therefore, an infrared cutoff filter is placed at a position close to the light source.

The second point is that, in FIG. 16, the lens L12 of negative refracting power is not provided in the first relay lens unit G1. It is essentially desirable to provide the lens L12 of negative refracting power to form an afocal system. However, if the beam diameter can be reduced and the angle of the extra-axial light beam to the optical axis can be reduced, the excitation filter 8 can be placed there even if illuminating light is not a parallel light beam. In this case, because the arrangement of the first relay lens unit G1 can be simplified, the fluorescence illumination apparatus A can be reduced in size advantageously.

The third point is that, in FIG. 16, the excitation filter 8 is placed in the second relay lens unit G2. In FIG. 15, the excitation filter 8 is placed in the first relay lens unit G1, whereas, in FIG. 16, it is placed in the second relay lens unit G2. Basically, the excitation filter 8 can be placed anywhere in the illumination optical system, provided that the beam diameter is sufficiently small and the incident angle of the extra-axial light beam is sufficiently small, as stated above. FIG. 16 shows this fact.

The fourth point is that the reflecting member 6 is a reflection prism. Although the reflecting member 6 is a reflecting mirror in FIG. 15, it may be formed from a reflection prism, as shown in FIG. 16. Because illuminating light is totally reflected by the reflecting surface (surface No. 12) of the reflection prism, the loss of illuminating light quantity can be reduced in comparison to the reflecting mirror.

When the exit pupil diameter of the objective is denoted by d1 and the entrance pupil diameter of the observation optical system is denoted by d2, the ratio of the exit pupil diameter d1 to the entrance pupil diameter d2 should satisfy the following condition (11):

$$d1 > 50 \text{ millimeters}$$

$$d1/d2 > 1.5 \tag{1}$$

The above condition makes the entrance pupil diameter of the objective 1 approximately equal to the pupil diameter of the objective of the stereoscopic microscope. In addition, if the observation optical system is formed so that the condition (1) is satisfied at a low magnification of the order of about 10×, it becomes possible to perform fluorescence observation with a very high numerical aperture in comparison to the conventional stereoscopic microscopes and the ordinary fluorescence microscopes, although it is difficult to realize stereoscopic observation.

This example adopts an arrangement in which a lens in the second relay lens unit G2 is moved. This is done in order to allow Koehler illumination to be performed even when a magnification change is made by the variable magnification optical system, as has been stated above. In addition to Koehler illumination, critical illumination can also be performed in this example. To allow critical illumination, a moving mechanism 15 is provided, and the collector lens unit G0 is moved by the moving mechanism 15, thereby making it possible to change the distance between the light source 13 and the collector lens unit G0. As the collector lens unit G0 is moved in the optical axis direction, the position of a projected image of the light source 13 also moves in the optical axis direction. Eventually, the position where the image of the light source 13 is projected and the surface of the sample 7 coincide with each other to provide critical illumination. Thus, in this example, it is possible to perform both Koehler illumination, which allows the entire observation area to be illuminated uniformly, and critical illumination, which allows the central portion of the observation area to be illuminated even more brightly. Accordingly, optimum illumination can be performed according to each particular observation situation. In particular, when the optical system is set to perform critical illumination, a dark fluorescence image can be observed even more brightly. In addition, because illumination conditions can be switched from one to another simply by moving the collector lens unit G0, it is possible to realize an optical apparatus excellent in operability.

The change of the distance between the light source 13 and the collector lens unit G0 is independent of the movement of the lens L22 of positive refracting power, which moves in accordance with a magnification changing operation of the variable magnification optical system. Accordingly, when the lens L22 of positive refracting power moves in accordance with a magnification change made by the variable magnification optical system, even if the position where the image of the light source 13 is projected and the position of the surface of the sample 7 are coincident with each other before the magnification change, the two positions do not coincide with each other after the magnification change. Therefore, in order to perform critical illumination even after the magnification change, it is necessary to move the collector lens unit G0 again. It should be noted that if the moving mechanism 15 and the moving mechanism 15' are driven in linked relation to each other, it is possible to perform critical illumination while changing the magnification.

When critical illumination is performed, it is desirable that the optical system formed from the objective 1 and the illumination optical system should satisfy the following condition (2):

$$|D| \leq 3 \text{ millimeters} \quad (2)$$

In the above condition, D is the distance between the light source 13 and a conjugate position to the sample 7 closest to the light source 13 in the illumination optical system. More specifically, D is the distance from the light source 13 to the position of an image of the sample 7 projected in the illumination optical system by the optical system formed from the objective 1 and the illumination optical system, which is a conjugate position to the sample 7 formed closest to the light source 13. In FIG. 15, the conjugate position to the sample 7 is between the light source 13 and the collector lens unit G0. However, the conjugate position to the sample 7 may be formed on the side of the light source 13 remote from the collector lens unit G0. It is desirable that this condition should be satisfied at all magnifications within the variable magnification range of the variable magnification optical system.

By arranging the optical system formed from the objective 1 and the illumination optical system so that the condition (2) is satisfied, the position of the light source 13 and the conjugate position to the sample 7 can be made coincident with each other by only slightly moving the position of the light source 13. As a result, it is possible to perform critical illumination for the sample 7 while taking in high numerical aperture light near the light source 13 by the collector lens unit G0 without waste. If the condition (2) is not satisfied, the light source 13 is too close to the collector lens unit G0, so that the light source 13 and the collector lens unit G0 may contact each other undesirably. Alternatively, the light source 13 is too far away from the collector lens unit G0, so that it becomes impossible for the collector lens unit G0 to take in all of the light beam from the light source 13, resulting in a loss of the illuminating light quantity.

To make the position of the light source 13 and the conjugate position to the sample 7 coincident with each other, the light source 13 should be moved in the optical axis direction toward the conjugate position to the sample 7 that is closest to the light source 13 at each particular magnification. However, it is actually difficult to move the light source 13. Therefore, it is preferable to move the collector lens unit G0 so that the conjugate position to the sample 7 coincides with the position of the light source 13. It should be noted that the optical system shown in Table 1-1 can perform critical illumination at any magnification because, as shown in Table 1-2, the value of D (in Table 1-2, D is the exit pupil position) satisfies the condition (2) at any of the lowest, intermediate and highest magnifications of the variable magnification optical system.

Example 2

Figures 18A, 18B:
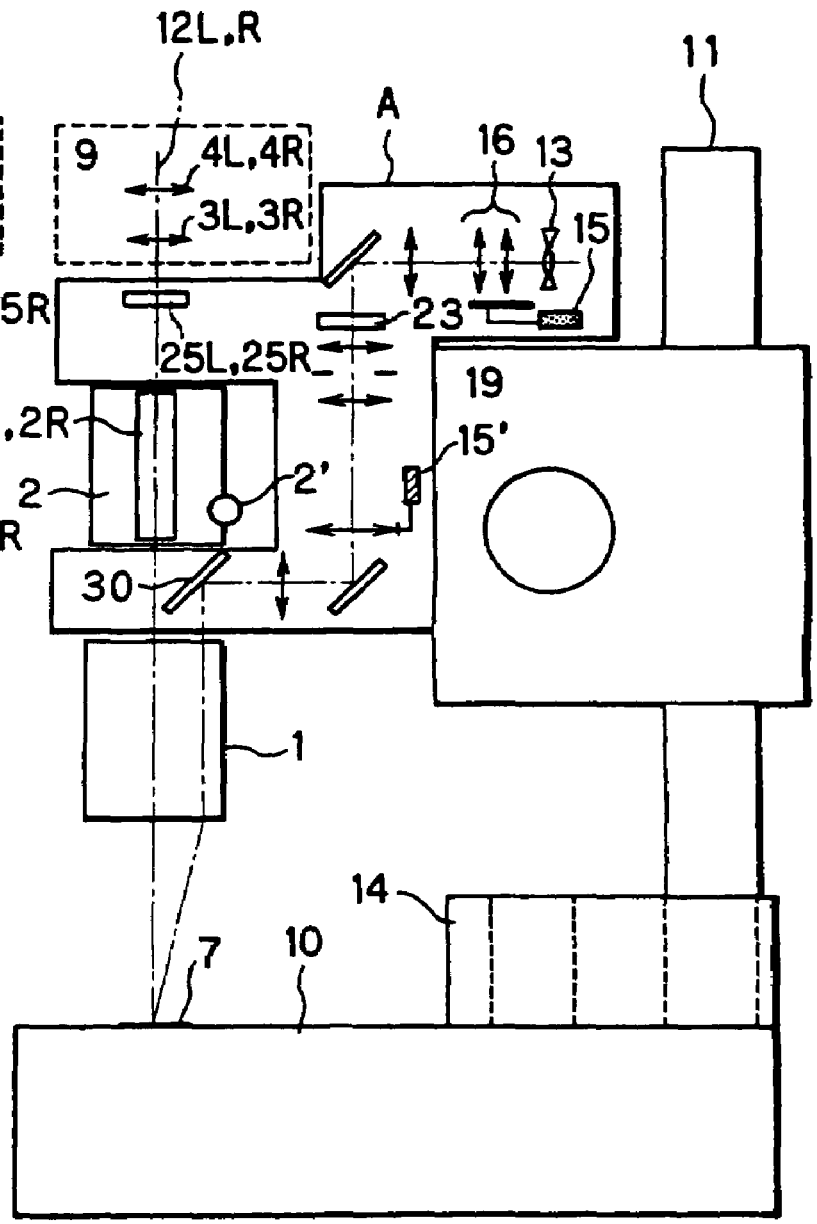
FIG. 18 is a diagram showing the arrangement of an optical apparatus according to Example 2 of the present invention, in which part (a) is a front view showing only a fluorescence observation optical system in a Galilean stereoscopic microscope, and part (b) is a side view of the entire optical apparatus.

Example 2 of the optical apparatus according to the present invention is shown in FIG. 18. In the optical apparatus shown in FIG. 18, the observation optical system unit and the imaging optical system unit of the optical apparatus according to Example 1 are each formed from a pair of lens units, and the pair of lens units are placed in parallel and symmetry with respect to the optical axis of the objective. The optical apparatus is a Galilean stereoscopic microscope. It should be noted that the optical apparatus uses a fluorescence illumination apparatus A, a frame 10, a frame socket 14, a post 11 and a focusing unit 19 which have arrangements similar to those in Example 1. In the fluorescence illumination apparatus A, the movement of the collector lens unit G0 and the movement of the movable lens in the second relay lens unit G2 can be performed in the same way as in Example 1. The excitation filter 23 and the absorption filters 25L and 25R can be adapted to be interchangeable with other excitation and absorption filters by partially modifying the filter unit shown in Example 1.

Because the optical apparatus according to Example 2 is a Galilean stereoscopic microscope, the left-hand lens unit (2L, 25L, 3L and 4L) and the right-hand lens unit (2R, 25R, 3R and 4R) are disposed on the left and right sides, respectively, of an optical axis of the objective 1, which is the center axis of the objective 1. The distance between the left-hand lens unit and the optical axis and the distance between the right-hand lens unit and the optical axis are equal to each other. The pair of lens units are placed in parallel to the optical axis of the objective 1. Accordingly, the pair of lens units are in symmetry with respect to the optical axis of the objective 1. With this arrangement, the optical apparatus makes it possible to view the sample 7 stereoscopically.

In Example 2, the objective 1 is formed from a single objective as in the case of Example 1. However, the observation optical system unit 2 is formed from a pair of observation optical systems 2L and 2R (left and right). Similarly, the imaging optical system unit 9 is formed from a pair of imaging lenses 3L and 3R (left and right) and a pair of eyepieces 4L and 4R (left and right).

Thus, in the optical apparatus according to Example 2, the observation optical system unit and the imaging optical system unit are each formed from a pair of lens units. Accordingly, the optical apparatus is provided with a pair of absorption filters 25L and 25R (left and right) as second wavelength selecting members for selectively transmitting fluorescent light. Therefore, fluorescent light from the sample 7 passes through the objective 1 and then passes through the left-hand side lens units and the right-hand side lens units to reach the left and right eyes of the observer. Illuminating light for illuminating the sample 7 does not pass through the observation optical system unit 2 as in the case of Example 1. Accordingly, no autofluorescence occurs from the observation optical systems 2L and 2R in the observation optical system unit 2. Therefore, it is possible to obtain a fluorescence image with high contrast. Although illuminating light passes through the objective 1, where the illuminating light passes is a peripheral portion of the objective 1, and a reflecting member 30 is disposed at a position corresponding to the outside of an observation field determined by the observation optical system unit 2 and the imaging optical system unit 9. Therefore, even if autofluorescence occurs, there is no possibility of autofluorescence light being superimposed on the fluorescence image. Furthermore, because any desired vitreous material can be freely selected to form the lenses of the objective 1 and those of the observation optical system without a need to care about the occurrence of autofluorescence, the observation apparatus can be formed from a favorably corrected optical system. Similarly, even if autofluorescence occurs in the fluorescence illumination apparatus A, the intensity of autofluorescence light is very weak in comparison to illuminating light. Therefore, no problem arises in terms of illumination. Accordingly, any desired vitreous material can be freely selected to form the illumination optical system without a need to care about the occurrence of autofluorescence. Therefore, it is possible to form the illumination optical system from a favorably corrected optical system.

In this example, a reflecting member is placed at a position displaced from the optical axis of the objective 1 to illuminate the sample 7 as in the case of Example 1. In this regard, it is desirable to dispose the observation optical system unit 2 and the imaging optical system unit 9 with respect to the objective 1 so that a plane containing the optical axes of the left and right lens units is displaced from the optical axis of the objective 1. This will be described below with reference to FIG. 19.

Figure 19A:
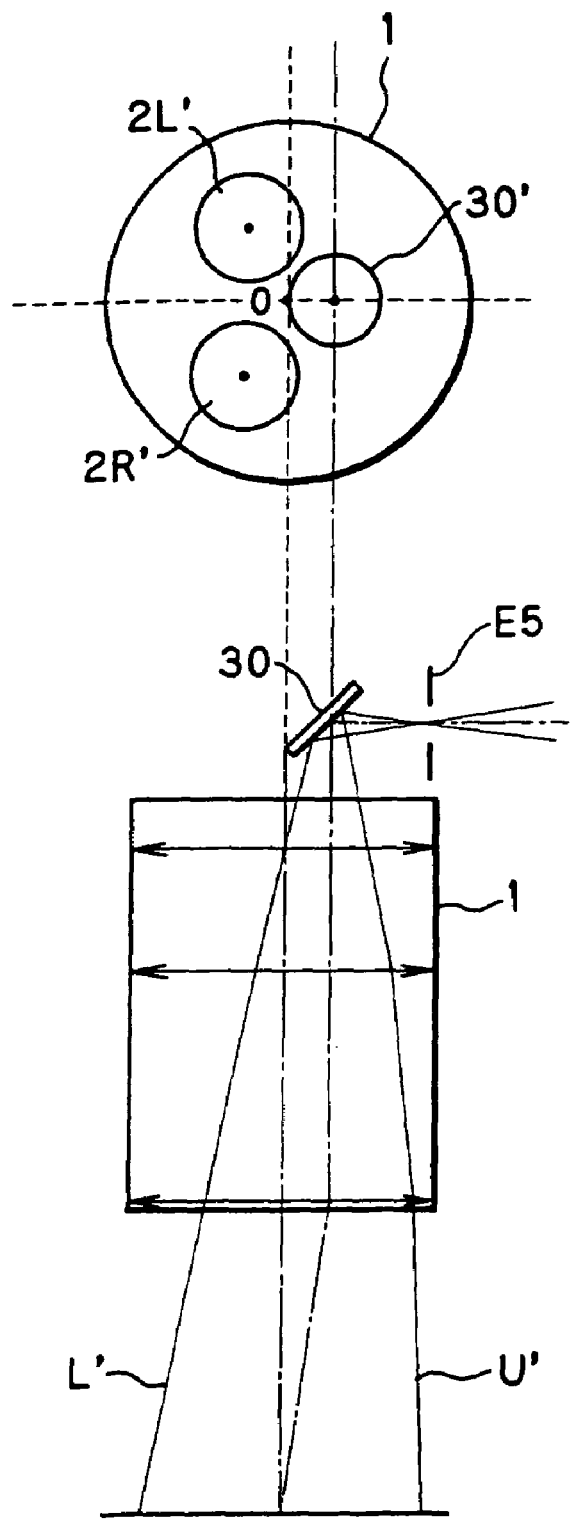
FIG. 19 is a diagram showing the relationship between the positions of two observation optical systems and a reflecting member with respect to an objective on the one hand and illuminating light passing through the objective on the other, in which part (a) shows a case where an imaginary line connecting the centers of the two observation optical systems is displaced from the optical axis of the objective, and part (b) shows a case where the optical axis of the objective lies on the imaginary line connecting the centers of the two observation optical system.
Figure 19B:
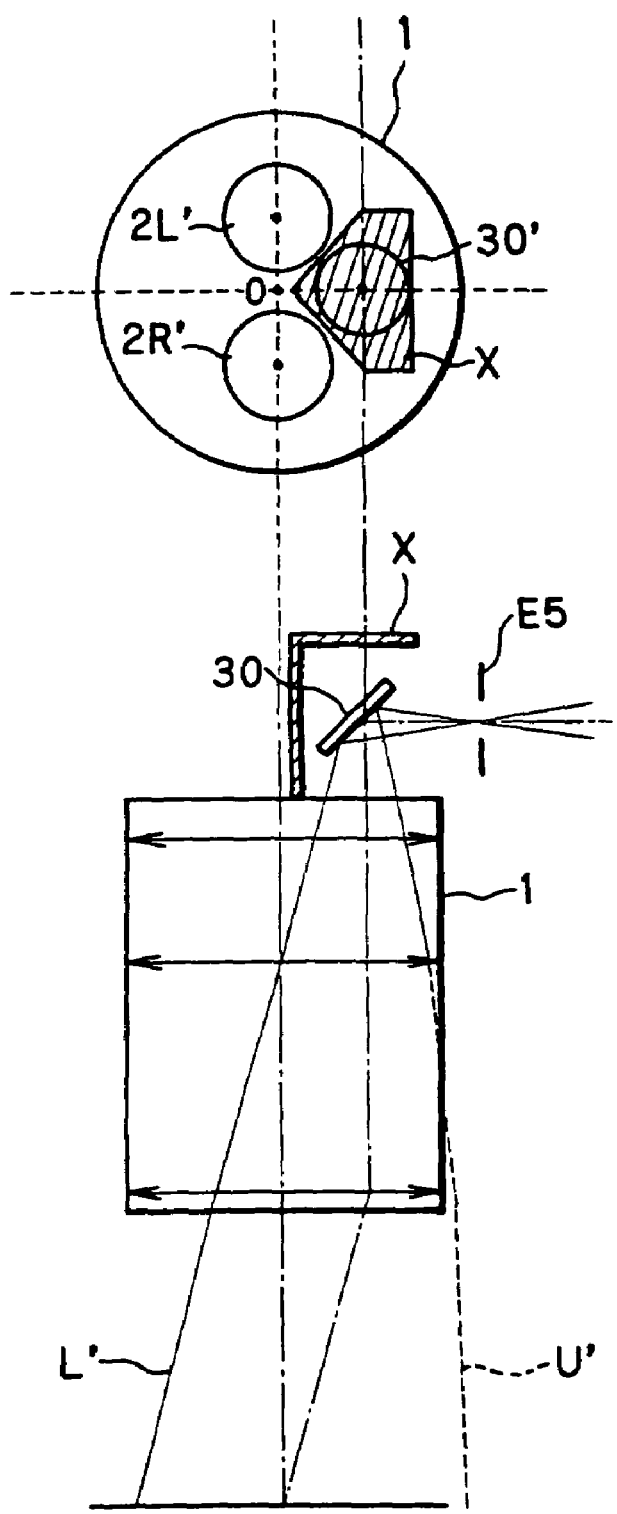

Part (a) of FIG. 19 is a diagram showing an arrangement in which a plane containing the optical axes of the left and right lens units is displaced from the optical axis of the objective 1. The upper figure in part (a) of FIG. 19 is a sectional view of the objective 1 as seen from the direction of the observation optical system unit, and the lower figure is a side view of the objective 1. Part (b) of FIG. 19 is a diagram showing an arrangement in which a plane containing the optical axes of the left and right lens units is coincident with the optical axis of the objective 1. The upper and lower figures in part (b) of FIG. 19 are similar to those in part (a) of FIG. 19. In FIG. 19, reference numeral 1 denotes an objective, and reference numerals 2L' and 2R' denote the areas of light beams led by observation optical systems, which are left and right units. Reference symbol O denotes an optical axis of the objective 1. Reference numeral 30' denotes the area of an excitation light beam led by the reflecting member 30. Reference symbols U' and L' denote marginal rays of the excitation light beam. Reference symbol E denotes a position conjugate to the pupil position of each of the observation optical systems 2L and 2R. Reference symbol X denotes a light-blocking member.

In a case where excitation light from the fluorescence illumination apparatus A is made incident on the objective 1 to illuminate the sample 7, it is necessary in order to illuminate the same area as the observation area to make the rays of excitation light incident on the objective 1 at the same angle as that of rays passing through the pupil of each of the observation optical systems 2L and 2R. Rays of excitation light that are incident on the objective 1 at the largest angle to the optical axis of the objective 1 are the marginal rays of the excitation light beam. Therefore, it is desirable that the marginal rays should not be eclipsed in the objective 1. Accordingly, in this example, as shown in part (a) of FIG. 19, the areas 2L' and 2R' of light beams led by the observation optical systems 2L and 2R are arranged to pass through peripheral portions somewhat away from the optical axis O of the objective 1 so that the area 30' of the light beam led by the reflecting member 30 passes as close to the central portion of the objective 1 as possible. In this state, an imaginary line connecting the optical axes of the observation optical systems 2L and 2R is displaced from the optical axis O of the objective 1. Hence, a plane containing the optical axes of the observation optical systems 2L and 2R is displaced from the optical axis of the objective 1. With this arrangement, the ray L' among the marginal rays of the excitation light beam crosses the optical axis O of the objective 1 immediately after entering the objective 1 and reaches one end of the illumination area. On the other hand, the position of incident of the marginal ray U' is in the vicinity of the middle between the optical axis O of the objective 1 and the outer periphery thereof. Therefore, the ray U' passes near the outer periphery of the objective 1 while being refracted by the lenses in the objective 1 and reaches the other end of the illumination area. Accordingly, there is no possibility of excitation light being eclipsed in the objective 1.

On the other hand, in a case where the observation optical system unit 2 and the imaging optical system unit 9 are placed so that an imaginary line connecting the optical axes of the observation optical systems 2L and 2R coincides with the optical axis O of the objective 1 as shown in part (b) of FIG. 19, the marginal ray L' of the excitation light beam crosses the optical axis O of the objective 1 after entering it and reaches one end of the illumination area. However, the position of incidence of the marginal ray U' is in the vicinity of the outer periphery of the objective 1. Therefore, even if it is refracted by the lenses in the objective 1, the ray U' undesirably comes out from the outer periphery of the objective 1 in the course of travel, failing to reach the other end of the illumination area. Thus, excitation light is undesirably eclipsed in the objective 1.

As has been stated above, in an optical apparatus having a pair of lens units for each of the observation optical system unit and the imaging optical system unit as in a Galilean stereoscopic microscope, the entire observation area can be illuminated by arranging the observation optical system unit 2 and the imaging optical system unit 9 so that a plane containing the optical axes of the pair of lens units is displaced from the optical axis of the objective 1. This arrangement is particularly effective during observation at a low magnification with a large incident angle. In addition, because illumination is effected from a position close to the optical axis of the objective 1, excitation light is applied to the sample 7 at an angle close to 90 degrees to the surface of the sample 7. Accordingly, illumination with reduced shadow can be performed advantageously.

It should be noted that illumination with further reduced shadow can be realized by disposing a plurality of divided reflecting members each having a small area at a peripheral portion of the objective 1 to thereby illuminate the sample 7 from a plurality of different directions. As the area 30' of the excitation light beam led by the reflecting member 30 is brought closer to the optical axis O of the objective 1, the areas 2L' and 2R' of the light beams led by the observation optical systems 2L and 2R move closer to the periphery of the objective 1. Consequently, the distance between the optical axes of the observation optical systems 2L and 2R increases undesirably. This causes fluorescent light entering the observation optical systems 2L and 2R to be eclipsed in the objective 1. Therefore, it is desirable to prevent the illumination area and the observation area from being eclipsed by increasing the effective diameter of the objective 1 or using an objective having a different pupil position.

If a light-blocking member X is placed so as to surround the reflecting member 30 as shown in part (b) of FIG. 19, it is possible to prevent excitation light reflected from the surface of the objective 1 and autofluorescence light produced by excitation light from entering the areas 2L' and 2R' of the light beams led by the observation optical systems 2L and 2R.

In this example also, the illumination optical system based on the lens data shown in Tables 1-1 and 1-2, shown in Example 1, can be used in the fluorescence illumination apparatus A, as stated above. The values of paraxial quantities of the objective in this example, which is used in combination with the illumination optical system, are shown in Table 1-3. Table 1-4 shows the paraxial quantities of an observation-side optical system including the objective 1, the observation optical system unit 2 and the imaging optical system unit 9.

Figure 20:
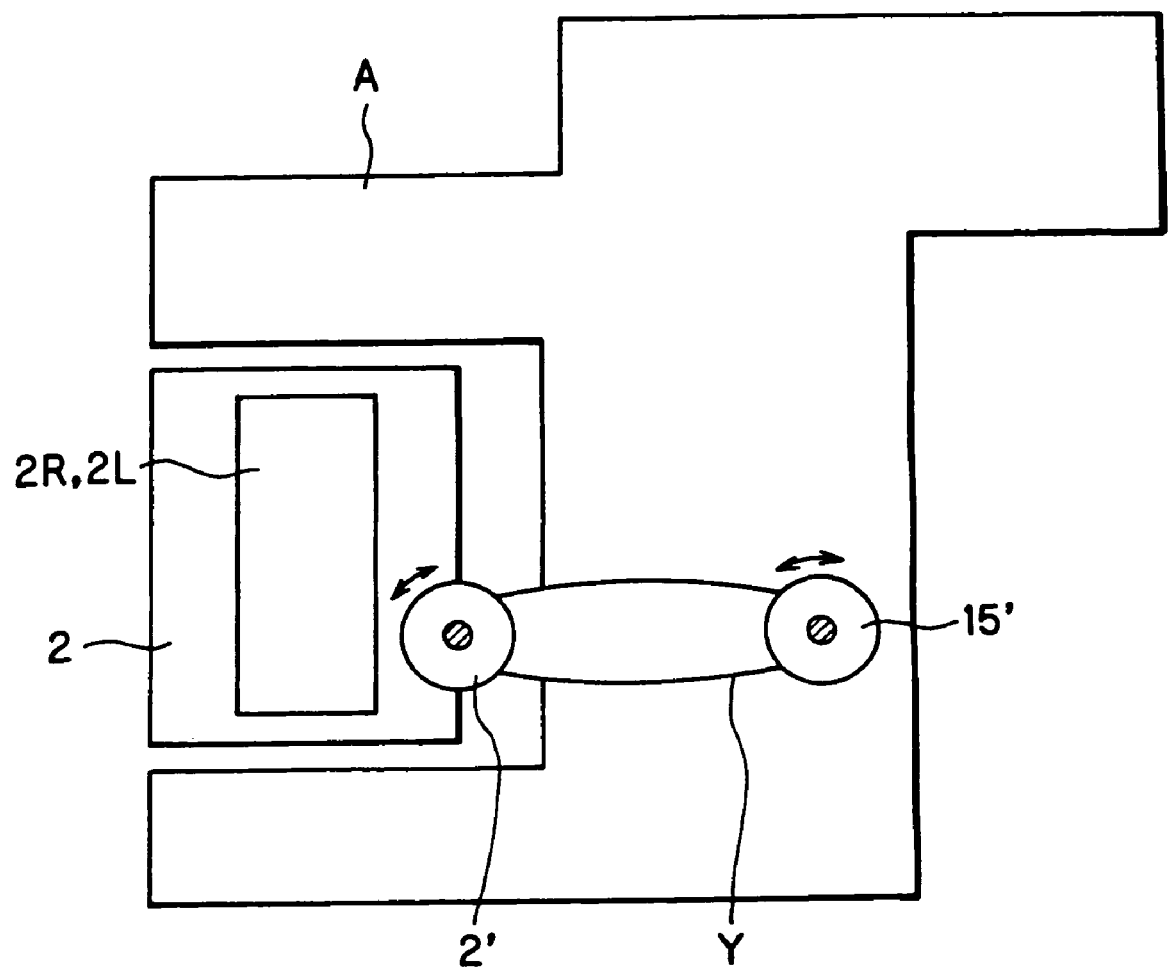
FIG. 20 is a diagram showing a mechanism that changes the illumination area in association with a magnification change made in a variable magnification optical system.

In this example also, when a magnification change is made by the variable magnification optical system, the illumination area can be changed in accordance with a change of the observation area by moving a lens in the fluorescence illumination apparatus A with the moving mechanism 15' according to the magnification change. FIG. 20 shows the way in which the lens in the fluorescence illumination apparatus A is moved by the moving mechanism 15'. The observation optical system unit 2 is provided with a variable magnification knob 2' for changing the magnification by moving lenses in the observation optical systems 2L and 2R each including a variable magnification optical system. The variable magnification knob 2' has a rotating shaft, which is hatched in the figure, and rotates in the directions indicated by the double-headed arrow. In response to the rotation of the knob 2', the lenses in the observation optical systems 2L and 2R move in the optical axis direction to effect a magnification change. The fluorescence illumination apparatus A is also provided with a moving mechanism 15' for moving a lens. The moving mechanism 15' has a rotating shaft, which is hatched in the figure, and rotates in the directions indicated by the double-headed arrow as in the case of the variable magnification knob 2'. In this example, a belt Y is provided between the variable magnification knob 2' and the moving mechanism 15' to transmit the rotation of the variable magnification knob 2' to the moving mechanism 15'. With this arrangement, when the observer rotates the variable magnification knob 2' to change the observation area, the lenses in the observation optical systems 2L and 2R move in the optical axis direction. At the same time, the rotation of the variable magnification knob 2' is transmitted to the moving mechanism 15' by the belt Y, causing the lens in the fluorescence illumination apparatus A to move. Accordingly, the illumination area can be changed in response to a change of the observation area caused by a magnification change effected by the variable magnification optical system.

Example 3

Figure 21A:
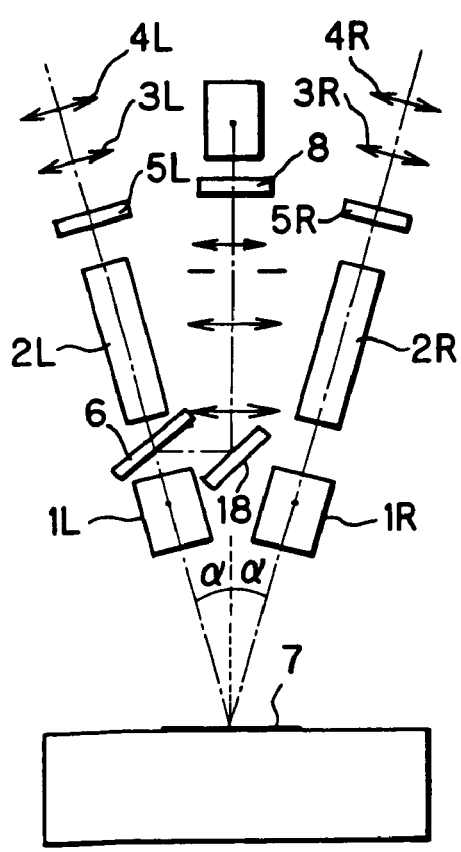
FIG. 21 is a diagram showing the arrangement of an optical apparatus according to Example 3 of the present invention, in which part (a) is a front view showing only a fluorescence observation optical system in a Greenough stereoscopic microscope, and part (b) is a side view showing the entire optical apparatus.
Figure 21B:
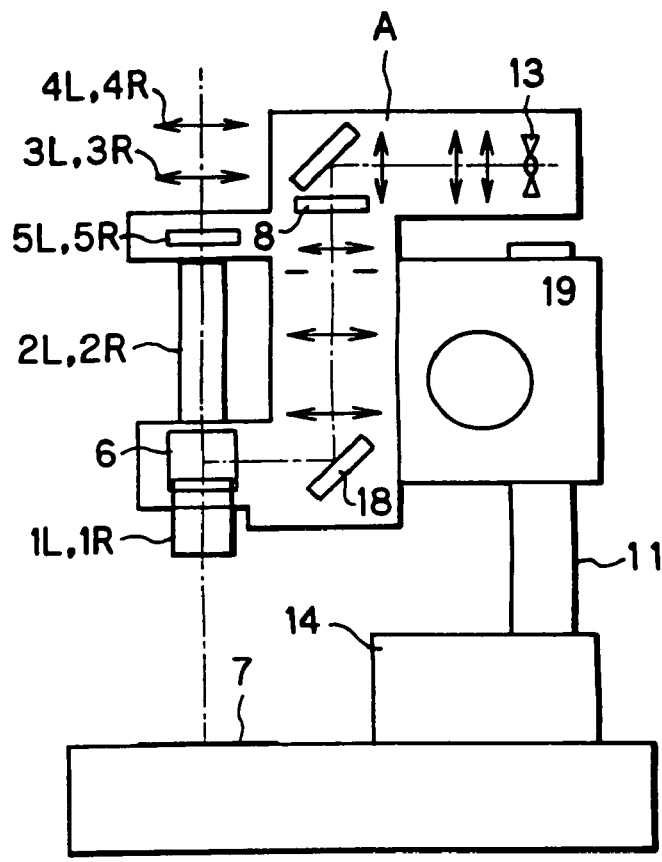

Example 3 of the optical apparatus according to the present invention is shown in FIG. 21. In the optical apparatus shown in FIG. 21, the objective, the observation optical system unit and the imaging optical system unit of the optical apparatus according to Example 1 are each formed from a pair of lens units. The pair of lens units of each of these components are placed at a tilt to an axis normal to the sample surface and in symmetry with respect to the axis. Thus, the optical apparatus is a Greenough stereoscopic microscope. It should be noted that the optical apparatus uses a fluorescence illumination apparatus A, a frame 10, a frame socket 14, a post 11 and a focusing unit 19 which have arrangements similar to those in Example 1. In the fluorescence illumination apparatus A, the movement of the collector lens unit G0 and the movement of the variable lens in the second relay lens unit G2 can be performed in the same way as in Example 1. The excitation filter 8 and the absorption filters 5L and 5R can be adapted to be interchangeable with other excitation and absorption filters by partially modifying the filter unit shown in Example 1. Because the optical apparatus according to Example 3 is a Greenough stereoscopic microscope, the left-hand lens unit (1L, 2L, 5L, 3L and 4L) and the right-hand lens unit (1R, 2R, 5R, 3R and 4R) are disposed on the left and right sides, respectively, of an axis normal to the surface of the sample 7. Each lens unit is tilted at the same angle α with respect to the axis normal to the surface of the sample 7 so that left and right optical axes determined by the left and right lens units intersect each other on the sample 7. With this arrangement, it is possible to view the sample 7 stereoscopically.

In the optical apparatus according to Example 3 also, the observation optical system unit and the imaging optical system unit are each formed from a pair of lens units. Accordingly, the optical apparatus is provided with a pair of absorption filters 5L and 5R (left and right) as second wavelength selecting members for selectively transmitting fluorescent light. Therefore, fluorescent light from the sample 7 passes through the objectives 1L and 1R and then passes through the left-hand side lens units and the right-hand side lens units to reach the left and right eyes of the observer.

In this example also, illuminating light for illuminating the sample 7 does not pass through the observation optical system unit 2. However, unlike illuminating light in Examples 1 and 2, illuminating light for illuminating the sample 7 does not pass through the objectives 1L and 1R in this example. Accordingly, no autofluorescence occurs from the observation optical systems 2L and 2R in the observation optical system unit 2. Therefore, it is possible to obtain a fluorescence image with high contrast. In addition, because illuminating light does not pass through the objectives 1L and 1R, autofluorescence does not occur in the objectives 1L and 1R.

Furthermore, because any desired vitreous material can be freely selected to form the lenses of the objectives 1L and 1R and those of the observation optical system without a need to care about the occurrence of autofluorescence, the observation apparatus can be formed from a favorably corrected optical system. Similarly, even if autofluorescence occurs in the fluorescence illumination apparatus A, the intensity of autofluorescence light is very weak in comparison to illuminating light. Therefore, no problem arises in terms of illumination. Accordingly, any desired vitreous material can be freely selected to form the illumination optical system without a need to care about the occurrence of autofluorescence. Therefore, it is possible to form the illumination optical system from a favorably corrected optical system.

It should be noted that because this example differs from Examples 1 and 2 only a little in the arrangement of the optical system of the observation apparatus, various mechanisms shown in Examples 1 and 2 are all applicable to this example.

Example 4

Figure 22B:
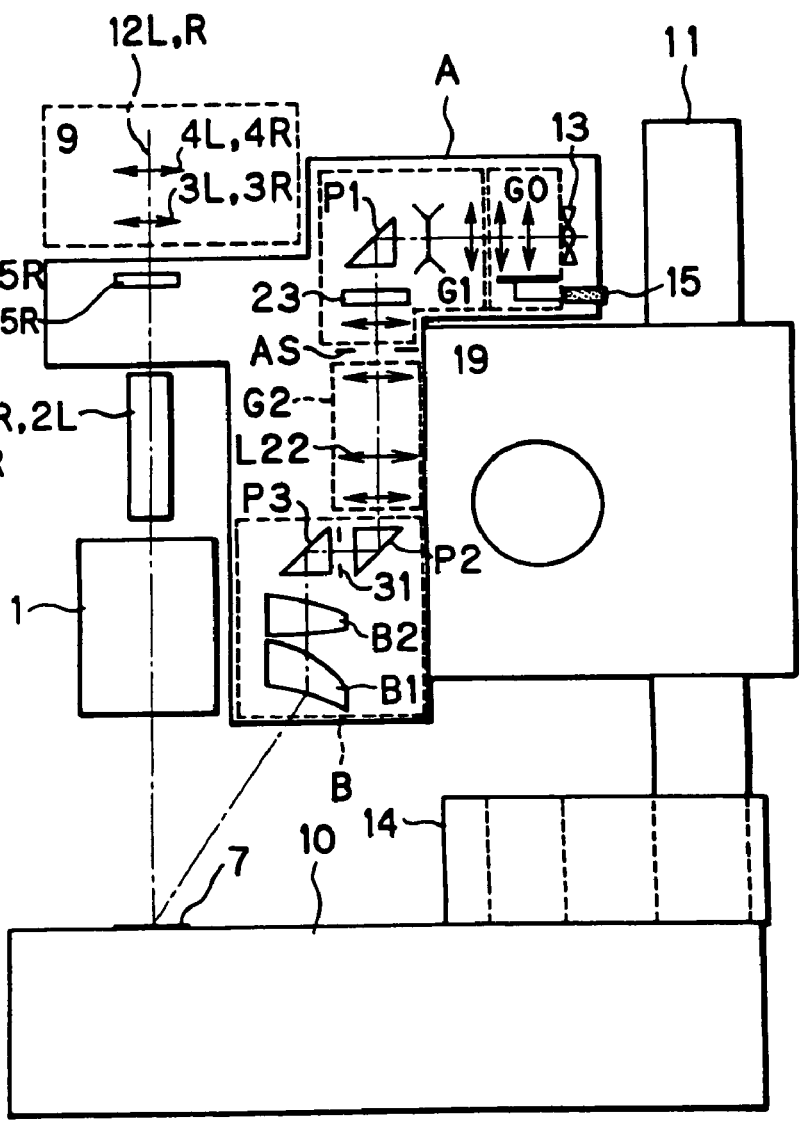
FIG. 22 is a diagram showing the arrangement of an optical apparatus according to Example 4 of the present invention as equipped with a distal end illumination unit that performs illumination directly without using an objective, in which part (a) is a front view showing only a fluorescence observation optical system, and part (b) is a side view showing the entire optical apparatus.
Figure 22A:
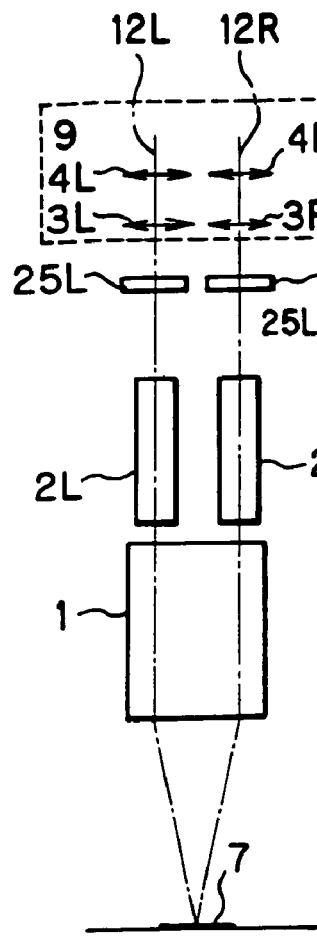

Example 4 of the optical apparatus according to the present invention is shown in FIG. 22. The optical apparatus shown in FIG. 22 is a Galilean stereoscopic microscope as in the case of Example 2. Regarding the arrangement of the fluorescence illumination apparatus A, the collector lens unit G0 and the first relay lens unit G1 are similar to those in Example 2. The second relay lens unit G2 differs from that in Example 2 in that lenses of positive refracting power are provided in series in place of the reflecting member. Accordingly, in this example, illuminating light emerges from the second relay lens unit G2 approximately in parallel to the optical axis of the objective 1, whereas, in Example 2, illuminating light emerges from the second relay lens unit G2 in a direction perpendicular (or non-parallel) to the optical axis of the objective 1.

In this example, a distal end illumination unit B is placed in close proximity to the outer periphery of the objective 1 to lead illuminating light emerging from the second relay lens unit G2 to the sample 7. The distal end illumination unit B includes prisms P2 and P3 and lenses B1 and B2. The prisms P2 and P3 are triangular prisms. The prism P2 is placed so as to deflect illuminating light emerging from the second relay lens unit G2 toward the objective 1. The prism P3 is placed so as to deflect the illuminating light deflected by the prism P2 toward the sample 7. It should be noted that reference numeral 31 denotes a pupil position of the distal end illumination unit B. In this example, the pupil is formed between the prisms P2 and P3. The lenses B1 and B2 are semicircular lenses each having a shape formed by cutting off a part of a circular lens. This is equivalent to an arrangement in which circular lenses are placed in such a manner as to be decentered with respect to the optical axis of illuminating light emerging from the prism P3, whereby the optical axis of illuminating light passes through a peripheral portion of each of the circular lenses. A portion of each circular lens that faces the portion through which illuminating light passes across the optical axis is cut off because it is not used for illumination, resulting in the configuration of each of the lenses B1 and B2 as shown in FIG. 22.

Table 2-1 shows lens data concerning the optical system of the fluorescence illumination apparatus A. Table 2-2 shows lens data concerning the distal end illumination unit B. Because the objective 1 is the same as the objective stated above with respect to Example 2, lens data concerning the objective 1 is omitted in Table 2-1. Table 2-1 shows lens data concerning constituent elements of the distal end illumination unit B, from the pupil position 31 to the light source 13, shown in FIG. 22.

In Table 2-1, the surface Nos. 1 to 3 correspond to the prism P2 in FIG. 22. The surface Nos. 4 to 12 correspond to the second relay lens unit G2, in which the surface Nos. 6 to 10 correspond to the lens unit L22, which is formed from a biconvex lens and a cemented lens. The surface No. 13 is the aperture stop AS. The surface Nos. 14 to 22 correspond to the first relay lens unit G1, in which the surface No. 17 is the reflecting surface of the prism P1. The surface Nos. 23 to 34 correspond to the collector lens unit G0, in which the surface Nos. 23 to 26 correspond to the infrared cutoff filter. It should be noted that lens data concerning the excitation filter 23 is omitted in Table 2-1.

FIG. 23 illustrates optical ray traces of the optical system based on the lens data shown in Table 2-1 at the lowest, intermediate and highest magnifications. FIG. 24 shows the layout of the distal end illumination unit B and also illustrates optical ray traces of the optical system thereof at the lowest, intermediate and highest magnifications. In FIG. 24, the lenses B1 and B2 are shown by circular lenses for the sake of convenience. The lens (surface No. 9) closer to the sample surface (surface No. 10) is the lens B1 in FIG. 22. The lens (surface No. 6) closer to the prism (surface Nos. 3 and 4) is the lens B2.

In this arrangement, light from the light source 13 is collected by the collector lens unit G0. A wavelength for illuminating the sample 7 is selectively transmitted by the excitation filter 23 in the system of the first relay lens unit G1, and a first image of the light source 13 is formed. The first image of the light source 13 is projected as a second light source image at the pupil position 31 of the distal end illumination unit B by the second relay lens unit G2.

The distal end illumination unit B is constructed and arranged to enable the second image of the light source 13 projected in the vicinity of the pupil position 31 to be applied to the sample 7 in such a manner that the illumination center position and the observation center position coincide with each other by the lens units and the deflection members in the distal end illumination unit B. In addition, the lens unit L22 in the second relay lens unit G2 of the fluorescence illumination apparatus A moves in association with a magnification changing operation of the observation optical system to project the second light source image at the pupil position 31 of the distal end illumination unit B at an optimum projection magnification and an incident angle needed for the observation area and the illumination area to be approximately coincident with each other, thereby allowing the observation area and the illumination area to coincide with each other at all times, as in the case of Example 2.

Accordingly, in this example also, excitation light illuminates the sample 7 without passing through the objective 1 and the observation optical system. Consequently, no autofluorescence occurs in the observation optical system, and there is neither leakage nor reflection of excitation light. Therefore, it becomes possible to perform fluorescence observation with very high contrast.

It will be understood from Table 2-1 that the values of the exit pupil position D of the fluorescence illumination optical system satisfy the condition (2), and it is therefore possible in this example to realize critical illumination by varying the distance between the light source 13 and the collector lens unit G0.

Incidentally, the distal end illumination unit B may be arranged to be interchangeable in accordance with the objective 1 used. When the objective 1 is interchanged with another objective, the observation area and the working distance change. Therefore, if the distal end illumination unit B is arranged to be interchangeable, even when another objective is used, it is possible to provide an illumination area and illumination intensity conformable to the objective. In this case, it is desirable that the distal end illumination unit B should satisfy the following condition:

$$0.7 \leq Fob/F \leq 1.2 \quad (3)$$

where F is the focal length of the optical system of the distal end illumination unit B, and Fob is the focal length of the objective.

Alternatively, it is desirable to satisfy the following condition:

$$0.5 \leq Sob/S \leq 1.4 \quad (4)$$

where S is the square measure of an area illuminated by the distal end illumination unit B, and Sob is the square measure of an area viewed with the objective.

By satisfying the above condition, it is possible to perform Koehler illumination in a state where the illumination area and illumination intensity of illuminating light are adjusted optimally even when the observation area and the working distance change as a result of interchanging the objective 1 with another objective. If the upper limit of either of the conditions (3) and (4), i.e. 1.2 or 1.4, is exceeded, the focal length of the distal end illumination unit B becomes excessively short, and the distance from the distal end illumination unit B to the sample 7 becomes so short that it is not easy to change the objective 1 and the sample 7. Thus, operability is degraded. If Fob/F is smaller than the lower limit, i.e. 0.7, or Sob/S is smaller than the lower limit, i.e. 0.5, the focal length of the distal end illumination unit B becomes excessively long, and the numerical aperture of illuminating light applied to the sample 7 from the distal end illumination unit B decreases undesirably. Consequently, the brightness of the fluorescence image lowers unfavorably.

In this example, the focal length of the distal end illumination unit B is F=95 millimeters, and the focal length of the objective 1 is Fob=75 millimeters. Therefore, the condition (3) is satisfied. The illumination area (diameter) at the lowest, intermediate and highest magnifications is 26.19 millimeters, 8.0 millimeters and 2.0 millimeters, respectively. On the other hand, the observation area (diameter) can be obtained from Table 1-4 by the field number divided by the magnification of the entire system. The illumination area at the lowest, intermediate and highest magnifications is 26.19 millimeters, 7.97 millimeters and 2.03 millimeters, respectively. Therefore, the condition (4) is satisfied.

It should be noted that when the working distance is changed as a result of interchanging the objective 1 with another objective, it is necessary to change the distance between the sample 7 and the objective 1 by rotating the focusing knob 19a. At this time, the fluorescence illumination apparatus A moves together with the objective 1 (observation apparatus C) because the fluorescence illumination apparatus A is mounted on the focusing unit 19. As a result, the optical axis of the illumination optical system on the exit side of the distal end illumination unit B fails to coincide with the optical axis of the objective 1 on the sample 7. In this regard, if a driving mechanism for moving a lens in the distal end illumination unit B or for rotating a prism or a mirror is provided, it is possible to change the tilt of the optical axis of the illumination optical system on the exit side of the distal end illumination unit B. Therefore, the respective center positions and ranges of the observation area and the illumination area can be made coincident with each other.

In addition to the above, the following arrangement may be adopted. The fluorescence illumination apparatus A is not mounted on the focusing unit 19 but installed directly on the post 11, and only the observation apparatus C is mounted on the focusing unit 19. With this arrangement, the fluorescence illumination apparatus A does not move when the objective 1 is moved by rotating the focusing knob 19a. Therefore, the optical axis of the illumination optical system on the exit side of the distal end illumination unit B and the optical axis of the objective 1 can be kept coincident with each other on the sample 7.

In this example, the lenses B1 and B2 in the distal end illumination unit B are semicircular lenses. The lens B1 has a sectional configuration formed by halving a biconvex lens. The lens B2 has a configuration formed by halving a meniscus lens of positive refracting power having a concave surface directed toward the sample 7. However, lenses used to form the distal end illumination unit B are not necessarily limited to the above-described lenses. The distal end illumination unit B can be formed by using ordinary lenses (circular lenses). Such an arrangement is shown in FIG. 25.

Figure 25A:
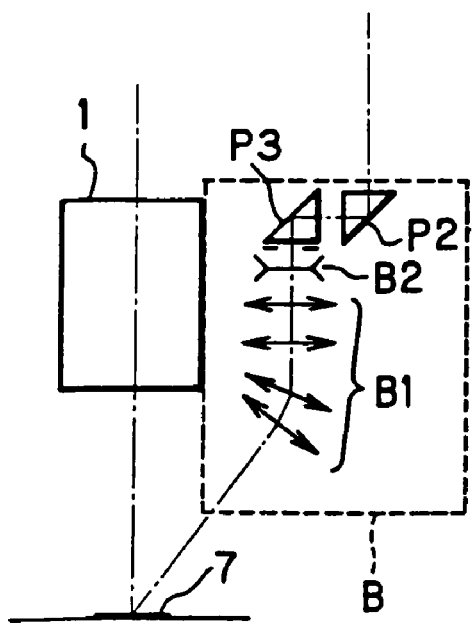
FIG. 25 is a diagram showing another arrangement of the optical system of the distal end illumination unit, in which: part (a) shows a case where lens elements are placed at a tilt to the optical axis of an illumination optical system; part (b) shows a case where a reflecting mirror is placed at a tilt; and part (c) shows a case where the diameter of a lens element of an objective that is closest to a sample is increased.
Figure 25B:
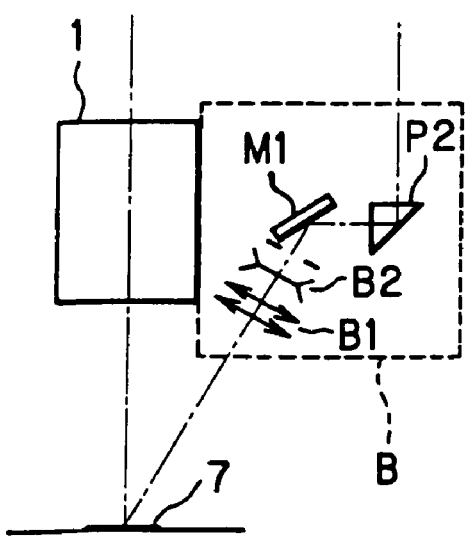
Figure 25C:
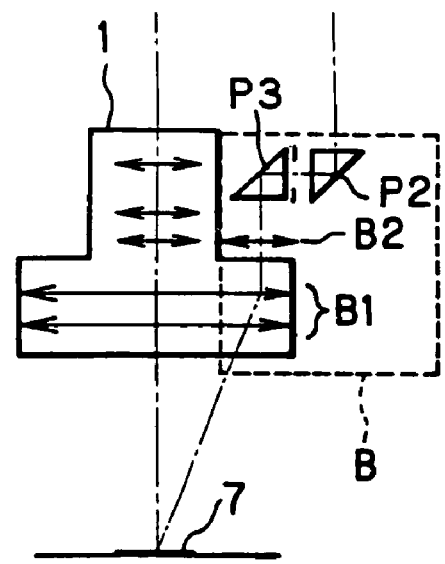

Part (a) of FIG. 25 shows an example in which a part of lens elements of the lens B1 is tilted with respect to the optical axis of the illumination optical system, thereby making the optical axis of the illumination optical system coincident with the optical axis of the objective 1 on the sample 7. The distal end illumination unit B includes two prisms P2 and P3, a lens B1 formed from four lens elements of positive refracting power, and a lens B2 formed from a single lens of negative refracting power. The prisms P2 and P3 are right-angled triangular prisms. The optical axis of the illumination optical system, which is approximately parallel to the optical axis of the objective 1, is deflected toward the objective 1 by the prism P2 and then deflected by the prism P3 to extend approximately parallel to the optical axis of the objective 1. The lens B2 and two prism-side lens elements of the lens B1 are placed so that the center axis of each of them is coincident with the optical axis of the illumination optical system. It should be noted that the pupil position of the distal end illumination unit B lies between the prism P3 and the lens B2.

The third lens element of the lens B1 is tilted with respect to the optical axis of the illumination optical system (although the center of the lens element is on the optical axis of the illumination optical system, the center axis thereof is tilted with respect to the optical axis of the illumination optical system). Therefore, the optical axis of the illumination optical system is bent toward the objective 1 by the third lens element. By appropriately selecting a degree of tilt of the third lens element, the optical axis of the illumination optical system can be made coincident with the optical axis of the objective 1 on the sample 7. Although only one lens element is tilted with respect to the optical axis of the illumination optical system in the arrangement shown in part (a) of FIG. 25, a plurality of lens elements may be tilted with respect to the optical axis of the illumination optical system.

Part (b) of FIG. 25 shows an example in which a reflecting mirror is provided at a tilt to make the optical axis of the illumination optical system coincident with the optical axis of the objective 1 on the sample 7. The distal end illumination unit B includes a prism P2, a reflecting mirror M1, a lens B1 formed from two lens elements of positive refracting power, and a lens B2 formed from a single lens of negative refracting power. In this example, the optical axis of the illumination optical system, which is approximately parallel to the optical axis of the objective 1, is deflected toward the objective 1 by the prism P2 and then incident on the reflecting mirror M1. The reflecting mirror M1 is placed so that the optical axis of the illumination optical system coincides with the optical axis of the objective 1 on the sample 7. Accordingly, both the lenses B1 and B2 are placed so that the center axis of each of them is coincident with the optical axis of the illumination optical system. It should be noted that the pupil position of the distal end illumination unit B lies between the reflecting mirror M1 and the lens B2.

Part (c) of FIG. 25 shows an example in which a lens in the objective 1 that is closest to the sample 7 has an increased diameter, and the optical axis of the illumination optical system is passed through a peripheral portion of the objective 1, thereby making the optical axis of the illumination optical system coincident with the optical axis of the objective 1 on the sample 7. The distal end illumination unit B includes a prism P2, a prism P3, a lens B1 that also constitutes a part of the objective 1, and a single lens B2 of positive refracting power. It should be noted that the pupil position of the distal end illumination unit B lies between the prisms P2 and P3.

The distal end illumination unit B shown in FIG. 22 is one example of the arrangement for making the optical axis of the illumination optical system coincident with the optical axis of the objective 1 on the sample 7. As shown in FIG. 24, the distal end illumination unit B is arranged to bend the optical axis of the illumination optical system by passing illuminating light through a peripheral portion of each constituent lens. In view of the fact that in FIG. 22 the distal end illumination unit B is placed in close proximity to the objective 1 and the fact that the optical axis of the illumination optical system is bent by passing illuminating light through a peripheral portion of each constituent lens, the same action and effect can be obtained by integrating the lens B1 of the distal end illumination unit B with the objective 1. Thus, the optical axis of the illumination optical system can be made coincident with the optical axis of the objective 1 on the sample 7 by increasing the diameter of a lens in the objective 1 that is closest to the sample surface and using a peripheral portion of the lens as a part of the distal end illumination unit B.

Example 5

Figure 26:
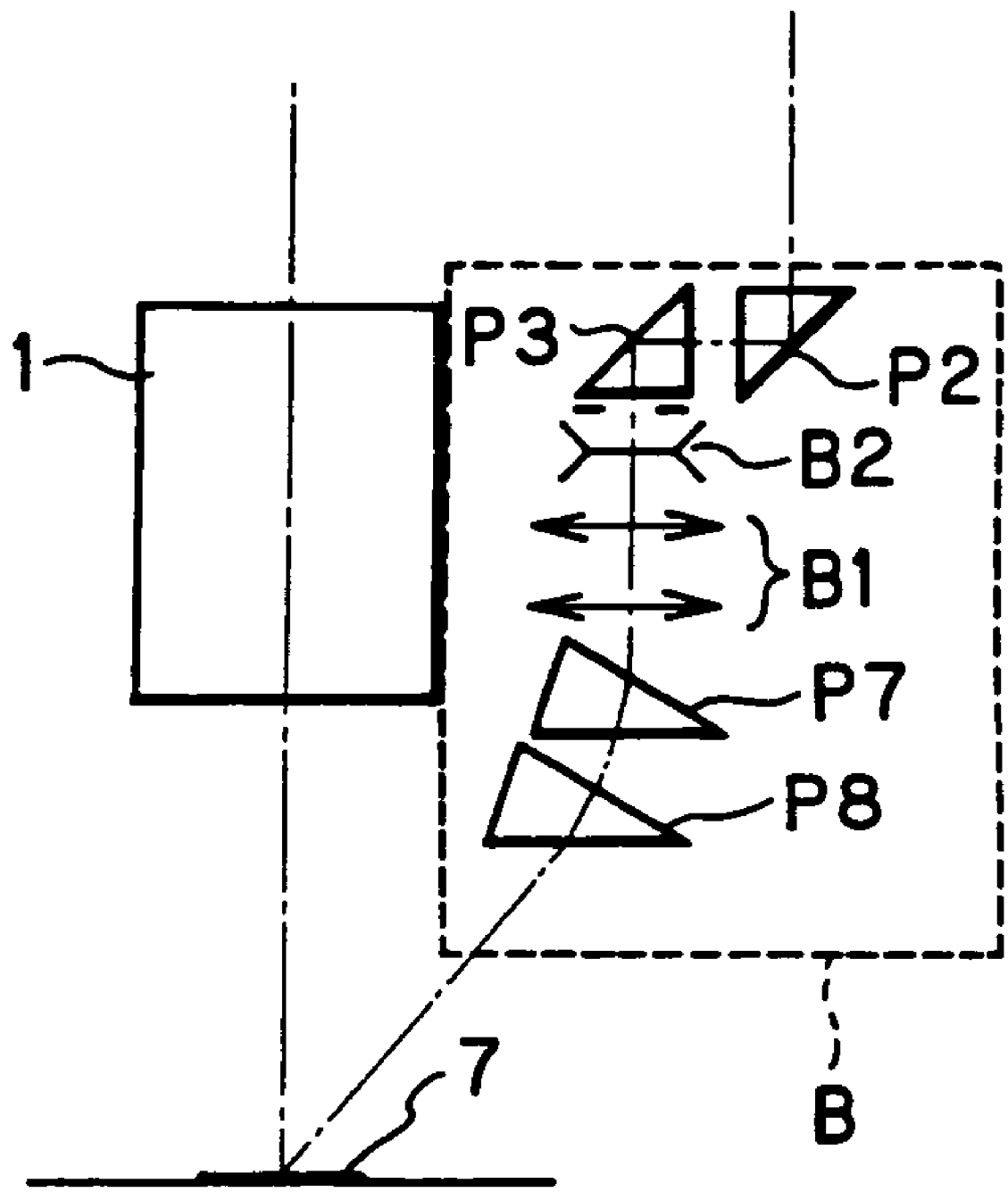
FIG. 26 is a diagram showing Example 5 that provides another arrangement of the distal end illumination unit in which a wedge prism is used.

Another arrangement of the distal end illumination unit B is shown in FIG. 26. The distal end illumination unit B includes four prisms P2, P3, P7 and P8, a lens B1 formed from two lens elements of positive refracting power, and a lens B2 formed from a single lens of negative refracting power. The prisms P2 and P3 are right-angled triangular prisms. The prisms P7 and P8 are wedge prisms. The optical axis of the illumination optical system, which is approximately parallel to the optical axis of the objective 1, is deflected toward the objective 1 by the prism P2 and then deflected by the prism P3 so as to be approximately parallel to the optical axis of the objective 1. The lenses B1 and B2 are placed so that the center axis of each lens is coincident with the optical axis of the illumination optical system. It should be noted that the pupil position of the distal end illumination unit B lies between the prism P3 and the lens B2.

The prism P7 is placed on the sample 7 side of the lens B1. The prism P7 bends the optical axis of the illumination optical system toward the objective 1. The optical axis of the illumination optical system is further bent toward the objective 1 by the prism P8 provided subsequently to the prism P7. Accordingly, the optical axis of the illumination optical system can be made coincident with the optical axis of the objective 1 on the sample 7 by appropriately selecting the apex angles of the wedge prisms P7 and P8, the positions at which these prisms are placed, and the distance between them. Thus, in this example, the optical axis of the illumination optical system is bent only by the refracting action of the wedge prisms P7 and P8. Although the number of wedge prisms in this example is two, the number of wedge prisms is not necessarily limited to two. One or three or more wedge prisms may be used to form the distal end illumination unit B.

Table 3 shows lens data concerning the distal end illumination unit B in this example. The surface Nos. 2 to 4 correspond to the right-angled triangular prism P3. The surface Nos. 6 to 7 correspond to the lens B2. The surface Nos. 8 to 11 correspond to the lens B1. The surface Nos. 14 to 15 correspond to the wedge prism P7. The surface Nos. 16 to 17 correspond to the wedge prism P8. FIG. 27 shows the layout of the distal end illumination unit B based on the lens data shown in Table 3 and also illustrates optical ray traces of the optical system thereof at the lowest, intermediate and highest magnifications. The focal length of the distal end illumination unit B is F=95 millimeters. The focal length of the objective 1 is Fob=75 millimeters. Therefore, the condition (3) is satisfied. The observation area is the same as that in Example 4. Therefore, the condition (4) is also satisfied.

Example 6

Figure 28:
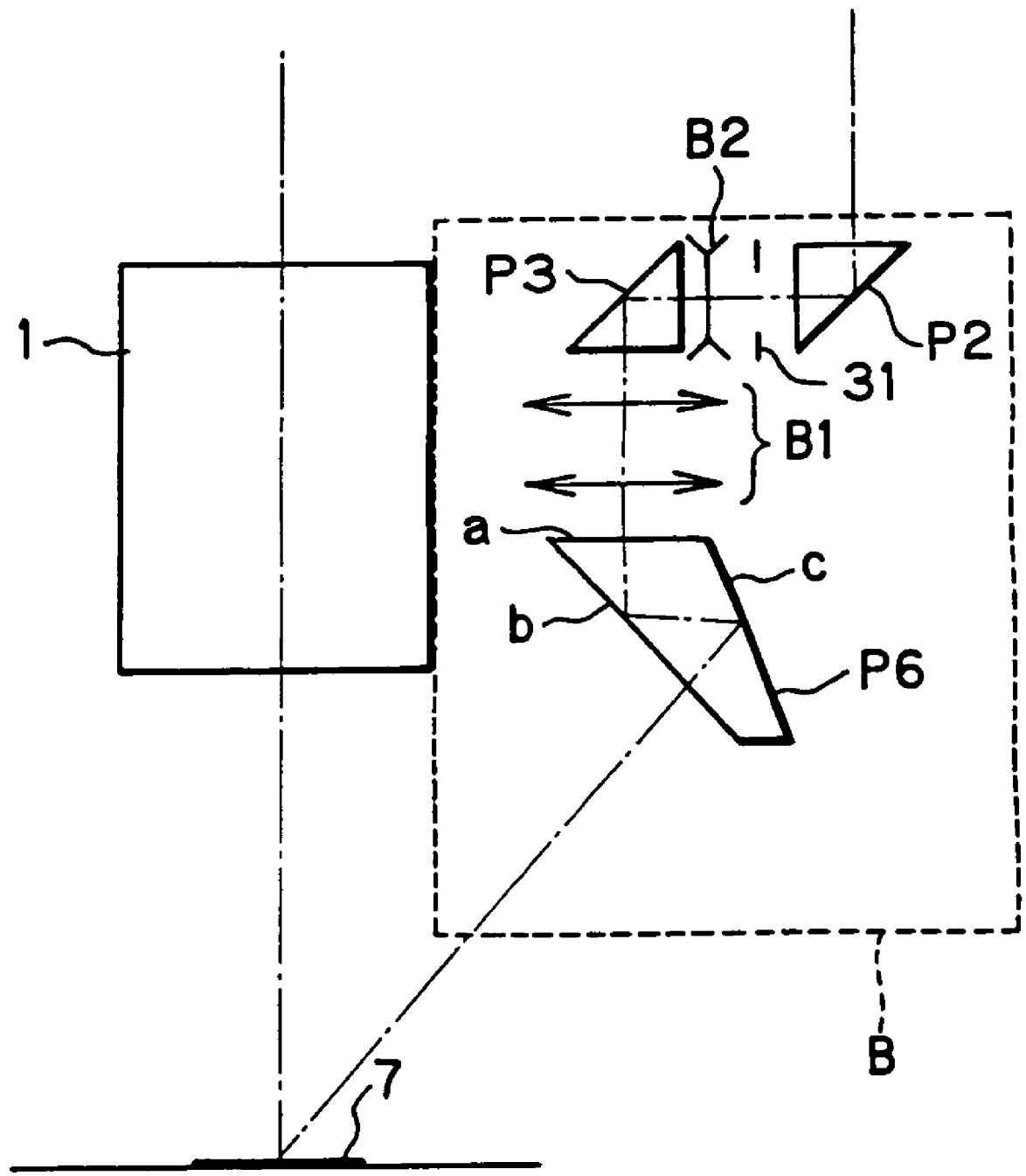
FIG. 28 is a diagram showing Example 6 that provides another arrangement of the distal end illumination unit in which a deflection prism is used.

Still another arrangement of the distal end illumination unit B is shown in FIG. 28. The distal end illumination unit B includes three prisms P2, P3 and P6, a lens B1 formed from two lens elements of positive refracting power, and a lens B2 formed from a single lens of negative refracting power. The prisms P2 and P3 are right-angled triangular prisms. The prism P6 is a wedge-shaped deflection prism. The optical axis of the illumination optical system, which is approximately parallel to the optical axis of the objective 1, is deflected toward the objective 1 by the prism P2 and then deflected by the prism P3 so as to be approximately parallel to the optical axis of the objective 1. The lenses B1 and B2 are placed so that the center axis of each lens is coincident with the optical axis of the illumination optical system. It should be noted that the lens B2 is placed between the prisms P2 and P3, and the pupil position 31 of the distal end illumination unit B lies between the prism P2 and the lens B2.

The deflection prism P6 is placed on the sample 7 side of the lens B1. The optical axis of the illumination optical system deflected by the prism P3 enters the prism P6 through a first surface a and is then deflected away from the optical axis of the objective 1 by a second surface b. The deflected optical axis of the illumination optical system is deflected toward the optical axis of the objective 1 by a surface c. Then, the optical axis of the illumination optical system exits the deflection prism P6 through the second surface b. The tilt of each of the second surface b and the third surface c is set so that the optical axis of the illumination optical system deflected by the third surface c exits the deflection prism P6 without being deflected when passing through the second surface b and coincides with the optical axis of the objective 1 on the sample 7.

Table 4 shows lens data concerning the distal end illumination unit B in this example. The surface Nos. 3 to 4 correspond to the lens B2. The surface Nos. 5 to 7 correspond to the right-angled triangular prism P3. The surface Nos. 8 to 10 correspond to the lens B1. The surface Nos. 12 to 14 correspond to the deflection prism P6. FIG. 29 shows the layout of the distal end illumination unit B based on the lens data shown in Table 4 and also illustrates optical ray traces of the optical system thereof at the lowest, intermediate and highest magnifications. As will be understood from the ray path diagrams, all the surfaces of the prism P6 are formed from plane surfaces. Incident illuminating light enters the prism P6 through a first surface a while being refracted. The incident illuminating light is totally reflected by a second surface b and reflected by a third surface c so as to exit the prism P6 through the second surface b. Thus, it will be understood that the deflection prism P6 is an optical member that makes incident light emerge therefrom by a refracting action and a reflecting action. It should be noted that the focal length of the distal end illumination unit B is F=95 millimeters, and the focal length of the objective 1 is Fob=75 millimeters. Therefore, the condition (3) is satisfied. In addition, the observation area is the same as that in Example 4. Therefore, the condition (4) is also satisfied. All the surfaces of the prism P6 need not be plane surfaces. It is also possible to form the prism P6 from spherical surfaces, aspherical surfaces, rotationally asymmetric surfaces, or diffraction surfaces.

Example 7

Figure 30A:
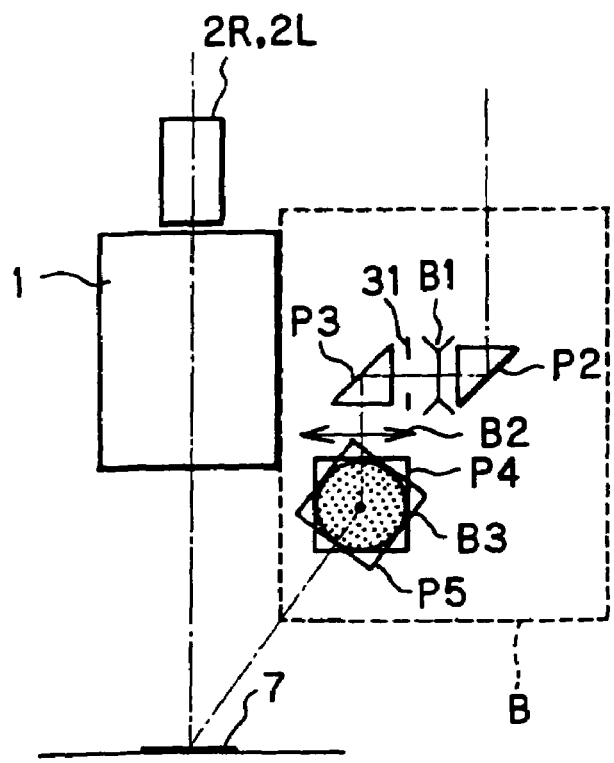
FIG. 30 is a diagram showing Example 7 that provides still another arrangement of the distal end illumination unit, in which: part (a) is a side view of the distal end illumination unit, an objective and an observation optical system; part (b) is a front view of the arrangement; and part (c) is a top view of the arrangement.
Figure 30B:
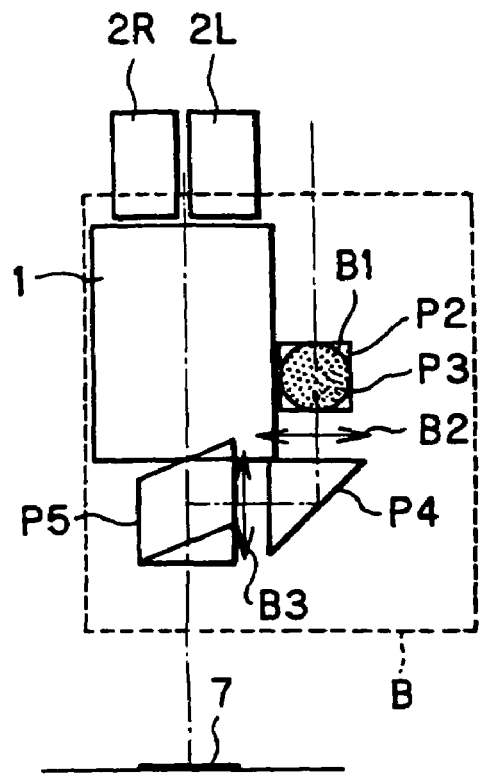
Figure 30C:
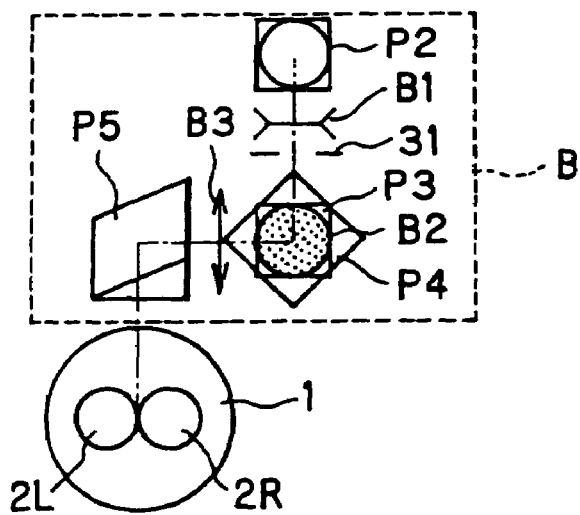

Another arrangement of the distal end illumination unit B is shown in FIG. 30. Part (a) of FIG. 30 is a side view of an arrangement including the distal end illumination unit B, the objective 1 and the observation optical systems 2L and 2R. Part (b) of FIG. 30 is a front view of the arrangement. Part (c) of FIG. 30 is a top view of the arrangement.

The distal end illumination unit B includes four prisms P2, P3, P4 and P5, a lens B1 formed from a single lens of negative refracting power, a lens B2 formed from a single lens of positive refracting power, and a lens B3 formed from a single lens of positive refracting power. The prisms P2, P3, P4 and P5 are all right-angled triangular prisms. The prism P2 is placed so that the optical axis of the illumination optical system, which is approximately parallel to the optical axis of the objective 1, is deflected toward the objective 1. The prism P3 is placed so that the optical axis deflected by the prism P2 is deflected to extend approximately parallel to the optical axis of the objective 1. The prism P4 is placed so that the optical axis of the illumination optical system is deflected to a direction perpendicular to the optical axis between the prisms P2 and P3. The prism P5 is placed so that the optical axis of the illumination optical system deflected by the prism P4 coincides (intersects) the optical axis of the objective 1 on the sample 7.

The lenses B1, B2 and B3 are placed so that the center axis of each lens is coincident with the optical axis of the illumination optical system. The lens B1 is placed between the prisms P2 and P3. It should be noted that the pupil position of the distal end illumination unit B lies between the lens B1 and the prism P3. The lens B2 is placed between the prisms P3 and P4. The lens B3 is placed between the prisms P4 and P5.

Table 5 shows lens data concerning the distal end illumination unit B in this example. The surface Nos. 3 to 4 correspond to the lens B1. The surface Nos. 5 to 7 correspond to the right-angled triangular prism P3. The surface Nos. 8 to 9 correspond to the lens B2. The surface Nos. 10 to 12 correspond to the right-angled triangular prism P4. The surface Nos. 13 to 14 correspond to the lens B3. The surface Nos. 15 to 17 correspond to the right-angled triangular prism P5. FIG. 31 illustrates optical ray traces of the distal end illumination unit B based on the lens data shown in Table 5 at the lowest, intermediate and highest magnifications. It should be noted that the focal length of the distal end illumination unit B is F=90 millimeters, and the focal length of the objective 1 is Fob=75 millimeters. Therefore, the condition (3) is satisfied. The illumination area (diameter) at the lowest, intermediate and highest magnifications is 31.4 millimeters, 9.6 millimeters and 2.4 millimeters, respectively. Therefore, the condition (4) is also satisfied.

In this example, the distal end illumination unit B has two prisms P4 and P5 in excess of the number of prisms provided in Example 4. Therefore, the optical axis of the illumination optical system, which is determined by the optical systems extending from the light source 13 to the optical component immediately preceding the distal end illumination unit B, can be deflected to various directions by the prisms P4 and P5. Accordingly, the optical axis of the illumination optical system can be readily made coincident with the optical axis of the objective 1 on the sample 7. In addition, an illuminating direction can be selected freely. The space between the objective 1 and the post 11 is a dead space. Therefore, if the prisms P4 and P5 are placed in this space, the fluorescence illumination apparatus A can be installed without causing the optical apparatus to increase in size.

Figure 32:
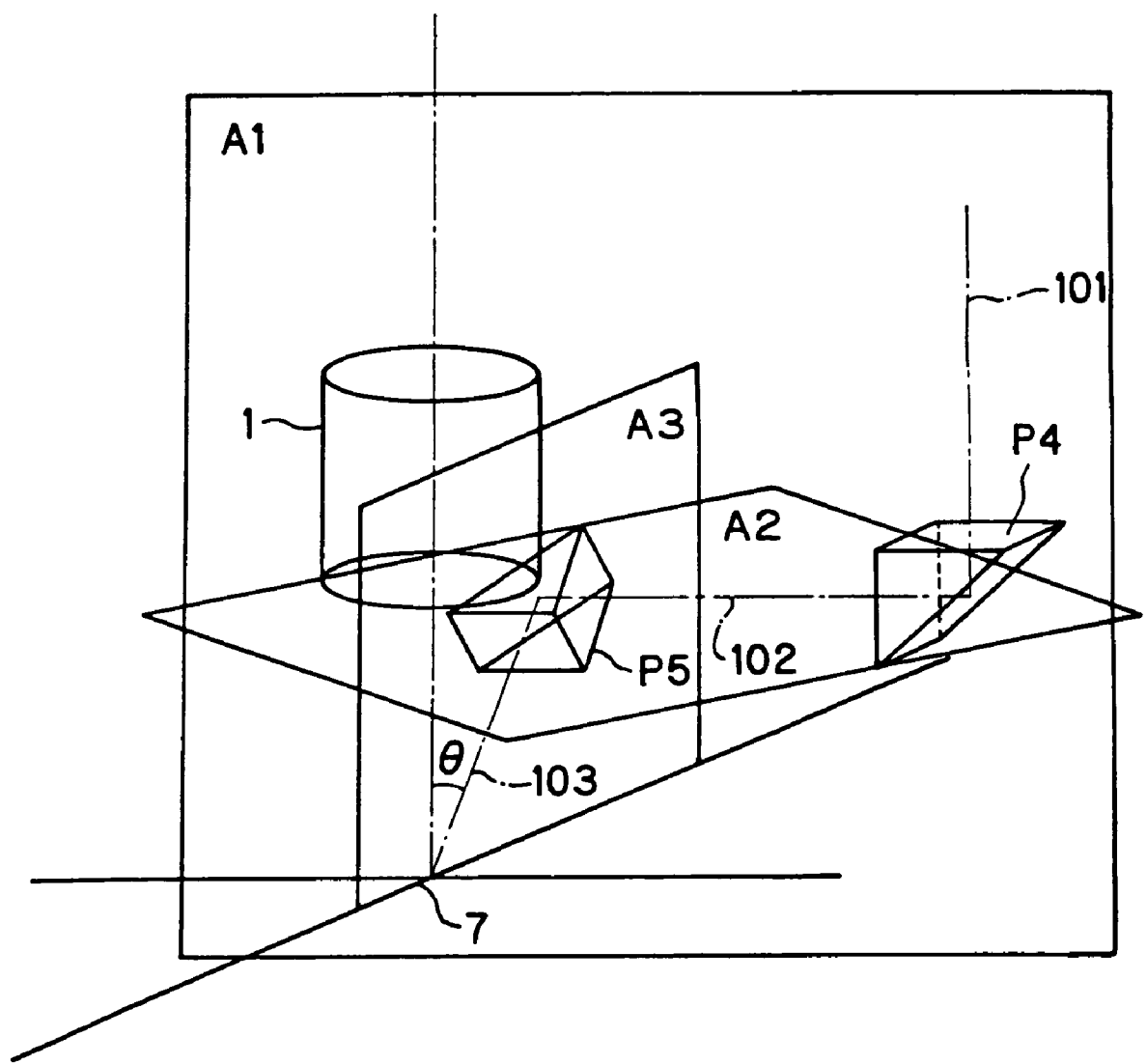
FIG. 32 is a diagram showing a distal end illumination unit formed from two prisms.
Figure 33:
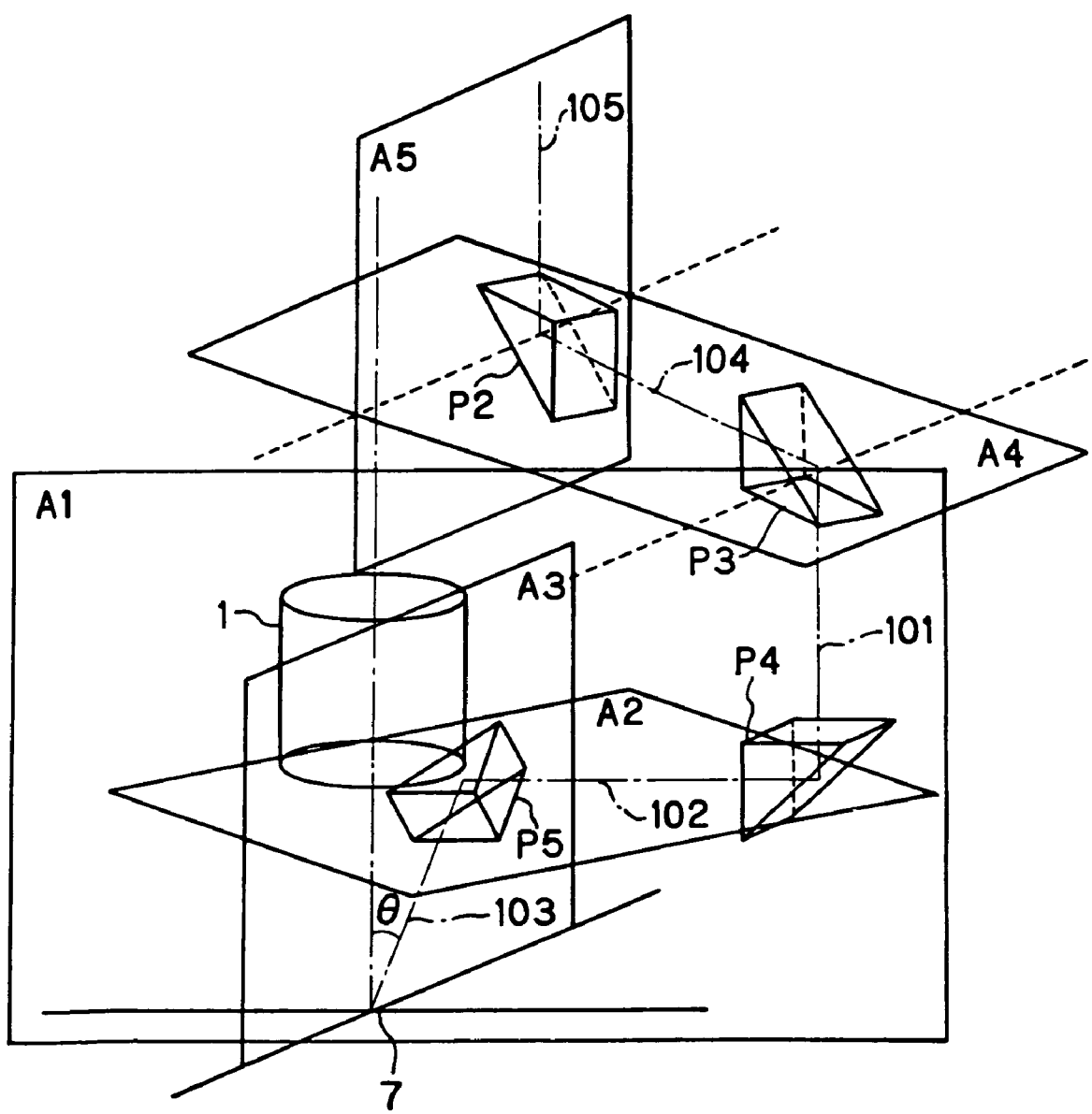
FIG. 33 is a diagram showing a distal end illumination unit formed from four prisms.

FIGS. 32 and 33 are perspective views showing only the objective 1 and the prisms P2, P3, P4 and P5 in the arrangement shown in FIG. 30. FIG. 32 shows the arrangement of the objective 1 and the prisms P4 and P5. FIG. 33 shows the arrangement of the objective 1 and the prisms P2, P3, P4 and P5.

As shown in FIG. 32, the optical axis 101 of the illumination optical system is approximately parallel to the optical axis of the objective 1. A plane A1 contains both the optical axis 101 and the optical axis of the objective 1. The prisms P4 and P5, which are light-deflecting members, are placed in a plane A2 perpendicular to the plane A1. The prism P4 is placed so that the deflected optical axis 101 extends toward the objective 1. Reference numeral 102 denotes the optical axis deflected by the prism P4. The prism P5 deflects the optical axis 102 so that the optical axis 102 intersects the surface of the sample 7 obliquely and the optical axis 103 deflected by the prism P5 intersects the optical axis of the objective 1 at an angle θ on the sample 7. It should be noted that a plane A3 contains both the optical axis 102 and the optical axis of the objective 1.

In FIG. 32, the optical axis 101 is approximately parallel to the optical axis of the objective 1. On the other hand, the optical axis determined by the optical systems extending from the light source 13 to the second relay lens unit G2 in Example 4 (FIG. 22) is also approximately parallel to the optical axis of the objective 1. Accordingly, illuminating light emerging from the second relay lens unit G2 can be led to the sample 7 by using the arrangement shown in FIG. 32 in place of the distal end illumination unit B shown in FIG. 22. In other words, the arrangement shown in FIG. 32 is a basic arrangement in which prisms are used to lead illuminating light to the sample 7. However, it is, needless to say, necessary to provide lens systems between the optical axes 101, 102 and 103. In this case, by placing lenses in coaxial relation to the optical axes 101, 102 and 103, the assembly of the optical system is facilitated.

FIG. 33 shows an arrangement in which two prisms P2 and P3, which are light-deflecting members, are provided on the light source side of the prism P4 in addition to the arrangement shown in FIG. 32. The prisms P2 and P3 are placed in a plane A4 perpendicular to the plane A1. The optical axis 105 of the illumination optical system is approximately parallel to the optical axis of the objective 1. A plane A5 contains both the optical axis 105 and the optical axis of the objective 1. The prism P2 is placed so as to deflect the optical axis 105 toward the prism P3 provided away from the objective 1 (toward the prism P4). Reference numeral 104 denotes the optical axis deflected by the prism P2. The prism P3 is placed so as to deflect the optical axis 104 toward the prism P4.

The arrangement shown in FIG. 33 leads illuminating light to the sample 7 by using four prisms. Therefore, the degree of freedom for the layout of the optical system increases. Accordingly, it is possible to apply illuminating light from various directions and hence possible to perform efficient illumination. If these prisms are placed in the space between the objective 1 and the post 11, the fluorescence illumination apparatus A can be installed without causing the optical apparatus to increase in size, as stated above. In addition, because total reflection is used as reflection in each prism, the loss of illuminating light is minimized.

It should be noted that, as shown in FIGS. 32 and 33, the optical axis 103 intersects the sample 7 at an angle θ. Therefore, the illuminating light beam (in this example, the lenses in the illumination optical system have a rotationally symmetric configuration) is elliptical on the surface of the sample 7, although it is circular with respect to a plane perpendicular to the optical axis 103. On the other hand, the observation area is circular. Therefore, the illumination area and the observation area do not coincide with each other. However, the displacement between the illumination area and the observation area is small. Therefore, the displacement gives rise to no serious problem. To make the illumination area and the observation area coincident with each other as much as possible, an optical system for correcting the displacement is needed as shown in Example 8 described below.

Example 8

Figure 34:
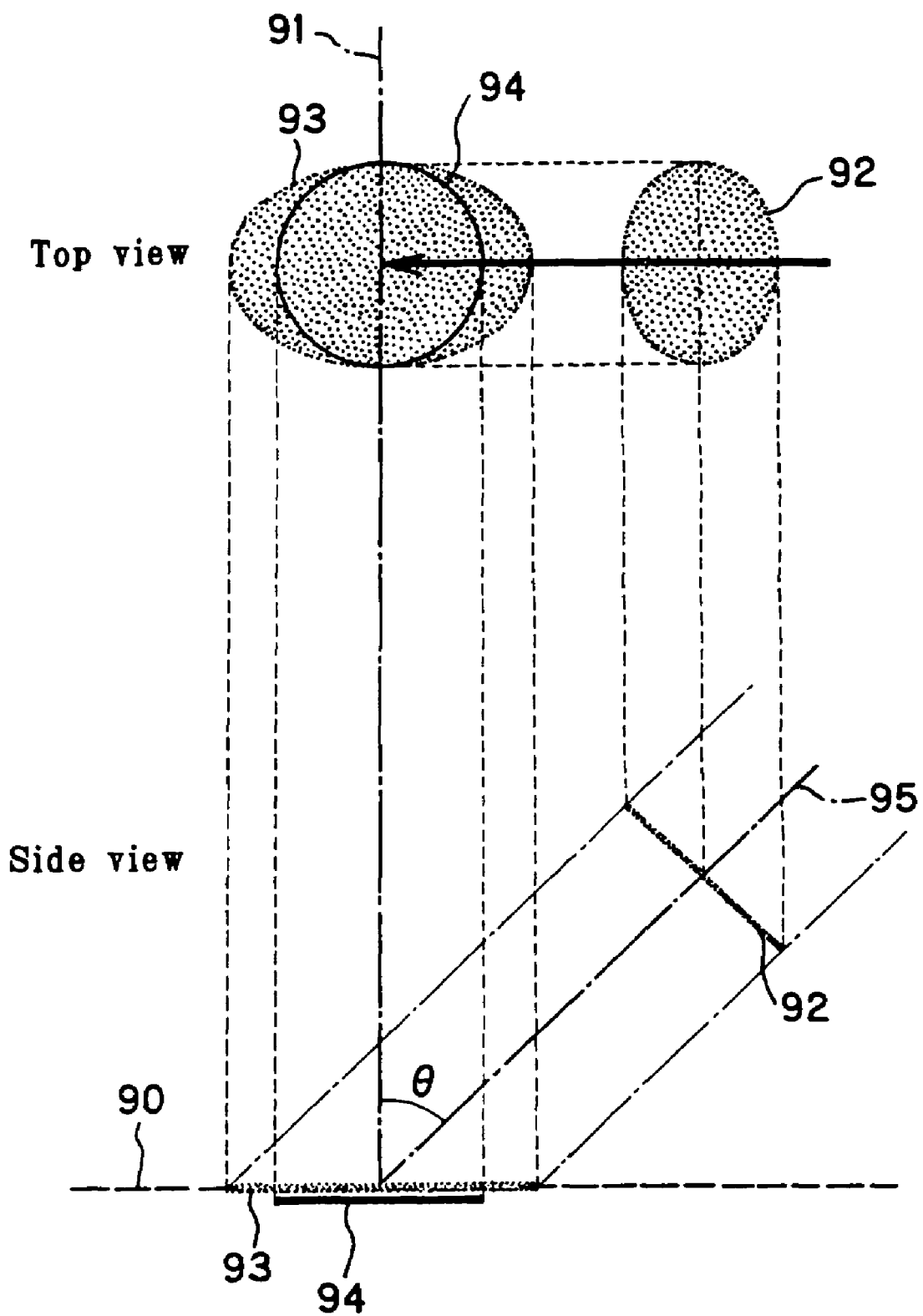
FIG. 34 is a diagram showing the condition of an illuminating light beam on a sample when an illumination optical system is formed from a rotationally symmetric circular optical member and illuminating light is applied obliquely to the sample.

As has been stated in Example 7, in a case where the illumination optical system is formed from rotationally symmetric circular optical members and illuminating light is applied obliquely to the sample, the illuminating light beam becomes elliptical on the sample. FIG. 34 shows the way in which the illuminating light beam becomes elliptical on the sample. In the figure, reference numeral 90 denotes a sample surface. Reference numeral 91 denotes an optical axis of the objective. Reference numeral 92 denotes an illuminating light beam. Reference numeral 93 denotes an illumination area. Reference numeral 94 denotes an observation area. Reference numeral 95 denotes an optical axis of the illumination optical system. In FIG. 34, the optical axis 95 of the illumination optical system is tilted at an angle θ with respect to the optical axis 91 of the objective. Therefore, the illumination area 93 of the illuminating light beam 92 illuminating the sample surface 90 becomes elliptical. On the other hand, the optical axis 91 of the objective is perpendicular to the sample surface 90. Therefore, the observation area 94 becomes circular. The fact that although the observation area 94 is circular, the illumination area is elliptical means that all illuminating light from the light source 13 does not collect in the observation area 94. Accordingly, in this state, efficient illumination cannot be performed, and it is difficult to observe a bright fluorescence image.

It should be noted that in the top view of FIG. 34 the illuminating light beam 92 is not circular although it must be circular. This is because the illuminating light beam (circular) projected on a plane perpendicular to the optical axis 95 of the illumination optical system is seen from above. Thus, in the top view, the illuminating light beam presents a configuration multiplied by the value of cos θ.

To solve the problem that the observation area and the illumination area do not coincide with each other, the distal end illumination unit B in this example is formed by replacing the lenses B2 and B3 of positive refracting power in the distal end illumination unit B in Example 7 with toric lenses, as shown in FIG. 35. Part (a) of FIG. 35 is a side view of the distal end illumination unit B, the objective 1 and the observation optical systems 2L and 2R. Part (b) of FIG. 35 is a front view of the arrangement. Part (c) of FIG. 35 is a top view of the arrangement. Part (d) of FIG. 35 is a diagram showing the external shape of a toric lens.

As shown in part (d) of FIG. 35, each of toric lenses B2 and B3 is such a lens that a refracting surface thereof is not rotationally symmetric, and the lens has different radii RDX and RDY of curvature in the directions of two orthogonal axes X and Y. Accordingly, the distal end illumination unit B in this example with such toric lenses has two different focal lengths Fx and Fy in the orthogonal directions X and Y.

Figure 36:
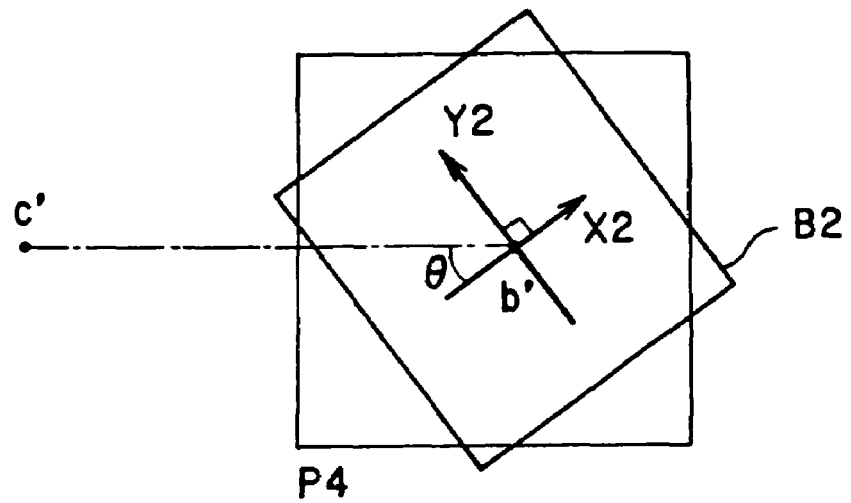
FIG. 36 is a diagram showing a positional relationship between a toric lens and a prism.
Figure 37:
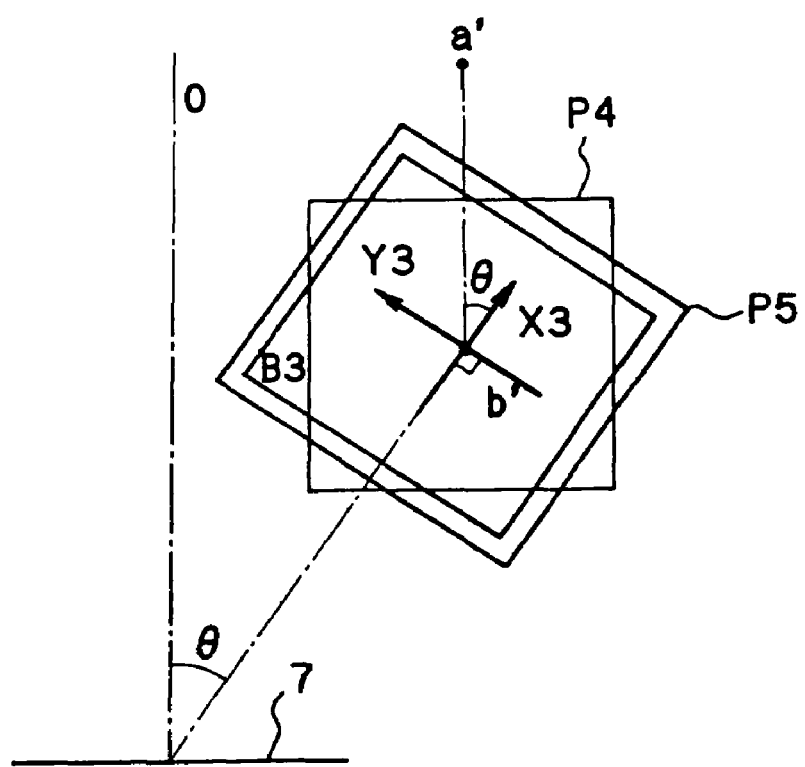
FIG. 37 is a diagram showing a positional relationship between another toric lens and another prism.

In this example, a light beam emerging from the distal end illumination unit B is applied obliquely to the sample 7. Here, θ is the angle formed between the optical axis of the objective 1 and the optical axis of the illumination optical system on the exit side of the distal end illumination unit B. As shown in FIGS. 36 and 37, the toric lens B2 is placed in a position rotated through an angle θ with respect to the axis b'c' of the illumination optical system emerging from the prism P4. The toric lens B3 is placed in a position rotated through an angle θ with respect to the optical axis a'b' of the illumination optical system entering the prism P4. Reference symbols X2 and Y2 denote directions in which the refracting surfaces of the toric lens B2 have curvatures. Reference symbols X3 and Y3 denote directions in which the refracting surfaces of the toric lens B3 have curvatures. The toric lens B2 is placed so that the angle formed between X2 and the optical axis b'c' of the illumination optical system is equal to θ. The toric lens B3 is placed so that the angle formed between X3 and the optical axis a'b' of the illumination optical system is equal to θ.

Figure 38:
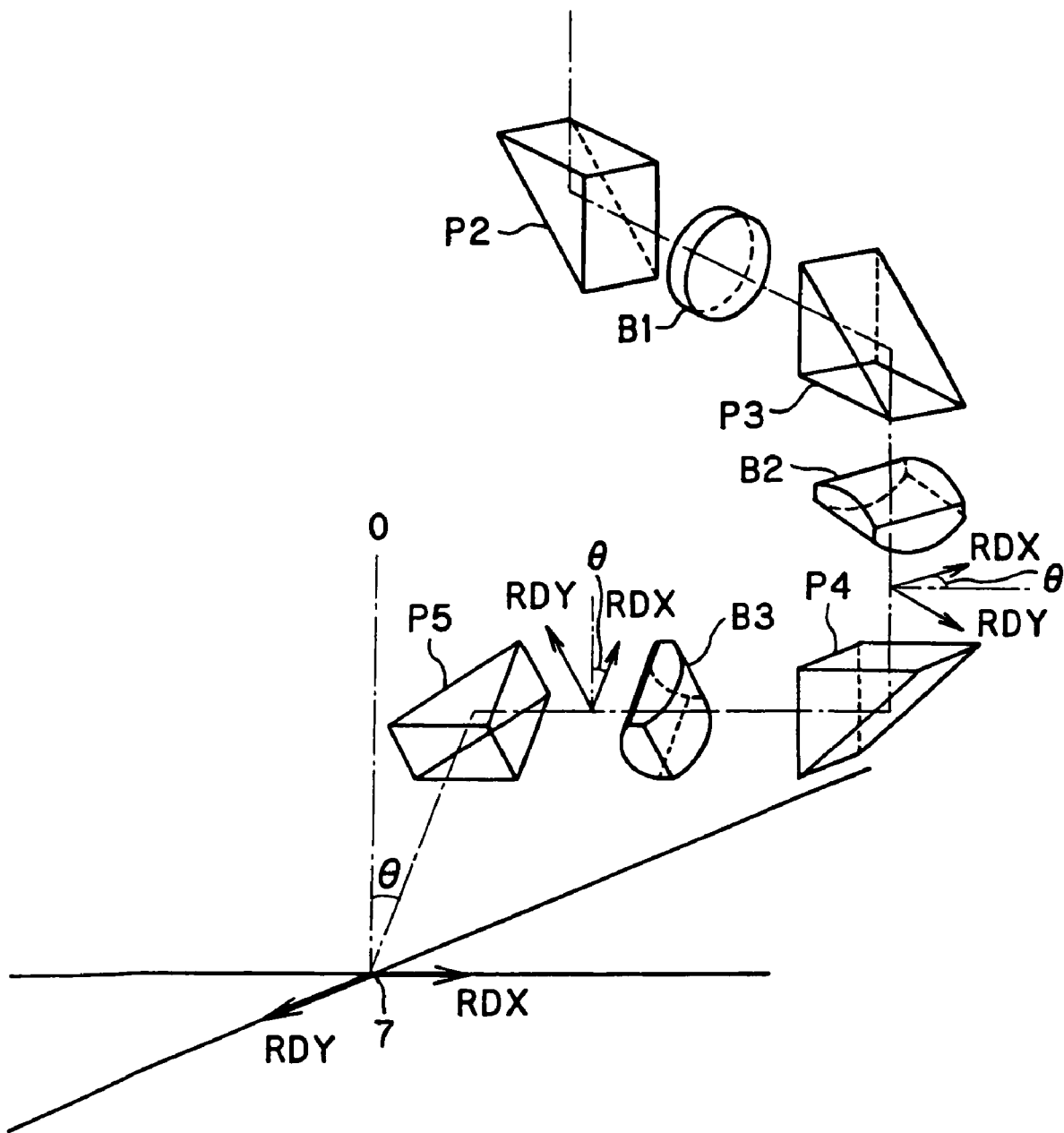
FIG. 38 is a perspective view of a distal end illumination unit.

FIG. 38 is a perspective view of the distal end illumination unit B. In FIG. 38, RDX corresponds to X2 and X3 in FIGS. 36 and 37, and RDY corresponds to Y2 and Y3 in FIGS. 36 and 37. The refracting surface of the toric lens B2 that is closer to the prism P3 has a curvature in the direction RDY but does not have a curvature in the direction RDX. The surface of the toric lens B2 on the opposite side, that is, the refracting surface closer to the prism P4, has a curvature in the direction RDX but does not have a curvature in the direction RDY. The refracting surface of the toric lens B3 that is closer to the prism P4 has a curvature in the direction RDX but does not have a curvature in the direction RDY. The surface of the toric lens B3 on the opposite side, that is, the refracting surface closer to the prism P5, has a curvature in the direction RDY but does not have a curvature in the direction RDX.

In FIG. 38, illumination is performed in the direction of an axis (arrow). RDY on the surface of the sample 7, that is, in the direction of the straight line of intersection between the sample surface and a plane containing both the optical axis O of the objective and the optical axis of the illumination optical system. In a case where the lenses B2 and B3 are rotationally symmetric lenses similar to the lens B1, the illumination area on the sample 7 becomes elliptical. In this case, the direction of the straight line of intersection between the sample surface and the plane containing both the optical axis O of the objective and the optical axis of the illumination optical system is the direction of the major axis (diameter) of the ellipse, and the direction (direction RDX in FIG. 38) perpendicularly intersecting the direction RDY is the direction of the minor axis (diameter) of the ellipse.

Figure 39:
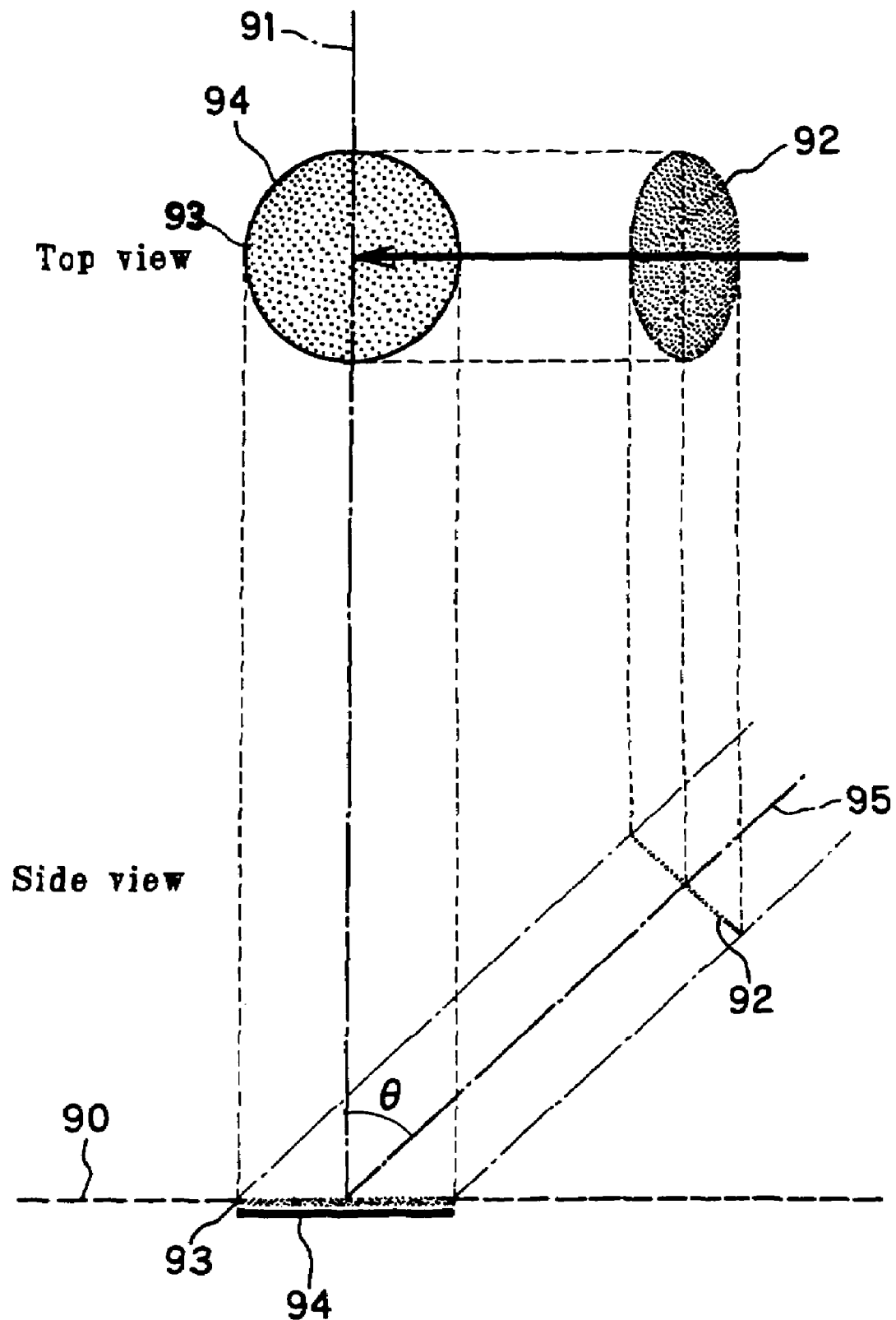
FIG. 39 is a diagram showing the condition of an illuminating light beam on a sample when a toric lens is used in an illumination optical system and illuminating light is applied obliquely to the sample.

Therefore, by replacing the lenses B2 and B3 with toric lenses, the focal lengths of the distal end illumination unit B in the directions RDX and RDY can be made different from each other. Accordingly, by making the projection magnifications in the directions RDX and RDY different from each other, as shown in the top view in FIG. 39, the diameter of the illuminating light beam 92 in the direction of the arrow (corresponding to the direction RDY) can be made smaller than in the case of FIG. 34. As a result, when the illuminating light beam 92 is projected on the sample 7, the illumination area 93 becomes circular, not elliptical. When projected on a plane perpendicular to the optical axis 95 of the illumination optical system, the illuminating light beam is elliptical in the case of FIG. 39 and circular in the case of FIG. 34.

Thus, in this example, the distal end illumination unit B uses toric lenses each having different focal lengths in two orthogonal directions, thereby allowing the illumination area and the observation area to have the same shape on the sample when illuminating light is applied obliquely to the sample surface. Accordingly, efficient illumination can be performed, and a bright fluorescence image can be observed.

Incidentally, it is desirable that the distal end illumination unit B should satisfy the following conditions:

$$Fy < Fx \tag{5}$$

$$0.8 < (Fy/Fx)/\cos\theta < 1.2 \tag{6}$$

In the above conditions, θ is the angle formed between the optical axis of the illumination optical system exiting the distal end illumination unit B and the optical axis of the objective 1. Fx is the focal length of the distal end illumination unit B in the direction of the minor axis of an elliptical illumination area formed on the sample when it is illuminated by an illumination optical system formed from a rotationally symmetric optical system. Fy is the focal length of the distal end illumination unit B in the direction of the major axis of the elliptical illumination area, which is perpendicular to the direction of the minor axis.

Alternatively, it is desirable that the distal end illumination unit B should satisfy the following conditions:

$$|My| < |Mx| \tag{7}$$

$$0.8 < (|My|/|Mx|)/\cos\theta < 1.2 \tag{8}$$

In the above conditions, θ is the angle formed between the optical axis of the illumination optical system exiting the distal end illumination unit B and the optical axis of the objective. Mx is the projection magnification of the optical system of the distal end illumination unit B in the direction of the minor axis of an elliptical illumination area formed on the sample when it is illuminated at the angle θ with a rotationally symmetric optical system, which is obtained by Mx=I/Ix', where I is the sample and Ix' is a sample image formed by the distal end illumination unit B. My is the projection magnification of the optical system of the distal end illumination unit B in the direction of the major axis of the elliptical illumination area, which is perpendicular to the direction of the minor axis. The projection magnification My is obtained by My=I/Iy', where I is the sample and Iy' is a sample image formed by the distal end illumination unit B.

If the conditions (5) and (6) or the conditions (7) and (8) are satisfied, the illuminating light beam exiting the distal end illumination unit B has an elliptical sectional configuration in a section perpendicular to the optical axis of the illumination optical system. Therefore, when applied to the surface of the sample 7, the illuminating light beam becomes approximately circular. In particular, when (Fy/Fx)/cos θ=1 or (|My|/|Mx|)/cos θ=1, the illuminating light beam becomes circular. Accordingly, the observation area and the illumination area of illuminating light can be made approximately coincident with each other.

By forming the distal end illumination unit B so that the above conditions are satisfied, satisfactorily efficient illumination can be performed even when the optical axis on the exit side of the distal end illumination unit B is tilted with respect to the optical axis of the objective 1. It should be noted that if the condition (6) or (8) is not satisfied, the illumination area of illuminating light does not coincide with the observation area. Therefore, illumination efficiency is degraded. As a result, it becomes difficult to observe a bright fluorescence image.

It should be noted that in the above conditions the minor axis direction and the major axis direction are determined with respect to the illumination area (RDX, RDY) on the sample. However, if the minor axis direction and the major axis direction are determined with respect to the illuminating light beam in an optical system using toric lenses, RDX is the major axis direction and RDY is the minor axis direction because the illuminating light beam is in the shape of an ellipse that is shorter in the direction RDY than in the direction RDX.

Table 6 shows lens data concerning the distal end illumination unit B in this example. The lens data is shown separately for the direction RDX and the direction RDY. The surface Nos. 3 to 4 correspond to the lens B1 of negative refracting power, which is a negative lens having a concave surface directed toward the sample. The surface Nos. 5 to 7 correspond to the right-angled triangular prism P3. The surface Nos. 8 to 9 correspond to the toric lens B2, which is made of silicon. The surface No. 8 has a curvature in the direction RDY but does not have a curvature in the direction RDX. The surface No. 9 is an aspherical surface having a curvature in the direction RDX, which does not have a curvature in the direction RDY. The surface Nos. 10 to 12 correspond to the right-angled triangular prism P4. The surface Nos. 13 to 14 correspond to the toric lens B3, which is made of silicon. The surface No. 13 has a curvature in the direction RDX but does not have a curvature in the direction RDY. The surface No. 14 is an aspherical surface having a curvature in the direction RDY, which does not have a curvature in the direction RDX. The surface Nos. 15 to 17 correspond to the right-angled triangular prism P4.

Figure 40:
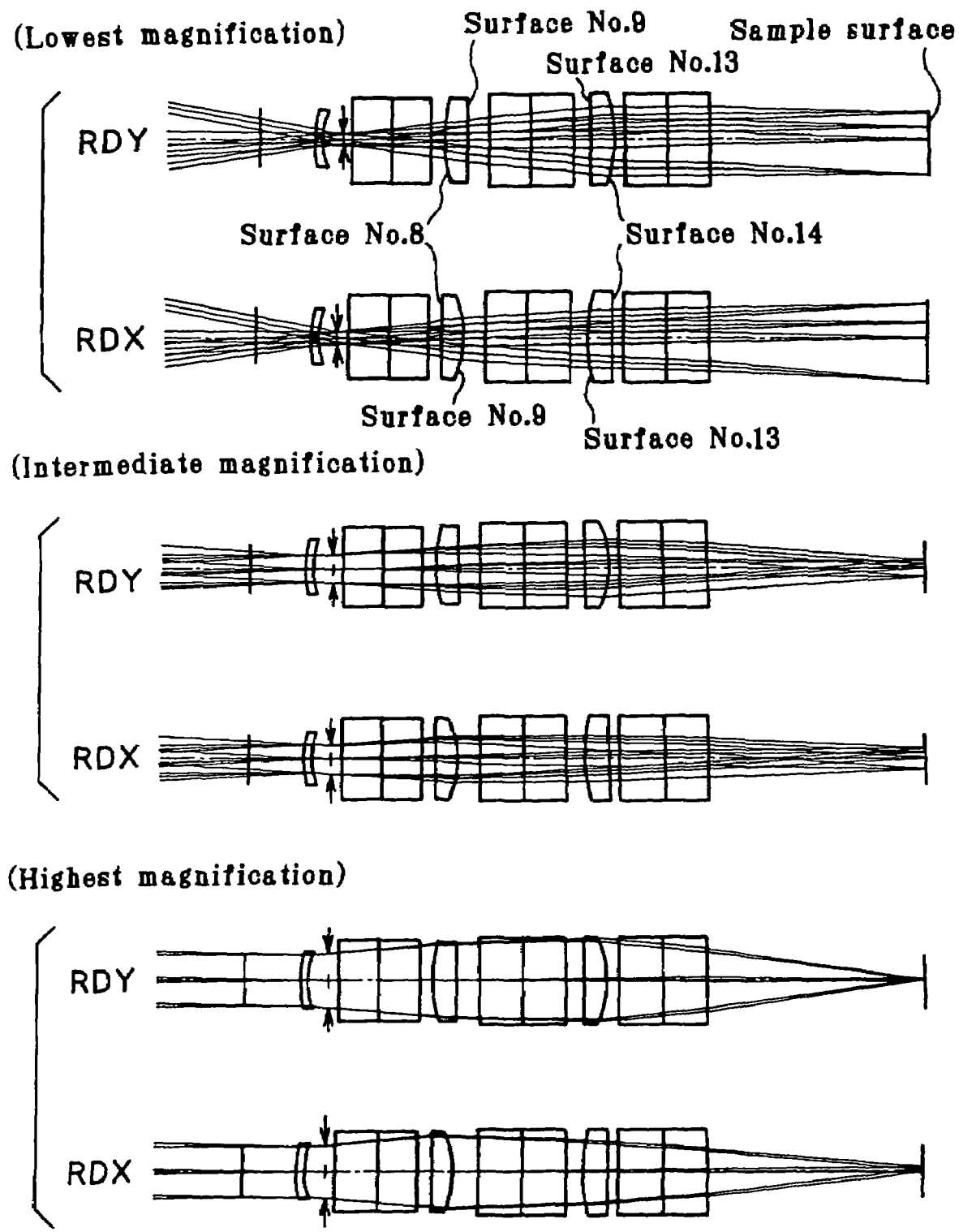
FIG. 40 is a diagram showing a distal end illumination unit in Example 8, which shows the condition of illuminating light at the lowest, intermediate and highest magnifications.

FIG. 40 illustrates optical ray traces of the optical system based on the lens data shown in Table 6 at the lowest, intermediate and highest magnifications in the directions RDX and RDY. The focal lengths of the distal end illumination unit B are Fx=90 millimeters and Fy=68.9 millimeters. The focal length of the objective 1 is Fob=75 millimeters. Therefore, the conditions (3) and (6) are satisfied. The condition (4) is also satisfied.

The material of the toric lenses is silicon, which is favorable because the production cost is minimized by producing the toric lenses as molded lenses from silicon. However, it is also possible to produce the toric lenses from a glass material. Regardless of whether silicon or a glass material is used, it is preferable to select a material having a high transmittance for ultraviolet rays for the purpose of performing fluorescence illumination.

In this example, the two toric lenses B2 and B3 each have toric surfaces on both sides thereof. Therefore, four toric surfaces are used in this example. However, providing at least one toric surface suffices for allowing the distal end illumination unit B to have different focal lengths in the orthogonal directions. It should be noted, however, that at least two toric surfaces are required to make the pupil positions 31 of the distal end illumination unit B in the orthogonal directions coincident with each other. In this case, it is desirable that one toric surface should have a curvature in each of the orthogonal directions.

Figure 41A:
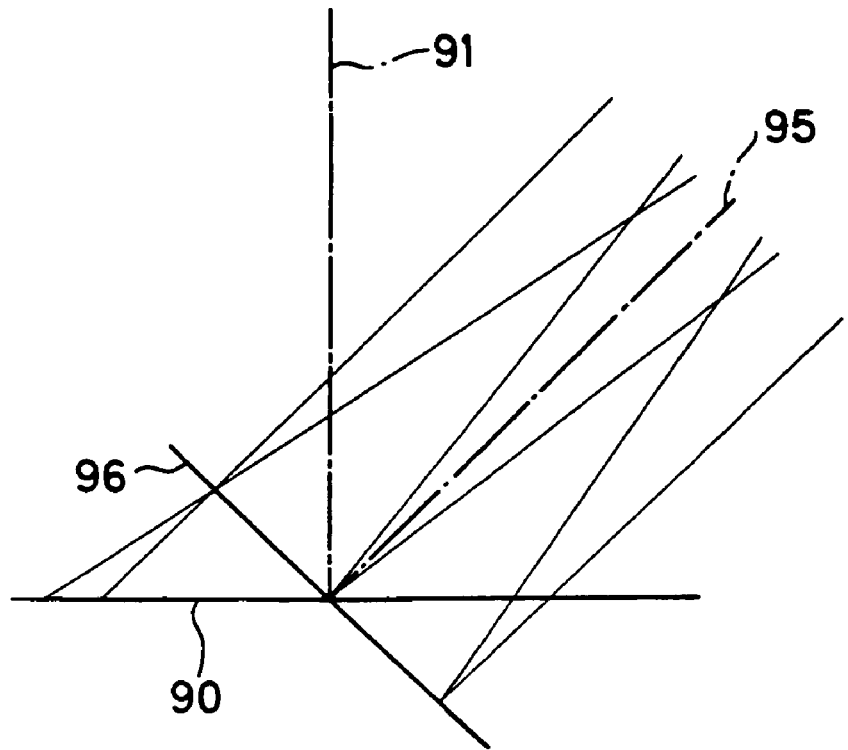
FIG. 41 is a diagram showing the condition of illuminating light on a sample, in which part (a) is a diagram showing the condition of illuminating light when an asymmetric surface is not used, and part (b) is a diagram showing the condition of illuminating light when an asymmetric surface is used.
Figure 41B:
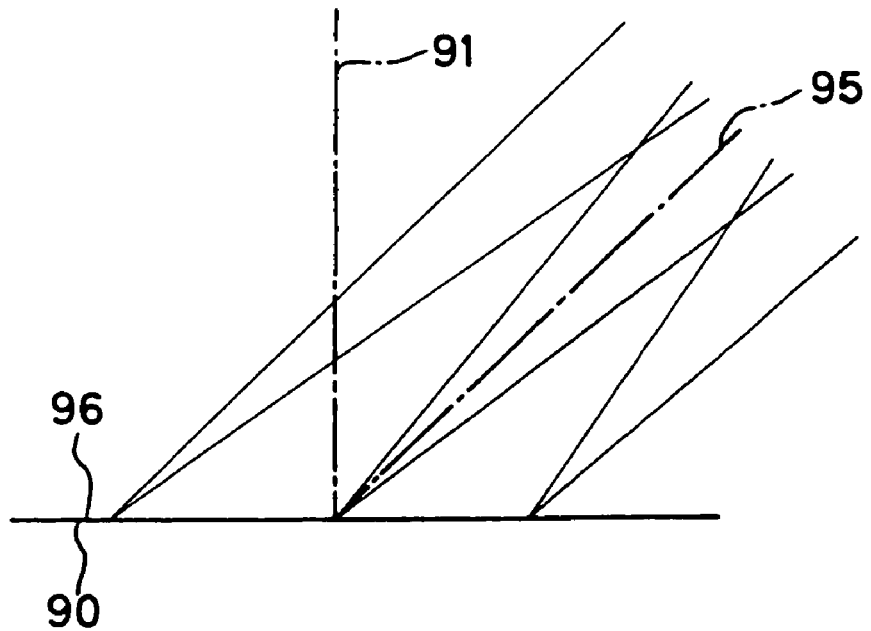

It is also possible to use a surface asymmetric with respect to the optical axis to form a lens in place of a toric surface. That is, at least one of the above-described toric surfaces is replaced with a surface asymmetric with respect to the optical axis of the illumination optical system. Part (a) of FIG. 41 shows the condition of illuminating light in a case where an asymmetric surface is not used. Part (b) of FIG. 41 shows the condition of illuminating light in a case where an asymmetric surface is used.

In a case where an asymmetric surface is not used in the optical system of the distal end illumination unit B, the plane 96, which is uniformly illuminated, is tilted with respect to the sample surface 90. Because the plane 96 is not coincident with the sample surface 90, in illuminating light reaching the sample surface 90, a light beam collected on the optical axis 95 coincides with the sample surface 90, but the other light beams undesirably diverge on the sample surface 90. Therefore, the peripheral portion of the observation area becomes unfavorably dark in comparison to the center thereof. In contrast, if an asymmetric surface is used in the optical system of the distal end illumination unit B, all illuminating light can be collected on the sample surface 90. Therefore, the plane 96, which is uniformly illuminated, and the sample surface 90 can be made coincident with each other. Accordingly, both the central and peripheral portions of the observation area can be illuminated with the same brightness.

Figure 42B:
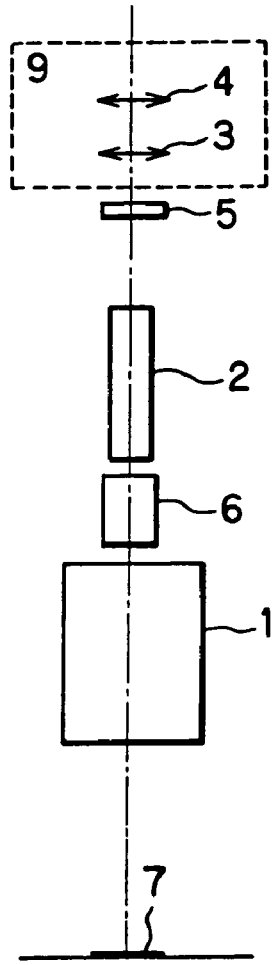
FIG. 42 is a diagram showing an optical apparatus that is a combination of the optical apparatus according to Example 1 and the distal end illumination unit in Example 4, in which part (a) is a front view showing only a fluorescence observation optical system, and part (b) is a side view of the entire optical apparatus.
Figure 42A:
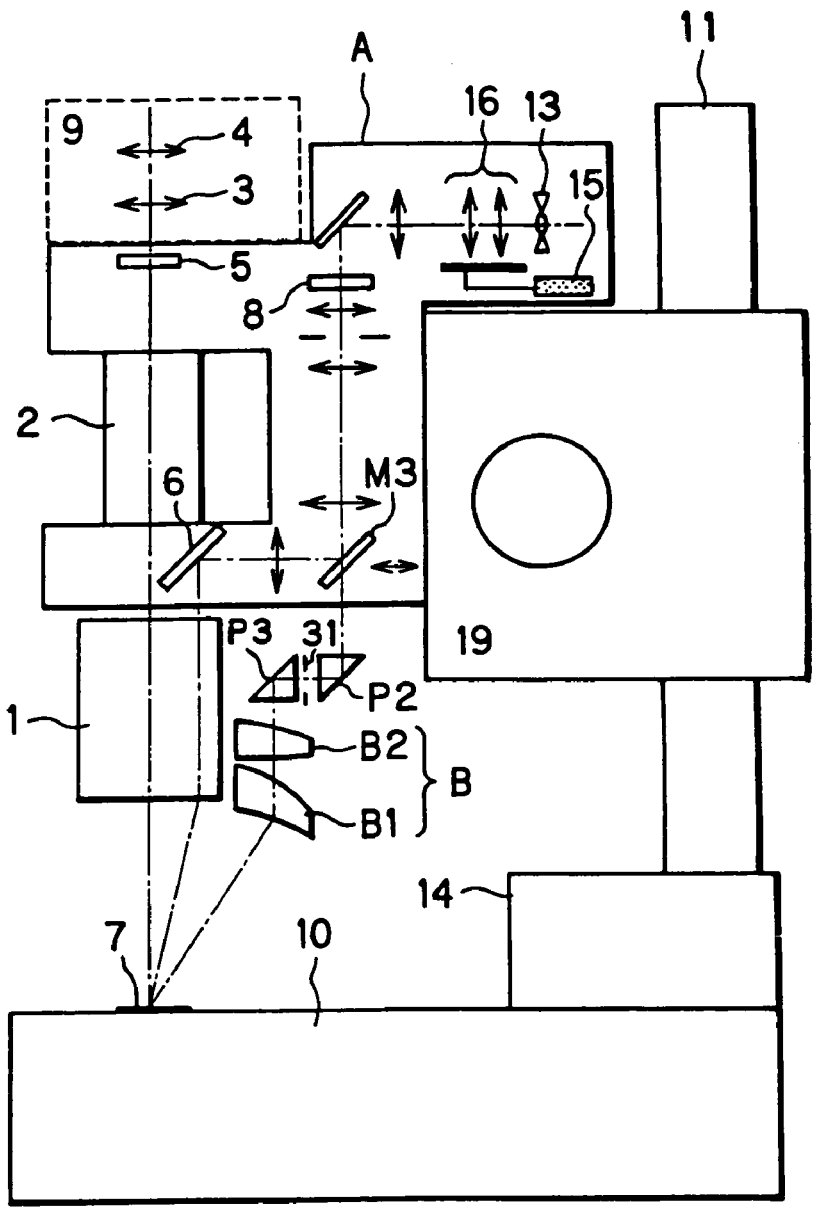
Figure 43:
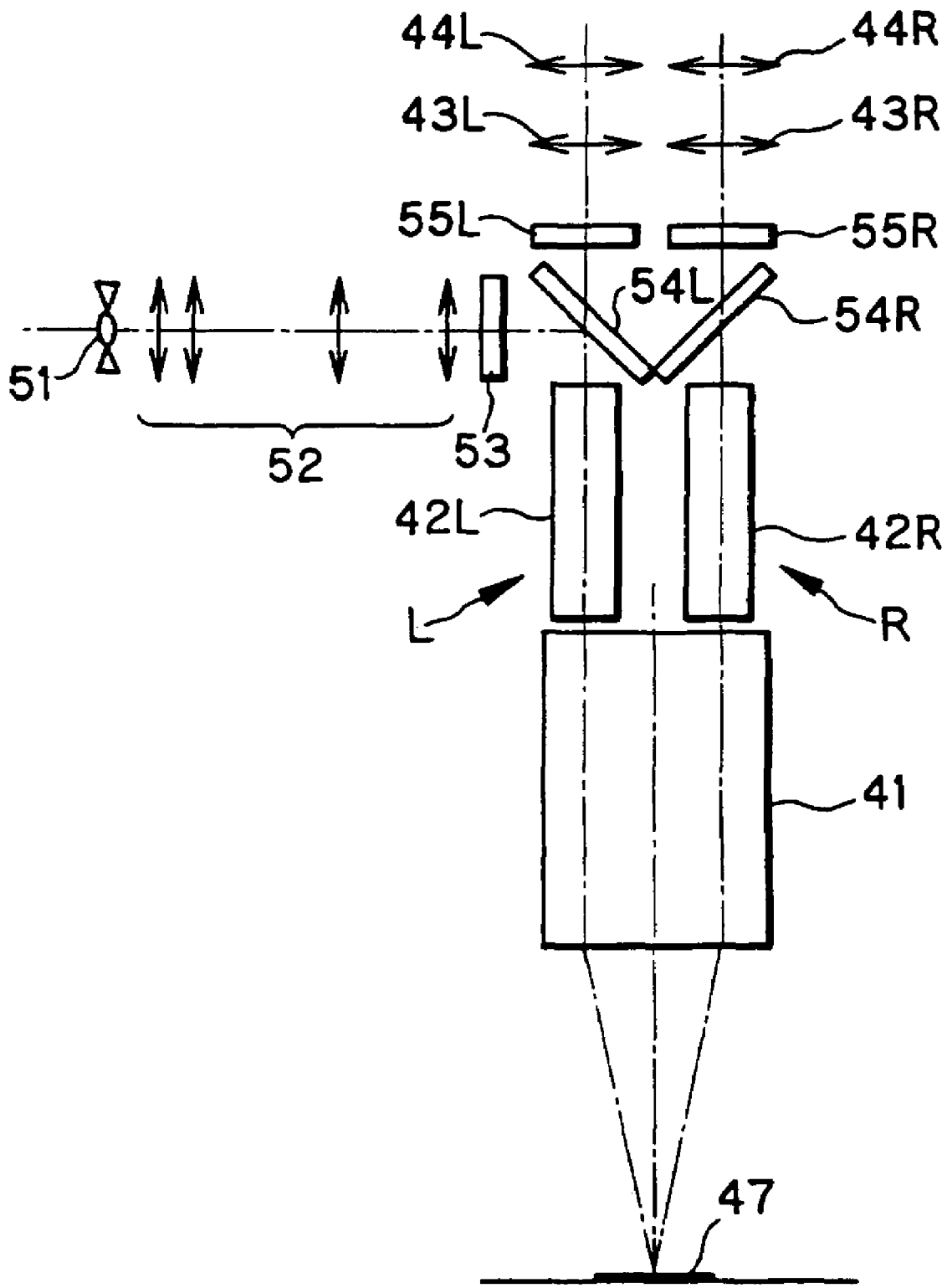
FIG. 43 is a diagram showing the arrangement of a conventional stereoscopic microscope during fluorescence observation.
Figure 44:
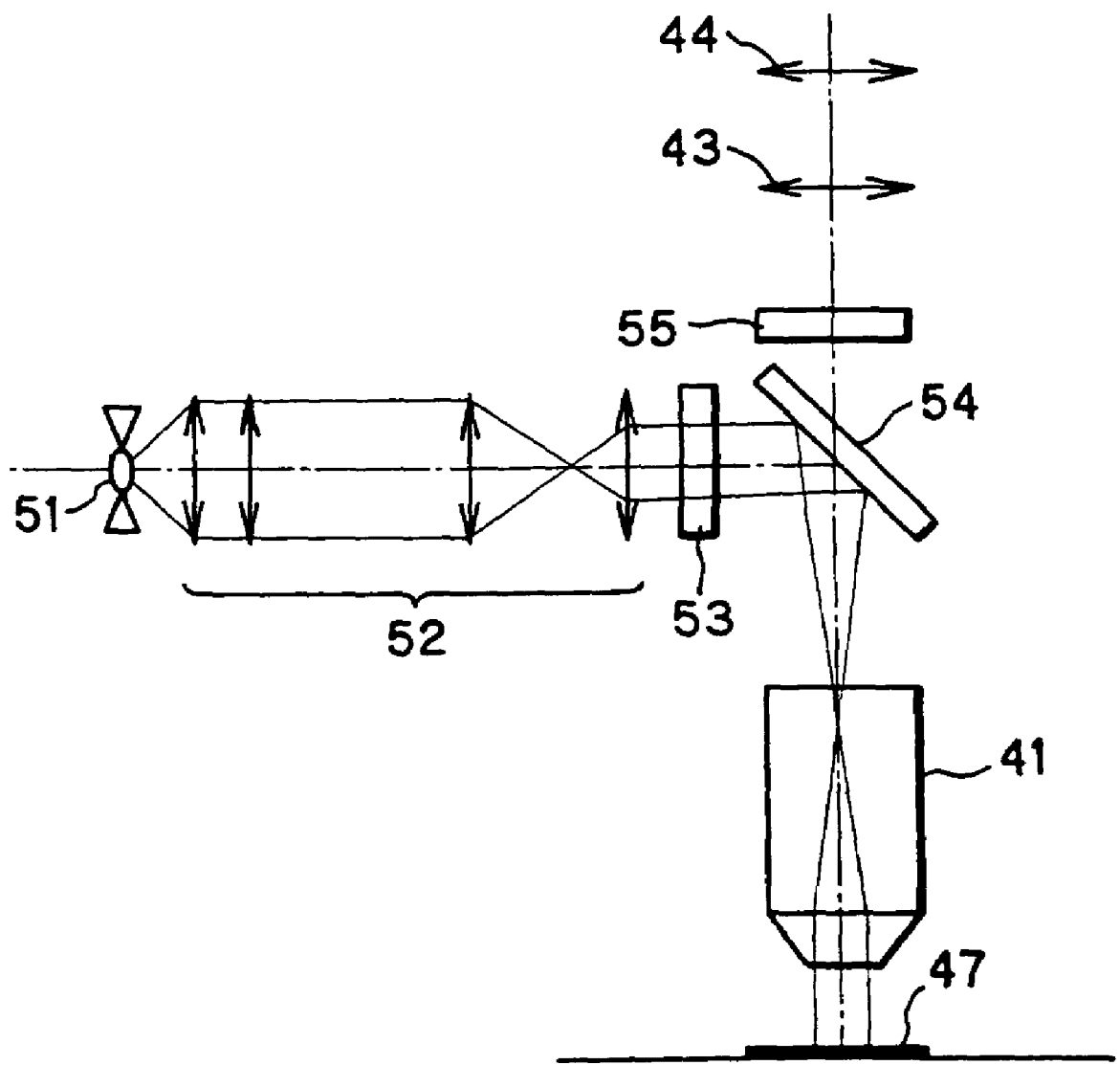
FIG. 44 is a diagram showing the arrangement of a conventional incident light fluorescence microscope.
Figure 45:
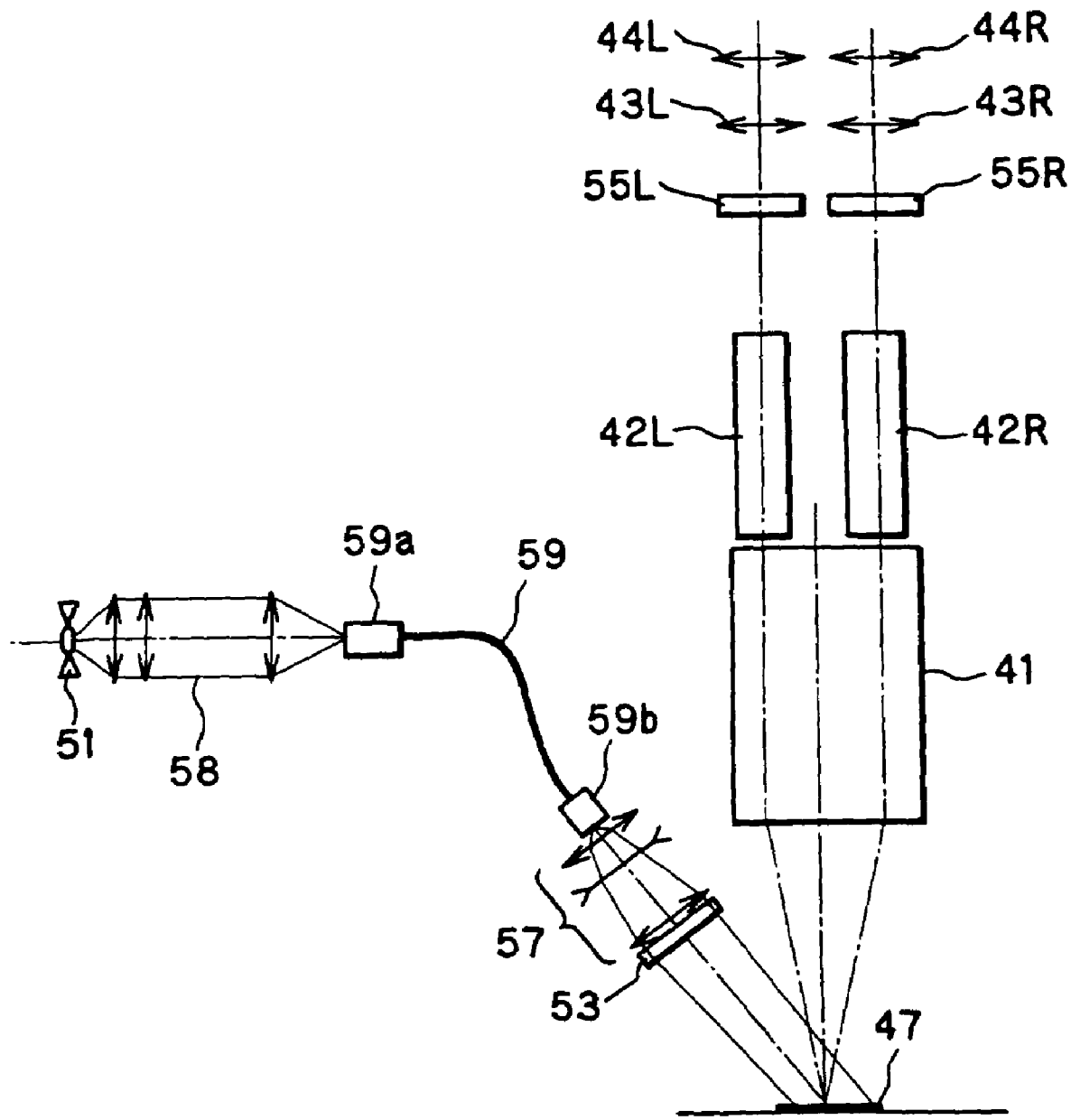
FIG. 45 is a diagram showing the arrangement of a conventional stereoscopic microscope during fluorescence observation, in which excitation light is not passed through an observation optical system.
Figure 46A:
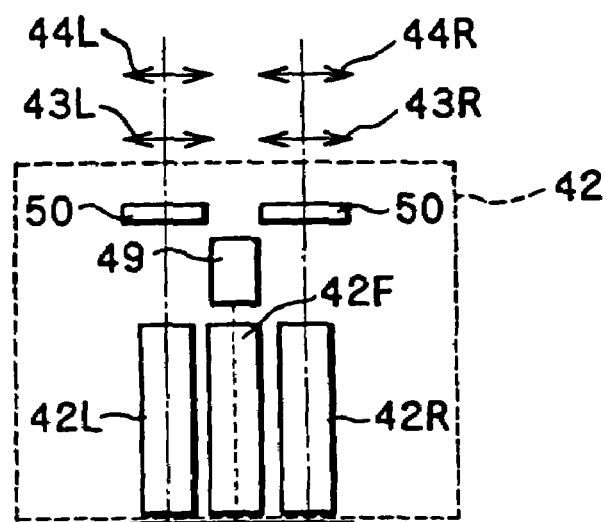
FIG. 46 is a diagram showing the arrangement of a conventional apparatus disclosed in WO99/13370.
Figure 46B:
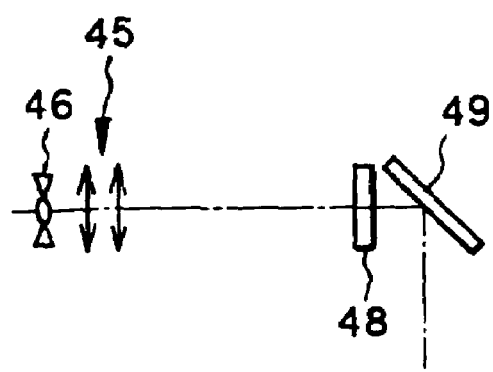
Figure 46C:
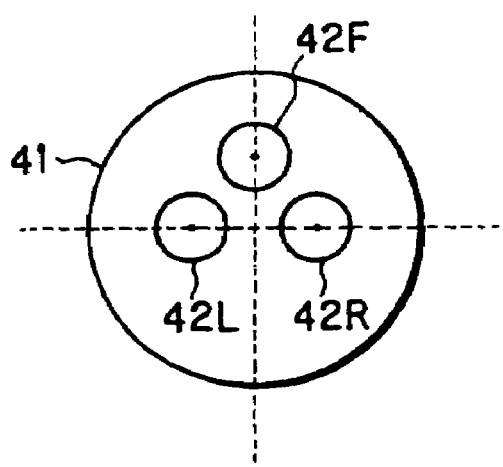
Figure 47:
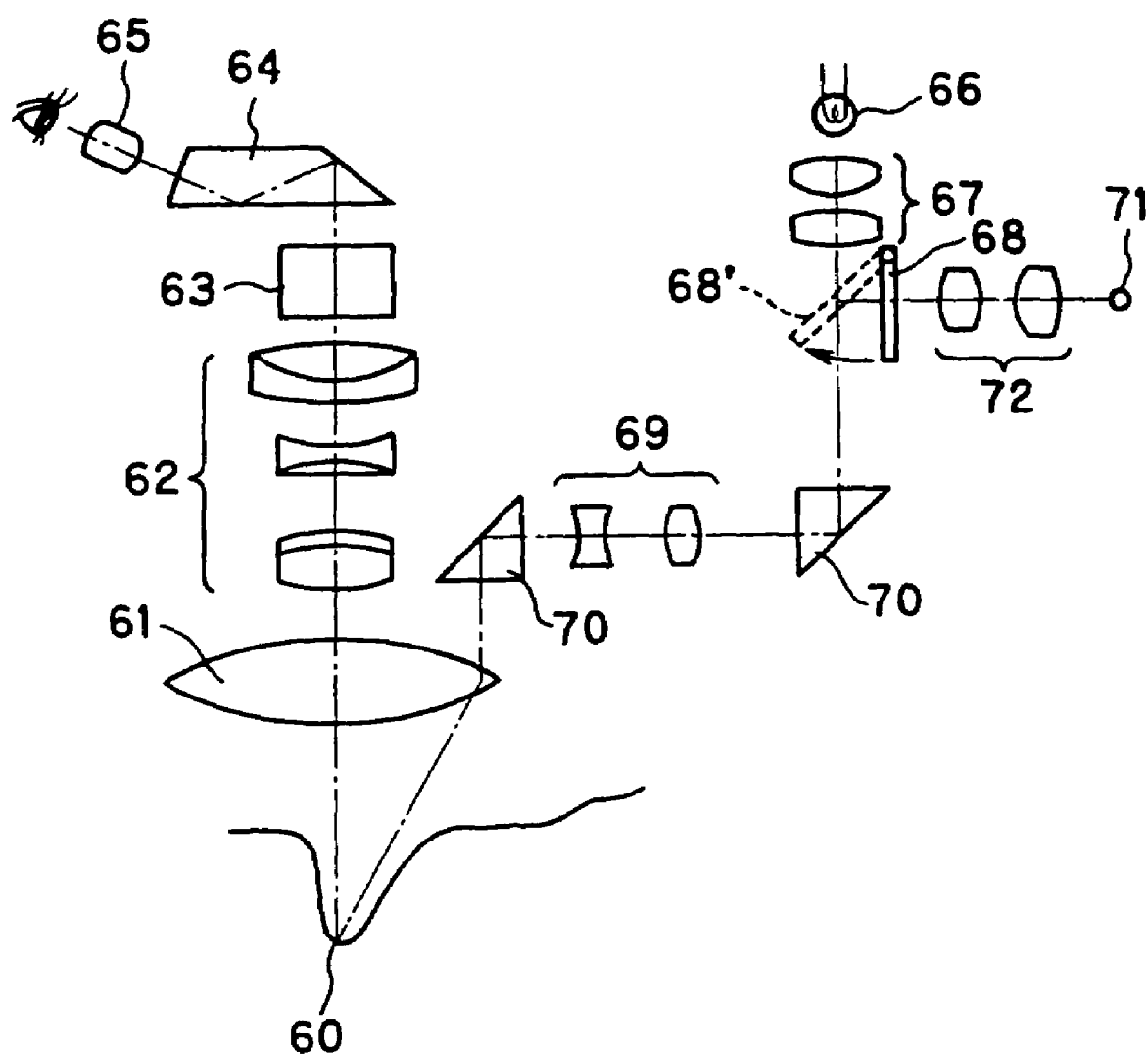
FIG. 47 is a diagram showing the arrangement of a surgical microscope disclosed in Japanese Patent Application Post-Examination Publication No. Hei7-57226.

The distal end illumination unit B can be combined with the optical apparatus according to Example 1, as shown in FIG. 42. In this case, it is possible to perform two different types of illumination, i.e. illumination through the objective 1, and illumination through the distal end illumination unit B. In the arrangement shown in FIG. 42, an optical member M3 may be a totally reflecting mirror, a half-mirror, or a dichroic mirror. When a totally reflecting mirror is used as the optical member M3, only either one of the optical path of illumination performed through the objective 1 and the optical path of the distal end illumination unit B can be used. Therefore, the optical member M3 should be arranged to be movable in the directions indicated by the double-headed arrow to switch between the two optical paths.

In a case where a half-mirror is used as the optical member M3, it is possible to use both the optical path of illumination performed through the objective 1 and the optical path of the distal end illumination unit B simultaneously. In this case, illuminating light is applied nearly perpendicularly to the sample 7 from the illumination optical path through the objective 1, and at the same time, illuminating light is applied obliquely to the sample 7 from the distal end illumination unit B. Thus, the sample 7 is illuminated from two directions. Accordingly, shadowless illumination can be performed for the sample 7. Furthermore, because the amount of illuminating light passing through the objective 1 is reduced, autofluorescence can be minimized.

In a case where a dichroic mirror is used as the optical member M3, the sample 7 can be illuminated with illuminating light (excitation light) of different wavelengths. Accordingly, in observation of a multiple-stained sample 7, a plurality of fluorescence images of different wavelengths can be viewed simultaneously. In this case, autofluorescence in the objective 1 can be minimized by passing illuminating light of short wavelength, which is likely to cause autofluorescence, through the distal end illumination unit B and passing illuminating light of long wavelength through the illumination optical path in the objective 1.

Tables 1-1 to 6 are shown below.

TABLE 1-1

Lens data concerning objective and fluorescence illumination optical system

| Surface No. | Radius of curvature | Separation | Refractive index (480 nm) | Abbe's No. |
|---|---|---|---|---|
| Sample surface | INF | 58.1909 | | |
| 1 | −356.6844 | 10.0 | 1.49267 | 70.23 |
| 2 | −73.9885 | 2.0 | 1 | |
| 3 | 401.3396 | 7.0 | 1.68884 | 32.1 |
| 4 | 84.827 | 16.0 | 1.50157 | 81.61 |
| 5 | −131.2216 | 3.0 | 1 | |
| 6 | 53.5032 | 24.709 | 1.50158 | 81.54 |
| 7 | −53.5032 | 6.7 | 1.52236 | 64.14 |
| 8 | 46.6622 | 6.0 | 1 | |
| 9 | 151.0921 | 9.0 | 1.49268 | 70.21 |
| 10 | −151.0921 | 1.5 | 1 | |
| 11 | INF | 10.0 | 1.52236 | 64.14 |
| (displaced position (displacement of 15 mm)) | | | | |
| 12 | INF | 10.0 | 1.52236 | 64.14 |
| 13 | INF | d1 (variable) | 1 | |
| 14 | INF | d2 (variable) | 1 | |
| (entrance pupil position of objective) | | | | |
| 15 | INF | 41.4 | 1 | |
| 16 | 86.644 | 4.0 | 1.49267 | 70.23 |
| 17 | INF | 24.7 | 1 | |
| 18 | INF | d3 (variable) | 1 | |
| 19 | INF | 5.0 | 1.49267 | 70.23 |
| 20 | −53.984 | 2.0 | 1 | |
| 21 | 53.984 | 5.0 | 1.49267 | 70.23 |
| 22 | INF | d4 (variable) | 1 | |
| 23 | INF | 6.0 | 1.52955 | 59.89 |
| 24 | INF | 8.0 | 1 | |
| 25 | INF | 3.5 | 1.49267 | 70.23 |
| 26 | −17.93 | 28.0 | 1 | |
| 27 | 37.291 | 3.5 | 1.49267 | 70.23 |
| 28 | −51.881 | 68.688 | 1 | |
| 29 | −28.981 | 6.0 | 1.52236 | 64.14 |
| 30 | −20.981 | 8.7 | 1 | |
| 31 | INF | 4.0 | 1.52967 | 69 |
| 32 | INF | 0.6 | 1 | |
| 33 | INF | 4.0 | 1.52967 | 69 |
| 34 | INF | 8.0 | 1 | |
| 35 | −30.1125 | 3.0 | 1.61799 | 39.29 |
| 36 | 57.8565 | 3.5 | 1 | |
| 37 | 112.8286 | 15.9968 | 1.52802 | 64.14 |
| 38 | −29.8272 | 0.3 | 1 | |
| 39 | 33.6183 | 9.6778 | 1.49752 | 70.23 |
| 40 | 76.0179 | 0.2 | 1 | |
| 41 | 17.5066 | 12.9515 (aspherical) | 1.80953 | 50 |
| 42 | 47.0729 | 14.2 | 1 | |
| 43 | INF | 0 | 1 | |
| Light source position | | | | |

Aspherical coefficients:

Surface No. 41
$K = -0.3326$
$A_4 = -4.08080 \times 10^{-6}$

TABLE 1-1-continued

Lens data concerning objective and fluorescence illumination optical system $A_6 = 2.54210 \times 10^{-8}$
$A_8 = -5.41490 \times 10^{-11}$ Zoom data:

| | Lowest magnification 0.7× | Intermediate magnification 2.3× | Highest magnification 9× |
|---|---|---|---|
| d1 | 38.38336 | 100.52992 | 142.40434 |
| d2 | −38.38336 | −100.52992 | −142.40434 |
| d3 | 43.12143 | 124.52958 | 154.62861 |
| d4 | 120.32981 | 38.92167 | 8.82263 |

Displacement data:

Surface No. 11
Amount of displacement: 15 mm

TABLE 1-2

Paraxial quantities of fluorescence illumination optical system

| | | Lowest magnification | Intermediate magnification | Highest magnification |
|---|---|---|---|---|
| Numerical aperture | NA | 0.176 | 0.053 | 0.014 |
| Projection magnification (from light source) | β | 4.4 | 14.9 | 27.0 |
| Exit pupil position | D | 1.2 | 2.7 | 3.0 |
| Focal length | FL | 5.14 | 40.76 | 77.81 |

TABLE 1-3

Paraxial quantities of objective

| | | Lowest magnification | Intermediate magnification | Highest magnification |
|---|---|---|---|---|
| Numerical aperture | NA | 0.0276 | 0.0744 | 0.139 |
| Focal length | Fob | 75 | 75 | 75 |

TABLE 1-4

Paraxial quantities on observation side

| | | Lowest magnification | Intermediate magnification | Highest magnification |
|---|---|---|---|---|
| Numerical aperture of objective | NA | 0.0276 | 0.0744 | 0.139 |
| Magnification of entire system | x | 0.84 | 2.76 | 10.8 |
| Field number | FN | 22 | 22 | 22 |

TABLE 2-1

| Surface No. | Radius of curvature | Separation | Refractive index (480 nm) | Abbe's No. |
|---|---|---|---|---|
| Object point position | INF | 14.5 | | |
| (pupil position of distal end illumination unit) | | | | |
| 1 | INF | 11.0 | 1.52236 | 64.14 |
| 2 | INF | 11.0 | 1.52236 | 64.14 |
| (reflecting surface) | | | | |
| 3 | INF | 0.7 | 1 | |
| 4 | 26.279 | 5.0 | 1.49267 | 70.23 |
| 5 | 50.943 | d1 (variable) | 1 | |
| 6 | 59.166 | 3.5 | 1.49267 | 70.23 |
| 7 | −86.083 | 0.5 | 1 | |
| 8 | 74.151 | 6.3 | 1.49267 | 70.23 |
| 9 | −19.074 | 3.0 | 1.60711 | 39.21 |
| 10 | −91.845 | d2 (variable) | 1 | |
| 11 | −13.205 | 4.0 | 1.52236 | 64.14 |
| 12 | −10.234 | 23.3 | 1 | |
| 13 | INF | 18.412 | 1 | |
| 14 | −31.135 | 3.5 | 1.52236 | 64.14 |
| 15 | −15.113 | 32.015 | 1 | |
| 16 | INF | 10.0 | 1.52236 | 64.14 |
| 17 | INF | 10.0 | 1.52236 | 64.14 |
| 18 | INF | 15.0 | 1 | |
| 19 | 57.900 | 3.0 | 1.60711 | 39.21 |
| 20 | 34.040 | 46.359 | 1 | |
| 21 | −24.498 | 6.0 | 1.52236 | 64.14 |
| 22 | −20.741 | 17.715 | 1 | |
| 23 | INF | 4.0 | 1.52967 | 69 |
| 24 | INF | 0.6 | 1 | |
| 25 | INF | 4.0 | 1.52967 | 69 |
| 26 | INF | 8.0 | 1 | |
| 27 | −30.1125 | 3.0 | 1.61799 | 39.29 |
| 28 | 57.8565 | 3.5 | 1 | |
| 29 | 112.8286 | 15.9968 | 1.52802 | 64.14 |
| 30 | −29.8272 | 0.3 | 1 | |
| 31 | 33.6183 | 9.6778 | 1.49752 | 70.23 |
| 32 | 76.0179 | 0.2 | 1 | |
| 33 | 17.5066 | 12.9515 (aspherical) | 1.80953 | 50 |
| 34 | 47.0729 | 14.2 | 1 | |
| Light source position | INF | | | |

Aspherical coefficients:

Surface No. 33
$K = -0.3326$
$A_4 = -4.08080 \times 10^{-6}$
$A_6 = 2.54210 \times 10^{-8}$
$A_8 = -5.41490 \times 10^{-11}$ Zoom data:

| | Lowest magnification | Intermediate magnification | Highest magnification |
|---|---|---|---|
| d1 | 34.590 | 78.559 | 114.231 |
| d2 | 84.183 | 40.214 | 4.542 |
| Projection magnification (from light source) | β | 4.8 | 11.5 | 25.1 |
| Numerical aperture | NA | 0.175 | 0.054 | 0.013 |
| Focal length | FL | 5.73 | 29.94 | 39.50 |
| Exit pupil position | D | 1.2 | 2.6 | 1.7 |

TABLE 2-2

| Surface No. | Radius of curvature | Separation | Refractive index (480 nm) | Abbe's No. |
|---|---|---|---|---|
| 0 | INF | INF | | |
| 1 | INF | 0 | 1 | |
| 2 | INF | 11.0 | 1.52236 | 64.14 |
| (reflecting surface) | | | | |
| 3 | INF | 11.0 | 1.52236 | 64.14 |
| 4 | INF | 1.0 | 1 | |
| (entrance pupil position) | | | | |
| 5 | INF | 5.5 | 1 | |
| 6 | 143.595 | 24.19 | 1.52236 | 64.14 |
| 7 | −502.795 | 1.1 | 1 | |
| 8 | 62.528 | 25.19 | 1.59637 | 61.14 |
| 9 | 142.471 | 65.0 | 1 | |
| 10 | INF | | | |
| (sample surface) | | | | |

| | Lowest magnification | Intermediate magnification | Highest magnification |
|---|---|---|---|
| Sample side numerical aperture | NA | 0.021 | 0.057 | 0.106 |
| Focal length | F | 95.0 | 95.0 | 95.0 |
| Illumination area | ΦH | 26.19 | 8.0 | 2.0 |

TABLE 3

| Surface No. | Radius of curvature | Separation | Refractive index (480 nm) | Abbe's No. |
|---|---|---|---|---|
| 0 | INF | INF | | |
| 1 | INF | 0 | 1 | |
| 2 | INF | 11.0 | 1.52236 | 64.14 |
| 3 | INF | 11.0 | 1.52236 | 64.14 |
| (reflecting surface) | | | | |
| 4 | INF | 1.0 | 1 | |
| 5 | INF | 5.0 | 1 | |
| (entrance pupil position) | | | | |
| 6 | −267.205 | 6.5 | 1.60711 | 39.21 |
| 7 | 30.132 | 9.6 | 1 | |
| 8 | −185.589 | 3.5 | 1.52236 | 64.14 |
| 9 | −37.565 | 6.2 | 1 | |
| 10 | −530.378 | 5.5 | 1.52236 | 64.14 |
| 11 | −31.387 | 0.0 | 1 | |
| 12 | INF | 0.0 | 1 | |
| 13 | INF | 8.0 | 1 | |
| 14 | INF | 10.0 | 1.52236 | 64.14 |
| (wedge prism) | | | | |
| 15 | INF | 10.0 | 1 | |
| 16 | INF | 15.0 | 1.52236 | 64.14 |
| (wedge prism) | | | | |
| 17 | INF | 50.0 | 1 | |
| Sample surface | INF | | | |

| | Lowest magnification | Intermediate magnification | Highest magnification |
|---|---|---|---|
| Sample side numerical aperture | NA | 0.027 | 0.072 | 0.133 |
| Focal length | F | 75.0 | 75.0 | 75.0 |
| Illumination area | ΦH | 26.19 | 8.0 | 2.0 |

TABLE 4

| Surface No. | Radius of curvature | Separation | Refractive index (480 nm) | Abbe's No. |
|---|---|---|---|---|
| 0 | INF | INF | | |
| 1 | INF | −10 | 1 | |
| 2 | INF | −0.3 | 1 | |
| | | (entrance pupil position) | | |
| 3 | −45.934 | −3.03 | 1.60711 | 39.21 |
| 4 | −22.890 | −9.9669 | 1 | |
| 5 | INF | −15.0 | 1.52236 | 64.14 |
| 6 | INF | 15.0 | 1.52236 | 64.14 |
| | | (reflecting surface) | | |
| 7 | INF | 10.1469 | 1 | |
| 8 | 81.341 | 3.97 | 1.60711 | 39.21 |
| 9 | 52.686 | 8.13 | 1.49267 | 70.23 |
| 10 | −46.635 | 1.0 | 1 | |
| 11 | INF | 20.0 | 1.52236 | 64.14 |
| | | (wedge prism) | | |
| 12 | INF | −25.0 | 1.52236 | 64.14 |
| 13 | INF | 17.37 | 1.52236 | 64.14 |
| 14 | INF | 0 | 1 | |
| 15 | INF | 0 | 1 | |
| 16 | INF | 65.18 | 1 | |
| 17 | INF | −0.0002 | 1 | |
| Sample surface | INF | | | |

| | | Lowest magnification | Intermediate magnification | Highest magnification |
|---|---|---|---|---|
| Sample side numerical aperture | NA | 0.022 | 0.06 | 0.111 |
| Focal length | F | 90.0 | 90.0 | 90.0 |
| Illumination area | ΦH | 26.19 | 8.0 | 2.0 |

TABLE 5

| Surface No. | Radius of curvature | Separation | Refractive index (480 nm) | Abbe's No. |
|---|---|---|---|---|
| 0 | INF | INF | | |
| 1 | INF | 10.0 | 1 | |
| 2 | INF | −10.0 | 1 | |
| | | (entrance pupil position) | | |
| 3 | 55.145 | 2.5 | 1.60711 | 39.21 |
| 4 | 27.637 | 11.0 | 1 | |
| 5 (P3) | INF | 15.0 | 1.52236 | 64.14 |
| 6 | INF | 15.0 | 1.52236 | 64.14 |
| 7 | INF | 5.0 | 1 | |
| 8 | INF | 8.5 | 1.49267 | 70.23 |
| 9 | −41.831 | 8.0 | 1 | |
| 10 (P4) | INF | 16.0 | 1.52236 | 64.14 |
| 11 | INF | 16.0 | 1.52236 | 64.14 |
| 12 | INF | 6.5 | 1 | |
| 13 | 119.500 | 8.5 | 1.49267 | 70.23 |
| 14 | INF | 3.5 | 1 | |
| 15 (P5) | INF | 16.0 | 1.52236 | 64.14 |
| 16 | INF | 16.0 | 1.52236 | 64.14 |
| 17 | INF | 78.0 | 1 | |
| Sample surface | INF | | | |

| | | Lowest magnification | Intermediate magnification | Highest magnification |
|---|---|---|---|---|
| Sample side numerical aperture | NA | 0.022 | 0.06 | 0.111 |
| Focal length | F | 90.0 | 90.0 | 90.0 |
| Illumination area | ΦH | 31.4 | 9.6 | 2.4 |

TABLE 6

(RDY direction)

| Surface No. | Radius of curvature | Separation | Refractive index (480 nm) | Abbe's No. |
|---|---|---|---|---|
| Sample surface | INF | INF | | |
| 0 | INF | INF | | |
| 1 | INF | 10.0 | 1 | |
| 2 | INF | −10.0 | 1 | |
| | | (entrance pupil position) | | |
| 3 | 55.175 | 2.5 | 1.60711 | 39.21 |
| 4 | 27.629 | 11.0 | 1 | |
| 5 (P3) | INF | 15.0 | 1.52236 | 64.14 |
| 6 | INF | 15.0 | 1.52236 | 64.14 |
| 7 | INF | 5.0 | 1 | |
| 8 | 71.316 | 8.5 | 1.41623 | 50.49 |
| | | (toric surface) | | |
| 9 | INF | 8.0 | 1 | |
| | | (toric surface (plane surface)) | | |
| 10 (P4) | INF | 16.0 | 1.52236 | 64.14 |
| 11 | INF | 16.0 | 1.52236 | 64.14 |
| 12 | INF | 6.5 | 1 | |
| 13 | INF | 8.5 | 1.41623 | 50.49 |
| | | (toric surface (plane surface)) | | |
| 14 | −64.667 | 3.5 | 1 | |
| | | (toric surface (aspherical surface)) | | |
| 15 (P5) | INF | 16.0 | 1.52236 | 64.14 |
| 16 | INF | 16.0 | 1.52236 | 64.14 |
| 17 | INF | 78.0 | 1 | |
| Sample surface | INF | | | |

Aspherical coefficients:

Surface No. 14
$K = 0$
$A_2 = -6.12570 \times 10^{-3}$
$A_4 = 1.34900 \times 10^{-6}$
$A_6 = -6.61130 \times 10^{-9}$
$A_8 = 3.54630 \times 10^{-11}$
$A_{10} = -5.82480 \times 10^{-14}$ (RDX direction)

| Surface No. | Radius of curvature | Separation | Refractive index (480 nm) | Abbe's No. |
|---|---|---|---|---|
| Sample surface | INF | INF | | |
| 0 | INF | INF | | |
| 1 | INF | 10.0 | 1 | |
| 2 | INF | −10.0 | 1 | |
| | | (entrance pupil position) | | |
| 3 | 55.175 | 2.5 | 1.60711 | 39.21 |
| 4 | 27.629 | 11.0 | 1 | |
| 5 (P3) | INF | 15.0 | 1.52236 | 64.14 |
| 6 | INF | 15.0 | 1.52236 | 64.14 |
| 7 | INF | 5.0 | 1 | |
| 8 | INF | 8.5 | 1.41623 | 50.49 |

TABLE 6-continued

| | | (toric surface (plane surface)) | | |
|---|---|---|---|---|
| 9 | −36.752 | 8.0 | 1 | |
| | | (toric surface (aspherical surface)) | | |
| 10 (P4) | INF | 16.0 | 1.52236 | 64.14 |
| 11 | INF | 16.0 | 1.52236 | 64.14 |
| 12 | INF | 6.5 | 1 | |
| 13 | 101.454 | 8.5 | 1.41623 | 50.49 |
| | | (toric surface) | | |
| 14 | INF | 3.5 | 1 | |
| | | (toric surface (plane surface)) | | |
| 15 (P5) | INF | 16.0 | 1.52236 | 64.14 |
| 16 | INF | 16.0 | 1.52236 | 64.14 |
| 17 | INF | 78.0 | 1 | |
| Sample surface | INF | | | |

Aspherical coefficients:

Surface No. 9
$K = 0$
$A_2 = -5.24710 \times 10^{-4}$
$A_4 = 4.19900 \times 10^{-7}$
$A_6 = -5.77870 \times 10^{-9}$
$A_8 = 3.61320 \times 10^{-11}$
$A_{10} = -7.43900 \times 10^{-14}$ The angle between the optical axis of the illumination optical system and the optical axis of the objective: $\theta = 40°$ (RDY direction)

| | | Lowest magnification | Intermediate magnification | Highest magnification |
|---|---|---|---|---|
| Sample side numerical aperture | NA | 0.029 | 0.078 | 0.145 |
| Focal length | Fy | 68.9 | 68.9 | 68.9 |
| Illumination area | ΦH | 26.2 | 8.0 | 2.0 |

(RDX direction)

| | | Lowest magnification | Intermediate magnification | Highest magnification |
|---|---|---|---|---|
| Sample side numerical aperture | NA | 0.022 | 0.06 | 0.111 |
| Focal length | Fx | 90.0 | 90.0 | 90.0 |
| Illumination area | ΦH | 26.2 | 8.0 | 2.0 |

It should be noted that values of $A_2$ and $A_{10}$ are not shown for some aspherical surfaces; in this case, the values of $A_2$ and $A_{10}$ are zero.

As has been stated above, the present invention eliminates autofluorescence which would otherwise be produced in the observation optical system by excitation light and prevents the occurrence of autofluorescence from the objective and the observation optical system by the arrangement of the distal end illumination unit, thereby allowing a fluorescence image to be observed with high contrast. Moreover, it is possible to covert a conventional microscope system into a fluorescence observation system without remodeling by integrating the fluorescence illumination optical system and the absorption filter into one unit, or integrating the fluorescence illumination optical system, the absorption filter and the distal end illumination unit into one unit.

In addition, by placing the fluorescence illumination apparatus at the back of the observation apparatus with respect to the observer, a widened space can be provided in the vicinity of the sample surface, which leads to an improvement in operability.

If the above-described fluorescence illumination apparatus is combined with a microscope system including a variable magnification optical system used at a low magnification of the order of about 10×, it is possible to form a system providing superior operability and allowing fluorescence observation with a very high numerical aperture in comparison to the conventional fluorescence microscopes. In addition, because the influence of autofluorescence is minimized, it becomes possible to observe a bright and high-contrast fluorescence image.

What we claim is:

1. An optical apparatus comprising:
   an observation apparatus having an objective, an observation optical system unit that includes a variable magnification optical system, and an imaging optical system unit including an imaging lens and an eyepiece; and
   a fluorescence illumination apparatus comprising:
   a light source;
   first and second reflecting members configured to guide illuminating light from between said variable magnification optical system and said objective to an optical path toward a distal end of said objective;
   an illumination optical system, placed between said light source and said first reflecting member to lead illuminating light from said light source to said first reflecting member;
   a frame having at least one socket; and
   at least one post configured to be inserted into the at least one socket,
   wherein illuminating light from the fluorescence illumination apparatus passes through the objective only without passing through the variable magnification optical system; and
   wherein a first wavelength selecting member for selectively transmitting light in a specific wavelength region in said illuminating light is placed between said light source and said second reflecting member, and a second wavelength selecting member for selectively transmitting light in a wavelength region of fluorescent light emitted from a sample is placed between said variable magnification optical system and said imaging optical system unit;
   wherein said fluorescence illumination apparatus includes an illumination zooming system provided separately from the variable magnification system of the observation optical system,
   wherein the optical apparatus is configured to operate in two modes:
   (i) a fluorescent observation mode, wherein the fluorescence illumination apparatus is removably mounted to the observation apparatus; and
   (ii) a non-fluorescent observation mode, wherein the fluorescence illumination apparatus is removed from the optical apparatus, wherein the at least one socket comprises two sockets, one socket being closer to a sample, and the at least one post comprises one post, and wherein
- (i) in the fluorescent observation mode, the post is inserted into the socket further away from the sample; and
- (ii) in the non-fluorescent observation mode, the post is inserted into the socket closer to the sample.

2. The optical apparatus according to claim 1, wherein said observation optical system unit and said imaging optical system unit are each formed from a pair of lens units, said pair of lens units being placed in parallel and symmetry with respect to the optical axis of said objective.

3. An optical apparatus comprising:
- an observation apparatus having an objective, an observation optical system unit that includes a variable magnification optical system, and an imaging optical system unit including an imaging lens and an eyepiece; and
- a fluorescence illumination apparatus comprising:
- a light source;
- first and second reflecting members configured to guide illuminating light from between said variable magnification optical system and said objective to an optical path toward a distal end of said objective;
- an illumination optical system, placed between said light source and said first reflecting member to lead illuminating light from said light source to said first reflecting member;
- a frame having at least one socket; and
- at least one post configured to be inserted into the at least one socket,
- wherein illuminating light from the fluorescence illumination apparatus passes through the objective only without passing through the variable magnification optical system; and
- wherein a first wavelength selecting member for selectively transmitting light in a specific wavelength region in said illuminating light is placed between said light source and said second reflecting member, and a second wavelength selecting member for selectively transmitting light in a wavelength region of fluorescent light emitted from a sample is placed between said variable magnification optical system and said imaging optical system unit;
- wherein said fluorescence illumination apparatus includes an illumination zooming system provided separately from the variable magnification system of the observation optical system,
- wherein the optical apparatus is configured to operate in two modes:
- (i) a fluorescent observation mode, wherein the fluorescence illumination apparatus is removably mounted to the observation apparatus; and
- (ii) a non-fluorescent observation mode, wherein the fluorescence illumination apparatus is removed from the optical apparatus,
- wherein the at least one socket comprises one socket, and the at least one post comprises a straight post and a crank-shaped post, and wherein
- (i) in the fluorescent observation mode, the straight post is inserted into the socket; and
- (ii) in the non-fluorescent observation mode, the crank-shaped post is inserted into the socket.

4. The optical apparatus according to claim 3, wherein said observation optical system unit and said imaging optical system unit are each formed from a pair of lens units, said pair of lens units being placed in parallel and symmetry with respect to the optical axis of said objective.

* * * * *